United States Patent
Kitajima et al.

(10) Patent No.: US 7,122,991 B2
(45) Date of Patent: Oct. 17, 2006

(54) POWER CONVERSION AND VEHICLE

(75) Inventors: Yasuhiko Kitajima, Kanagawa (JP);
Kantaro Yoshimoto, Yokohama (JP);
Masanori Yamagiwa, Yokohama (JP);
Ryuuta Yamaguchi, Yokohama (JP);
Yutaka Tajima, Kanagawa (JP);
Yasuaki Hayami, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/174,643

(22) Filed: Jul. 6, 2005

(65) Prior Publication Data

US 2006/0006832 A1    Jan. 12, 2006

(30) Foreign Application Priority Data

| Jul. 7, 2004 | (JP) | ............................. 2004-200483 |
| Jul. 7, 2004 | (JP) | ............................. 2004-200545 |
| Jul. 14, 2004 | (JP) | ............................. 2004-207031 |
| Jul. 14, 2004 | (JP) | ............................. 2004-207087 |

(51) Int. Cl.
*H02P 27/04* (2006.01)

(52) U.S. Cl. ...................... 318/800; 318/440; 318/441; 318/442; 318/802

(58) Field of Classification Search ................ 318/800, 318/802, 801, 106, 107, 108, 440, 441, 442; 363/132, 37
See application file for complete search history.

(56) References Cited

U.S. PATENT DOCUMENTS

| 2002/0038732 A1 | 4/2002 | Sugiura et al. |
| 2005/0105514 A1* | 5/2005 | Usuba et al. ................ 370/356 |
| 2005/0111246 A1* | 5/2005 | Lai et al. ..................... 363/157 |

FOREIGN PATENT DOCUMENTS

| JP | 10-323055 A | 12/1998 |
| JP | 2002-118981 A | 4/2002 |

* cited by examiner

*Primary Examiner*—Karen Masih
(74) *Attorney, Agent, or Firm*—Foley & Lardner LLP

(57) ABSTRACT

A power conversion system for converting a dc voltage to a pulsed ac voltage includes a dc voltage source providing three or more electric potentials, and a switching circuit arranged to connect one of the potentials selectively to an output terminal. A controller produces a pulsed ac output voltage at the output terminal from the potentials of the dc voltage source by controlling an on time for connecting each of the potentials to the output terminal.

26 Claims, 43 Drawing Sheets

FIG.10

| MOTOR OPERATION | | FLOW OF ROWER | U PHASE | | | V PHASE | | | W PHASE | | |
|---|---|---|---|---|---|---|---|---|---|---|---|
| | | | SW1 | SW2 | SW3 | SW4 | SW5 | SW6 | SW7 | SW8 | SW9 |
| POWER RUNNING | | FLOW1 | OFF | X | X̄ | OFF | X | X̄ | OFF | X | X̄ |
| | | FLOW2 | X | OFF | X̄ | X | OFF | X̄ | X | OFF | X̄ |
| | | FLOW1+2 | ONE IS ON | | | ONE IS ON | | | ONE IS ON | | |
| | | FLOW1+3 | ONE IS ON | | | ONE IS ON | | | ONE IS ON | | |
| REGENERATIVE | | FLOW3 | X | OFF | X̄ | X | OFF | X̄ | X | OFF | X̄ |
| | | FLOW1+3 | ONE IS ON | | | ONE IS ON | | | ONE IS ON | | |

FIG.27A  Vu 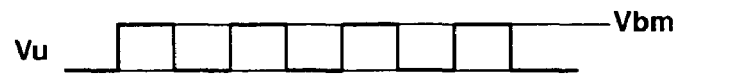 Vbm
FIG.27B  Vu  Vbh-Vbm
FIG.27C  Vu 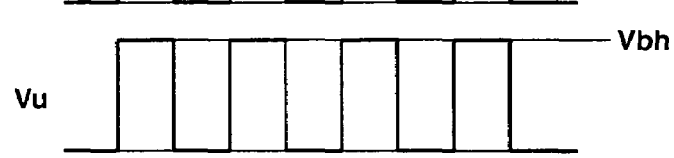 Vbh
FIG.28
| SWITCH | A | B | C |
|---|---|---|---|
| Tr11, Tr12 | L | X (PWM) | X (PWM) |
| Tr21, Tr22 | X (PWM) | X̄ (PWM) | L |
| Tr31, Tr32 | X̄ (PWM) | L | X̄ (PWM) |

…

POWER CONVERSION AND VEHICLE

BACKGROUND OF THE INVENTION

The present invention relates to apparatus and/or process for power conversion, and vehicles such as electric vehicle or fuel cell vehicle or vehicle having two or more power sources.

U.S. Ser. No. 2002/0038732 A1 (corresponding to Published Japanese Patent Application Kokai Publication No. 2002-118981, paragraphs 0004–0006, FIG. 1) shows a vehicle equipped with a power supply system having a dc-dc converter for driving a motor with power from a fuel cell and a battery so as to improve the efficiency and response. A dc-dc converter is used also in a vehicle having two dc voltage sources.

SUMMARY OF THE INVENTION

However, the use of a dc-dc converter tends to increase the size of the system, the manufacturing cost, and loss.

It is an object of the present invention to provide apparatus and/or process suitable for reducing the system size, cost and loss in inverter and motor.

According to one aspect of the present invention, a power conversion system for converting a dc voltage to a pulsed ac voltage, comprises: a dc voltage source including a plurality of source terminals providing three or more electric potentials; a switching circuit arranged to connect one of the source terminals of the dc voltage source selectively to an output terminal of the switching circuit; and a controller configured to produce a pulsed ac output voltage at the output terminal from the potentials of the dc voltage source by controlling an on time for connecting each of the potentials of the dc voltage source to the output terminal.

According to another aspect of the invention, a power conversion process of driving an inductive load with a dc voltage source, comprises: allowing a current flow between the dc voltage source and the inductive load through a selected current path; and determining the selected current path by selecting one of first and second supply potentials of the dc voltage source including a plurality of voltage supplying devices connected together to provide three or more potentials.

According to still another aspect of the present invention, a power conversion apparatus, comprises: voltage supplying means for providing three or more electric potentials; and switching means for selecting one of the potentials, and for producing a pulsed ac output voltage from the potentials by controlling an on time for connecting each of the potentials for output.

BRIEF DESCRIPTION OF THE DRAWINGS

FIG. 10 is a view showing a table showing switching operations to produce the power flows shown in FIG. 4.

FIG. 24 is a view illustrating current flows in the system of FIG. 12 when the switch for the highest potential is ON.

FIG. 25 is a view illustrating current flows in the system of FIG. 12 when the switch for the second highest potential is ON.

FIG. 26 is a view illustrating current flows in the system of FIG. 12 when the switch for the lowest potential is ON.

FIGS. 27 (27A, 27B and 27C) is a view illustrating output voltage waveforms in the U phase of the system of FIG. 11.

FIG. 28 is a view illustrating the states of gate control signals for IGBTs in the U phase switching section of the system of FIG. 11.

DETAILED DESCRIPTION OF THE INVENTION

First Embodiment

Figure 1:
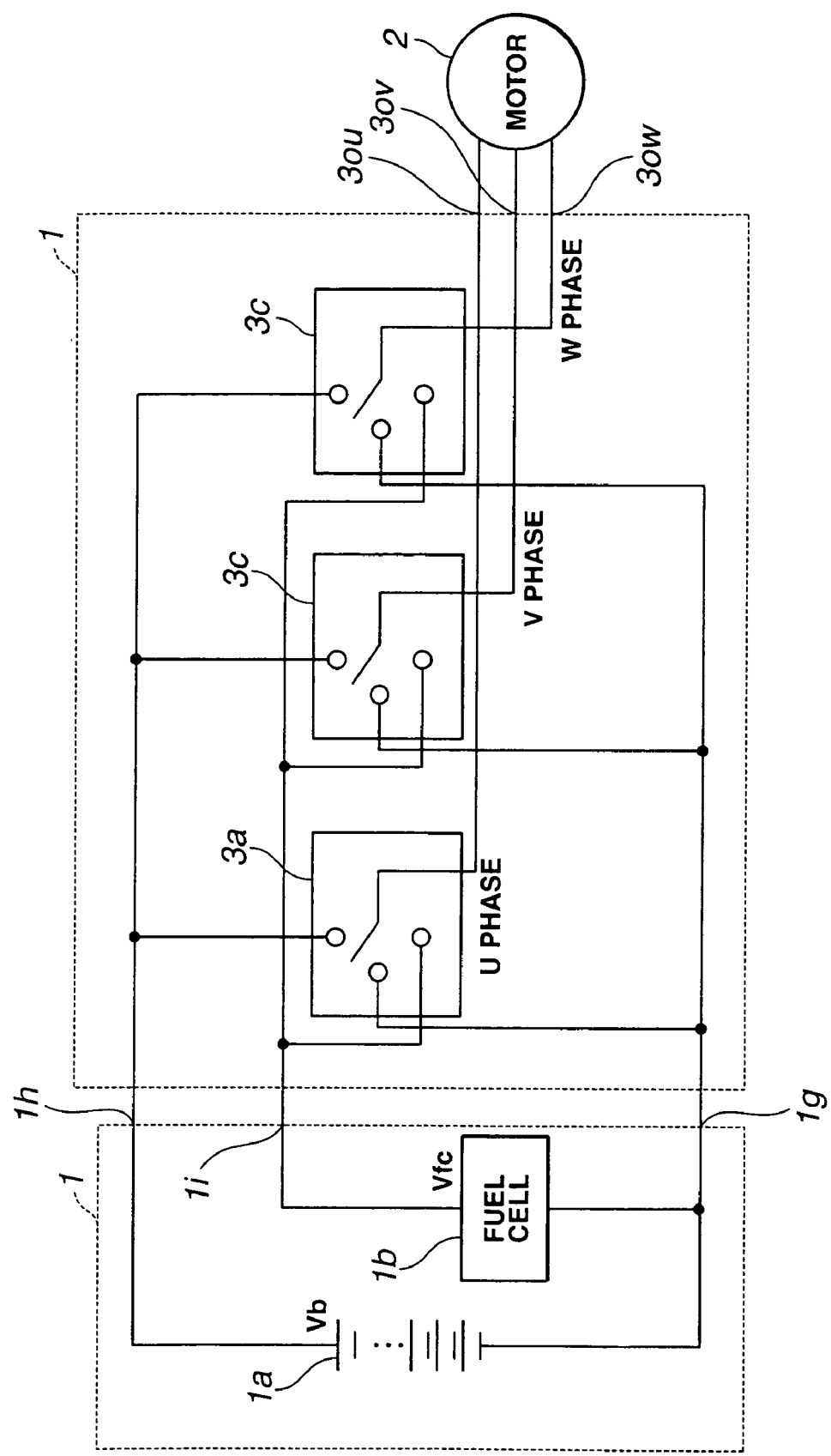
FIG. 1 is a circuit diagram showing a power conversion system (motor drive system) according to a first embodiment of the present invention.

FIG. 1 shows a power converting apparatus or power conversion system according to a first embodiment of the present invention. The power conversion system of the example shown in FIG. 1 is a motor drive system. The motor drive system of FIG. 1 is composed of a multi-output dc power source (or voltage source) 1, a motor 2 (a load) and a power converter (or switching circuit) 3. The dc power (or voltage) source 1 of this example includes a first dc power (or voltage) source (or first dc voltage supplying section) 1a which is a secondary battery in the example of FIG. 1, and a second dc power (or voltage) source (or second dc voltage supplying section) 1b which is a fuel cell device or unit in the example of FIG. 1. Power converter 3 produces a voltage to be applied to motor 2 from a source voltage of dc power source 1.

Multi-output dc power source 1 includes three terminals; a first source terminal (common or ground terminal) 1g (serving as a reference terminal), a second source terminal (first supply terminal or higher potential supply terminal) 1h and a third source terminal (second supply terminal or intermediate potential supply terminal) 1i. In the example of FIG. 1, the negative electrodes (lower potential electrodes) of battery 1a and fuel cell device 1b are connected together to the common terminal 1g for providing a ground (GND) potential (or lower potential). The positive electrode (higher potential electrode) of battery 1a is connected to the first supply terminal 1h for providing a battery supply potential Vb (higher potential). The positive electrode of fuel cell device 1b is connected to the second supply terminal 1i for providing a fuel cell supply potential Vfc (intermediate potential). Motor 2 of this example is a three-phase ac motor driven by ac voltages produced by power converter 3.

Figure 2:
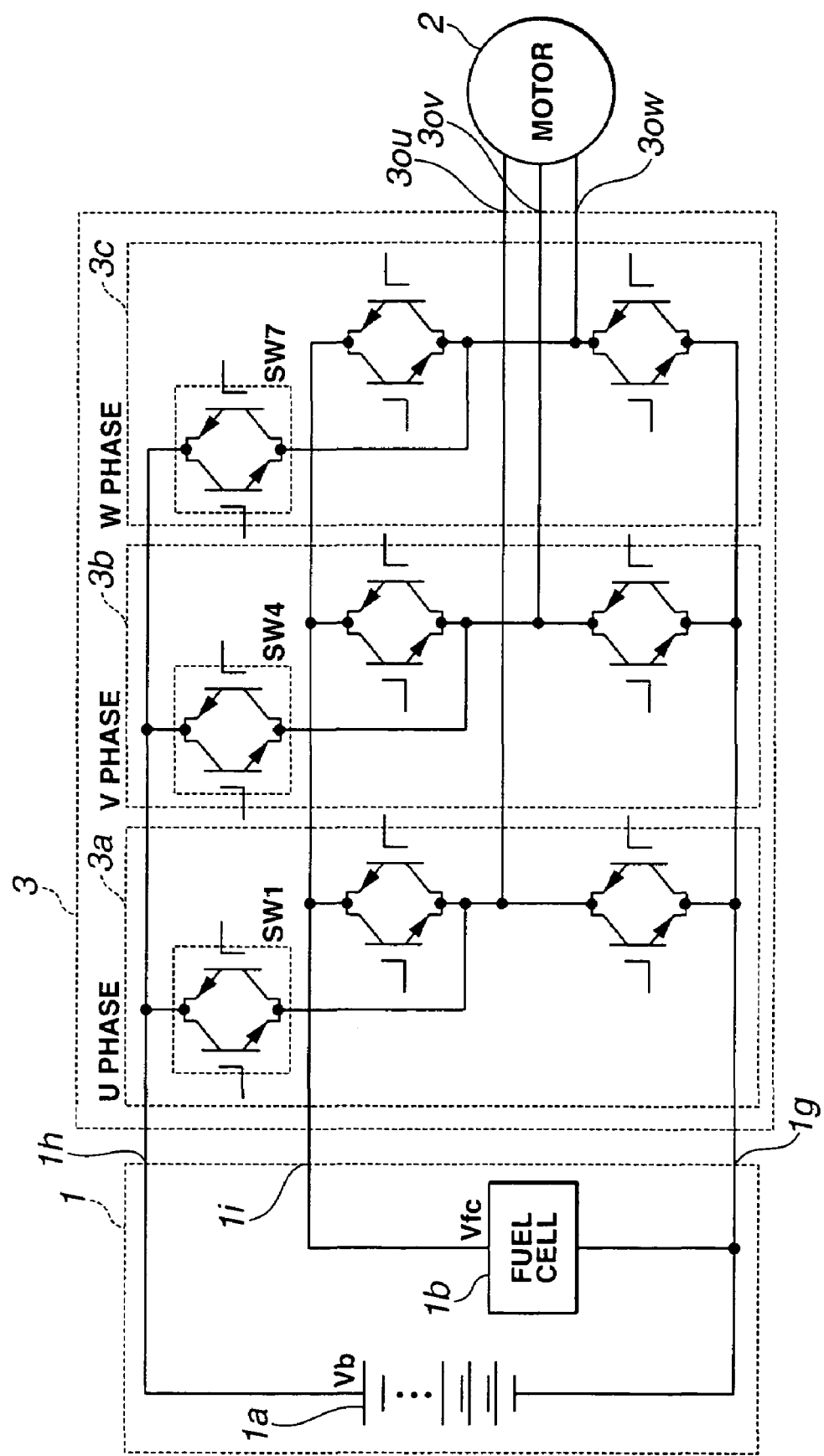
FIG. 2 is a circuit diagram showing the power conversion system of FIG. 1 more in detail.

Power converter 3 is a dc-ac power converter producing motor driving voltages from the dc voltages of the three potentials provided by multi-output dc power source 1. Power converter 3 includes a switching circuit composed of a U phase switching circuit section 3a, a V phase switching circuit section 3b and a W phase switching circuit section 3c which are identical in construction to one another, as shown in FIGS. 1 and 2. The U phase switching circuit section 3a, taken as an example, is a switch or switch arrangement for producing a voltage applied to the U phase of motor 2 by selectively connecting one of the three potentials GND, Vfc and Vb to a converter output terminal 3ou connected to the U phase of motor 2 so that the percentages of on times of the three potentials are controlled to obtain a desired motor driving voltage. The voltage produced by V phase switching circuit 3b is applied, through a converter output terminal 3ou, to the U phase of motor 2, and the voltage produced by W phase switching circuit section 3c is applied, through a converter output terminal 3ow, to the W phase of motor 2. V phase switching circuit section 3b and W phase switching circuit section 3c are constructed and operated in the same manner as U phase switching circuit section 3a.

FIG. 2 shows the switching arrangement of power converter 3 more in detail. Each of the U-phase, V-phase and W-phase switching circuit sections 3a, 3b and 3c includes first, second and third switching devices which are bidirectional switches in this example. A controller (not shown in FIGS. 1 and 2) controls the on and off conditions (and current directions) of these switching devices by producing switch control signals in such a manner that any one of the three switching devices in each phase is turned on.

Power converter 3 performs two functions. First, power converter 3 produces a voltage to drive motor 1 by using the three potentials of dc voltage source 1. Second, power converter 3 controls a power supply quantity of battery 1a (that is, a quantity of electric power supplied from battery 1a) and a power supply quantity of fuel cell device 1b (that is a quantity of electric power supplied from fuel cell device 1b). As to the first function, power converter 3 produces an ac voltage required for driving motor 2 in accordance with a motor operating point, from the three level dc voltages by PWM control.

The second function is characteristic of this embodiment. It is advantageous to control the percentages or proportions of the power supply quantities of battery 1a and fuel cell device 1b freely in a power running operation mode of motor 2, in view of the efficiency and the response characteristic of the fuel cell device. Moreover, in the case of a regenerative operation mode, it is important to prevent regenerative power from being returned to fuel cell device 1b. Each division or switching circuit section of power converter 3 shown in FIG. 2 is arranged to control the proportion of the power supply quantity from battery 1a and the proportion of the power supply quantity from fuel cell device 1b by controlling the proportion of the time in which the battery potential Vb is connected to converter output terminal 3o (3ou, 3ov or 3ow) and the proportion of the time in which the fuel cell potential Vfc is connected to the converter output terminal. In the regenerative operation mode, the converter output terminal 3o (3ou, 3ov or 3ow) in each phase is connected to either of the GND terminal and the supply terminal of battery 1a, and not connected to the supply terminal of fuel cell device 1b. Thus, converter 3 can prevent power from being returned to fuel cell device 1b, and produce a desired voltage by controlling the on periods for connection to Vb and GND.

Figure 4:
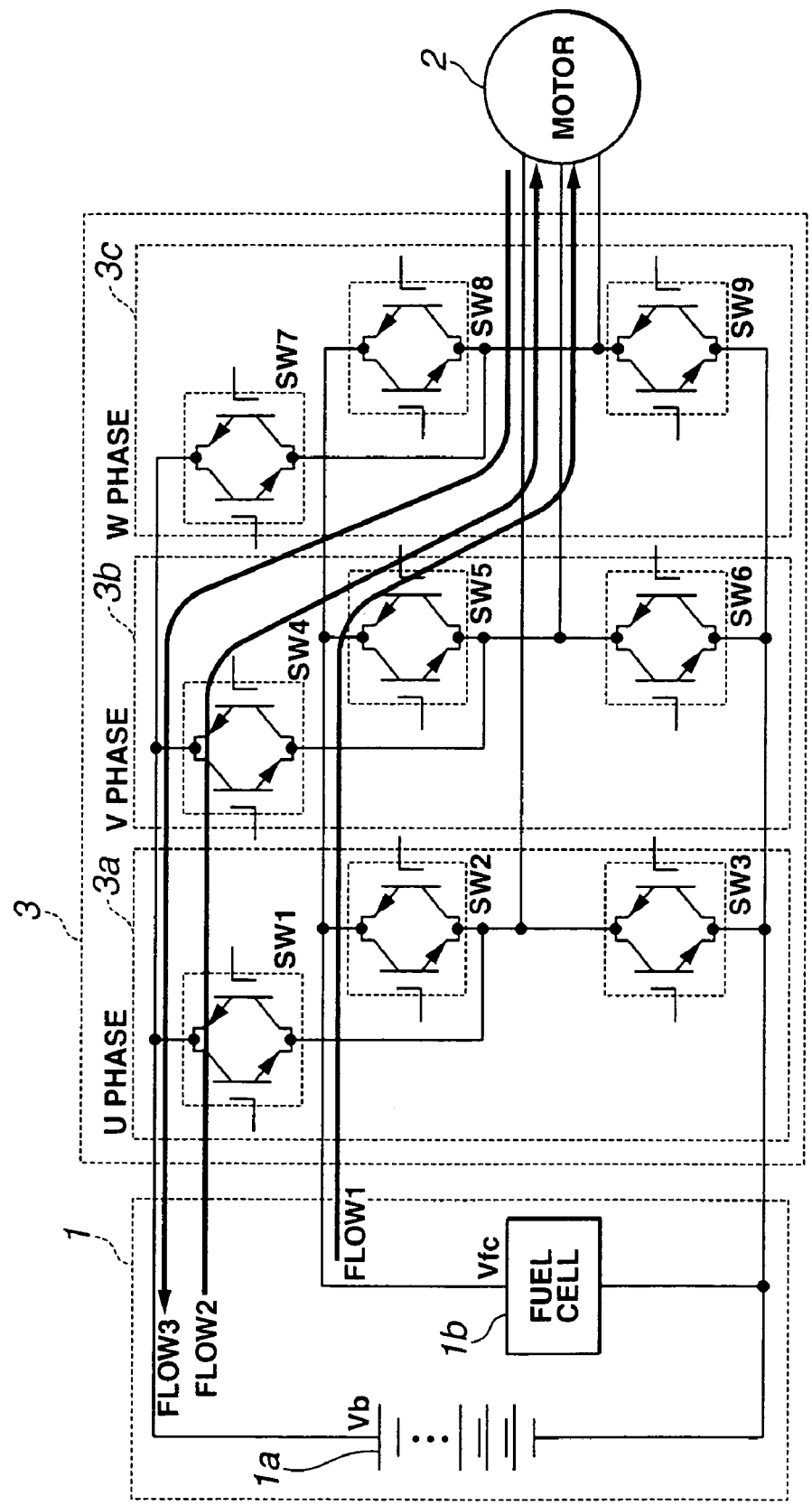
FIG. 4 is a view for illustrating power flows in the power conversion system of FIG. 2.

FIGS. 4 and 10 illustrate the flow of power in the power conversion system according to the first embodiment. In FIG. 4, an arrow of FLOW1 is a flow of power supplied from fuel cell device 1b to motor 2; an arrow of FLOW2 is a flow of power supplied from battery 1a to motor 2; and an arrow of FLOW3 is a flow of power supplied from motor 2 to battery 1a.

Figure 11:
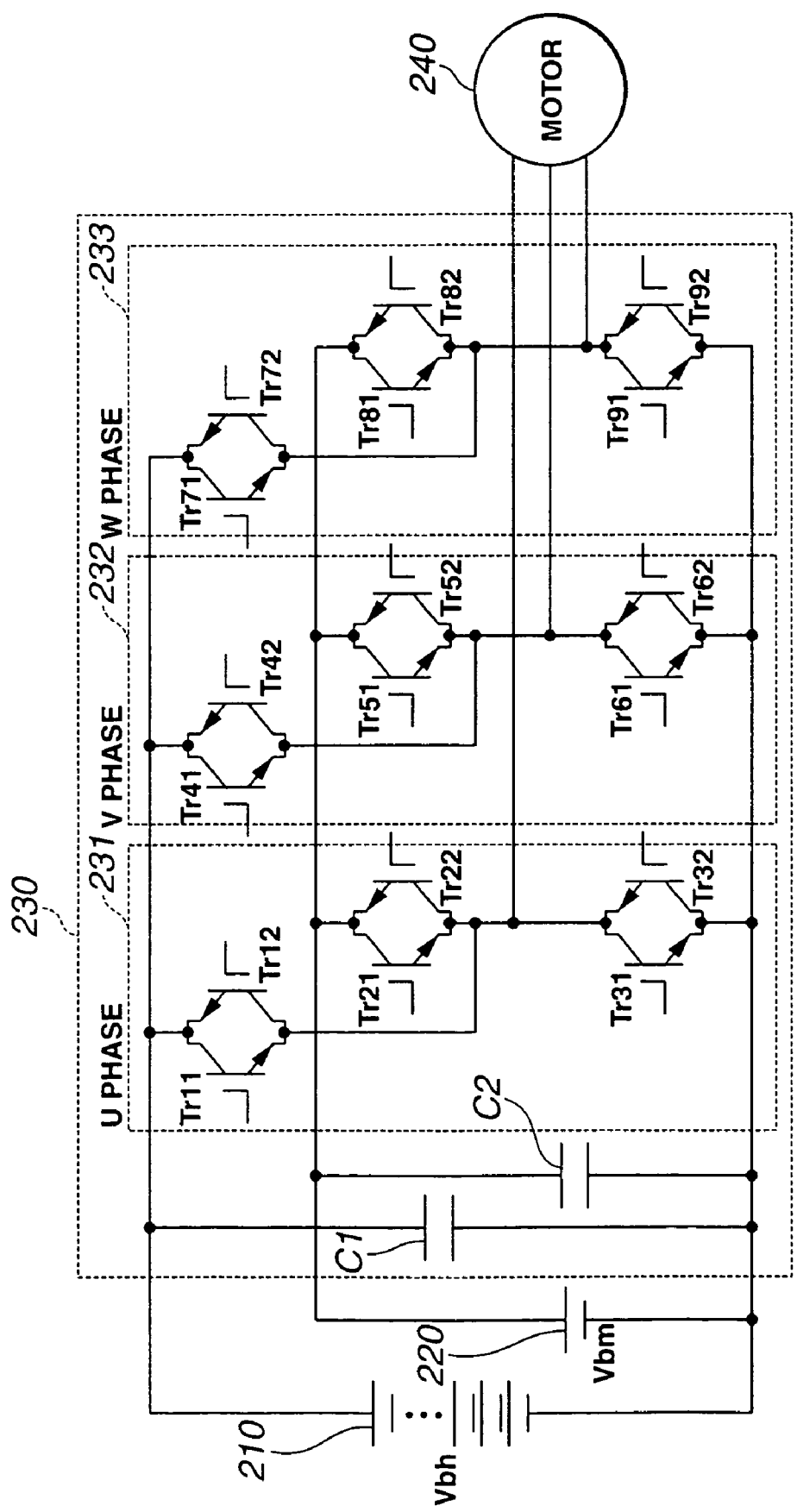
FIG. 11 is a circuit diagram showing a power conversion system according to a seventh embodiment.

In the case of the power running mode of motor 2, the conversion system can achieve FLOW1; FLOW2; FLOW1 and FLOW2; and FLOW1 and FLOW3, as shown in FIG. 4. In the case of the regenerative mode, the system can achieve FLOW3; and FLOW1 and FLOW3. FIG. 11 shows the switch on/off states to achieve these flows of power. In FIG. 10, X and $\overline{X}$ indicate the opposite switch states so that if one is ON, then the other is OFF. In FIG. 11, "ONE IS ON" means "any one is ON". In order to achieve the power flow of FLOW 1 in the power running mode, for example, the power converter 3 is driven so that the first switch SW1, SW4 or SW7 connected with the buttery potential supply terminal (Vb) in each phase is OFF, and the second and third switches (SW2 and SW3 in U phase; SW 5 and SW6 in V phase; or SW8 and SW9 in W phase) are put in the opposite states so that one of the second and third switches is ON and the other is OFF. Similarly, in order to achieve FLOW1 and FLOW2 in the power running mode simultaneously to supply electric power from both of battery 1a and fuel cell unit 1b to motor 2 in the power running mode, only one of the first, second and third switches in each phase is turned ON. In this case, by controlling the proportion (or percentage) of the on time of first switch (SW1 in the case of U phase) and the proportion (or percentage) of the on time of second switch (SW2 in the case of U phase), the power conversion system can control the proportion of the power supply quantity through FLOW1 and the proportion of the power supply quantity through FLOW2. The conversion system can control the flow of power merely by using the switch operations shown in FIG. 10. In the regenerative mode, the conversion system can control the power flow similarly. In the case of the regenerative flow, the conversion system controls the switches so as to prevent a return flow of power into fuel cell unit 1b. Therefore, there is no need for providing a diode between fuel cell device 1b and power converter 3.

Figure 3:
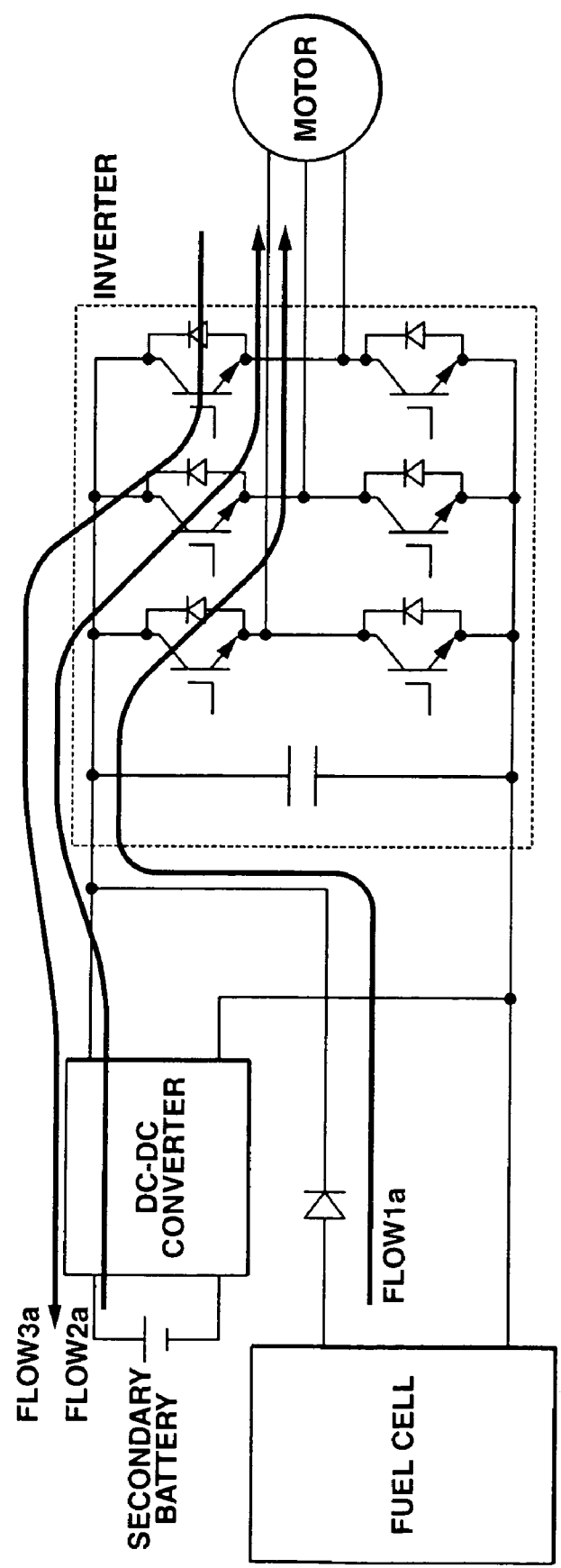
FIG. 3 is a view for illustrating power flows in a power conversion system of earlier technology using a dc-dc converter.

FIG. 3 shows power flows in a comparative example in which a battery is connected, through a dc-dc converter, in parallel with a fuel cell unit. In FIG. 3, FLOW1a, FLOW2a and FLOW3a correspond, respectively, to FLOW1, FLOW2 and FLOW3. In the case of the comparative example of FIG. 3, a diode is disposed in the path of FLOW1a whereas no diode is involved in the path of FLOW1 in the embodiment shown in FIG. 4. Therefore, the conversion system of FIG. 4 according to the embodiment can reduce the power loss. Moreover, the conversion system of FIG. 4 can achieve FLOW1 and FLOW2 without the need of dc-dc converter, whereas the system of FIG. 3 includes the dc-dc converter. Therefore, the conversion system of FIG. 4 can further reduce the loss, and reduce the size and const of the conversion system.

The power conversion system according to the first embodiment can control the quantities of power flows to and from the battery and the fuel cell device, simply by switching the connection of three potentials with the output to the motor, with requiring no dc-dc converter. Therefore, the size and cost of the system can be reduced significantly. By converting the battery voltage directly without using the dc-dc converter, the conversion system according to the first embodiment can reduce the loss in power supplied from the battery to the motor. Furthermore, the power conversion system according to the first embodiment does not require a diode for parallel connection of the battery and fuel cell device, so that the power loss is further reduced.

Second Embodiment

Figure 5:
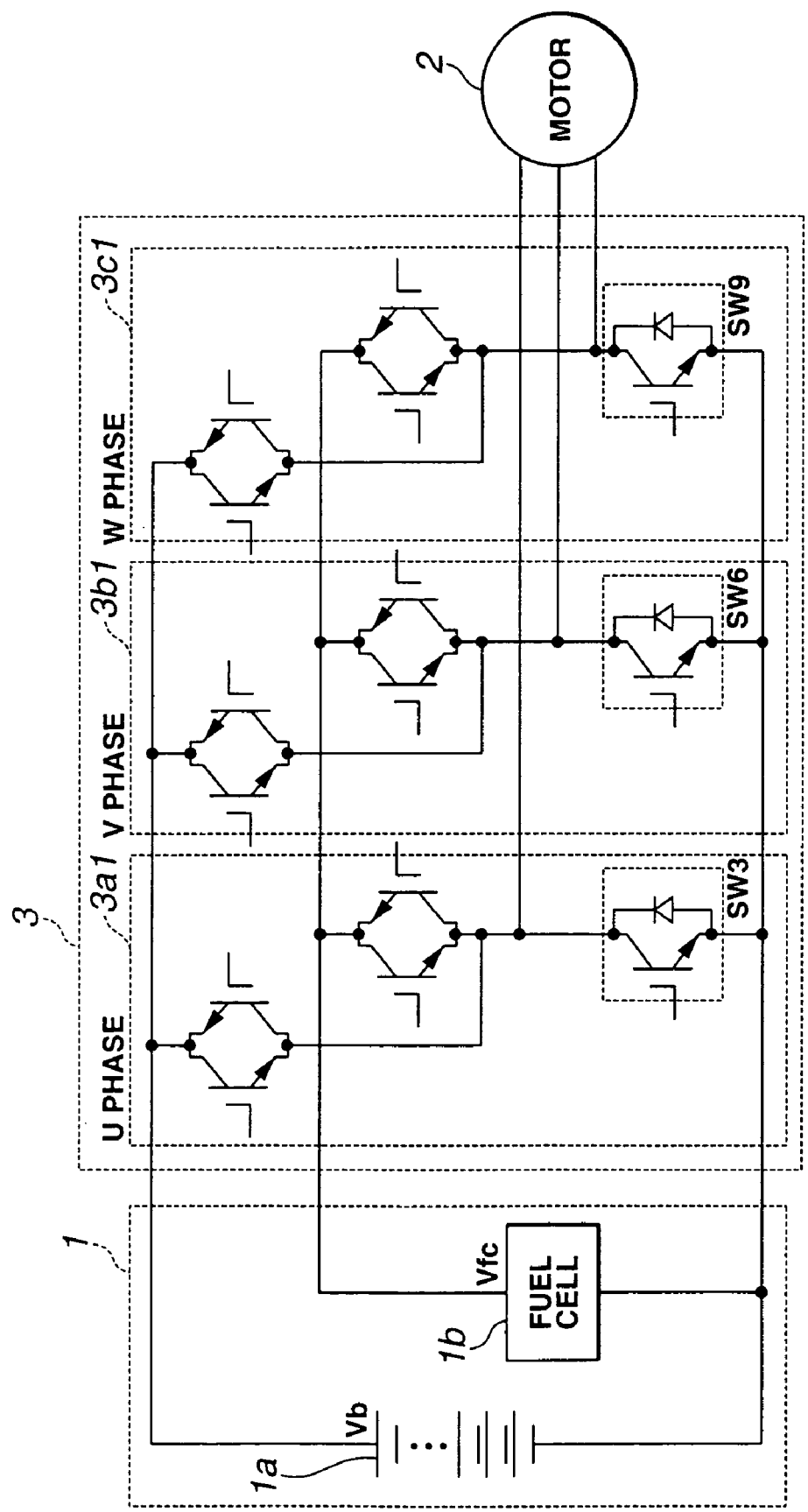
FIG. 5 is a circuit diagram showing the power conversion system according to a second embodiment.

FIG. 5 shows a power conversion system (motor drive system) according to a second embodiment of the present invention. The power conversion system shown in FIG. 5 is different from the system shown in FIG. 2 only in the lower potential connecting switches SW3, SW6 and SW9 connected with the lower potential supply terminal or common terminal (GND) in three switching circuit sections 3a1, 3b1 and 3c1 for the three phases. The lower potential connecting switch SW3, SW6 or SW9 in each phase includes a parallel combination of an active element capable of conducting only in a direction to the GND potential, and a diode capable of conducting in the opposite direction. This arrangement is feasible because the potential of the GND terminal is always the lowest among the three potentials (GND, Vb and Vfc) provided by dc voltage source 1. In the second embodiment, the lower potential connecting switch SW3, SW6 or SW9 employs a diode, so that the circuit configuration is simplified, and it is possible to reduce the loss and cost. In the second embodiment, each of the other switches SW1, SW2, SW4, SW5, SW7 and SW8 is a bidirectional switch capable of actively controlling on and off states in both directions. In the example shown in FIG. 5, each of these bidirectional switches includes a pair of transistors as shown in FIG. 5.

Third Embodiment

Figure 6:
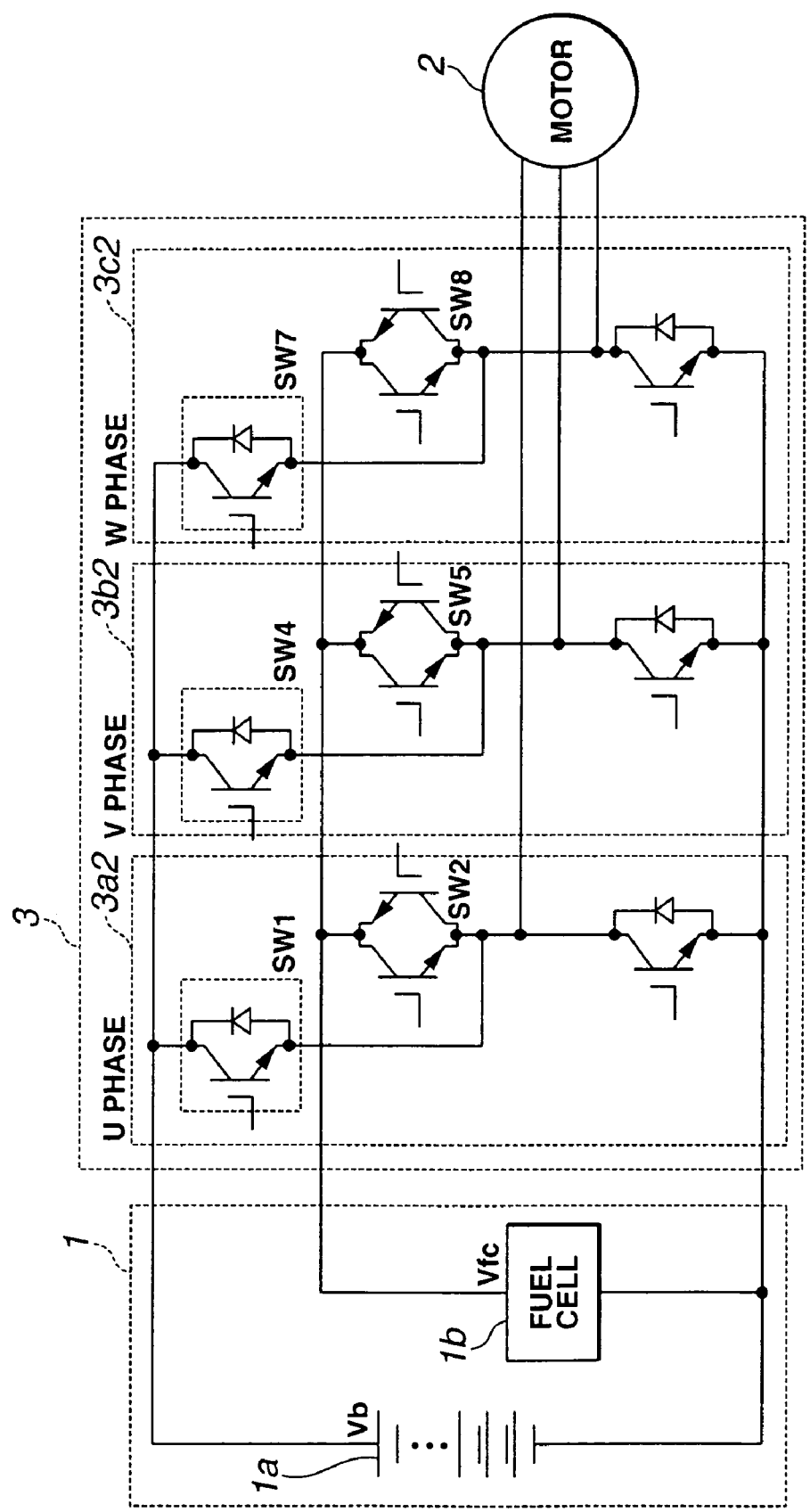
FIG. 6 is a circuit diagram showing a power conversion system according to a third embodiment.

FIG. 6 shows a power conversion system (motor drive system) according to a third embodiment of the present invention. The power conversion system shown in FIG. 6 is different from the system shown in FIG. 5 only in the higher potential connecting switches SW1, SW4 and SW7 connected with the higher potential supply terminal (Vb) on the upper side as viewed in FIG. 6. The higher potential connecting switch SW1, SW4 or SW7 in each phase includes a parallel combination of an active element capable of conducting only in a direction flowing from battery 1a into power converter 3, and a diode capable of conducting in the opposite direction. This arrangement can ensure the path flowing from the motor to the storage battery reliably with the diodes, and protect the power devices such as switching devices from being damaged by over-current though there is formed no path for returning to fuel cell device 1b. When the intermediate switches SW2, SW5 and SW8 are turned on in the state in which the fuel cell supply voltage Vfc is higher than the batter voltage Vb (Vfc>Vb), current flows from the fuel cell device to the battery through these switches and the diodes. Therefore, the conversion system can prevent the battery voltage Vb from being lowered too much from the fuel cell voltage Vfc.

Fourth Embodiment

Figure 7:
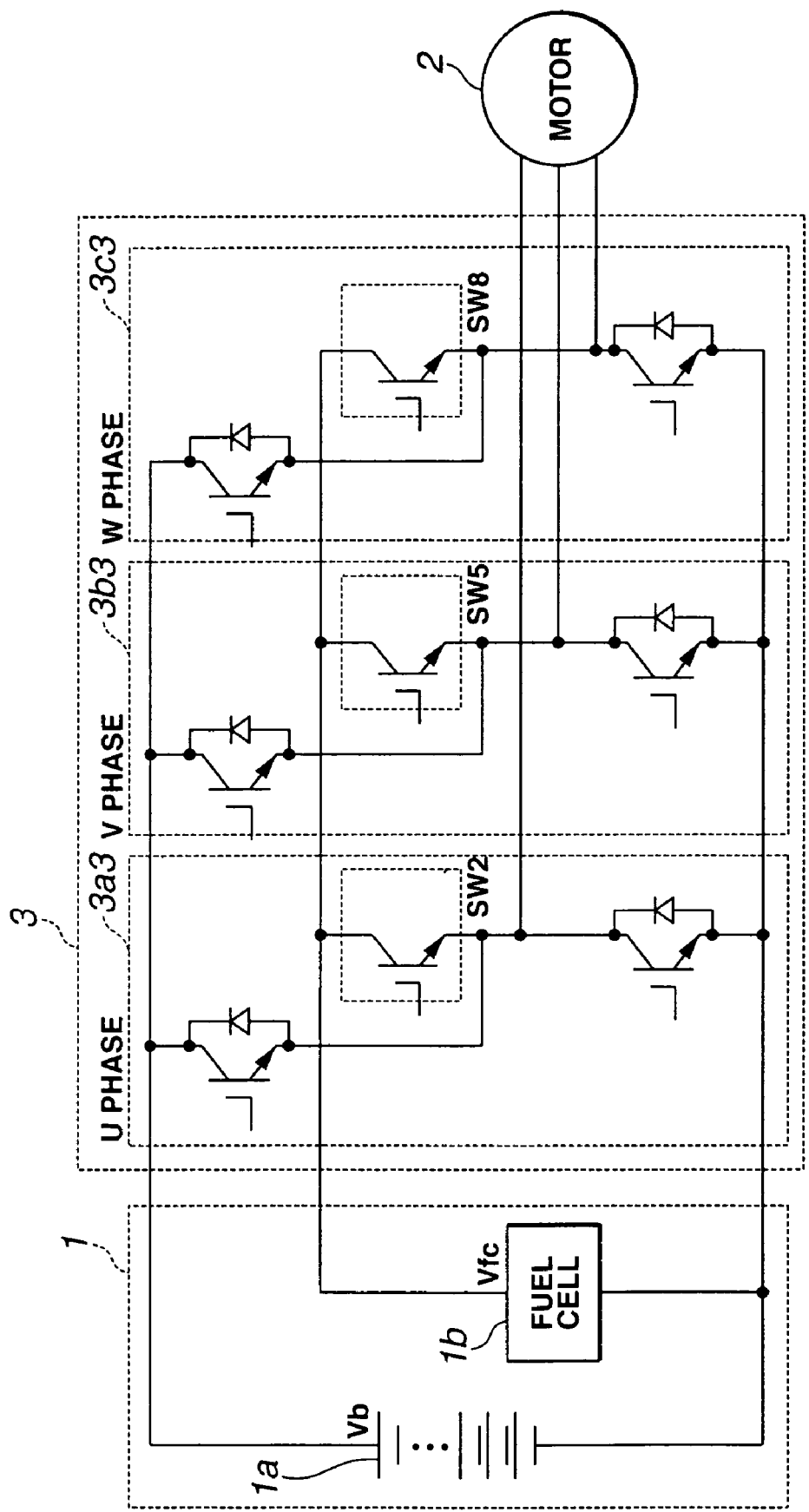
FIG. 7 is a circuit diagram showing a power conversion system according to a fourth embodiment.

FIG. 7 shows a power conversion system (motor drive system) according to a fourth embodiment of the present invention. The power conversion system shown in FIG. 7 is different from the system shown in FIG. 6 only in the intermediate potential connecting switches (or fuel cell potential connecting switches) SW2, SW5 and SW8 connected with the intermediate potential supply terminal (or fuel cell potential supply terminal) (Vfc) at the intermediate level between the upper and lower sides as viewed in FIG. 7. The fuel cell potential connecting switch SW2, SW5 or SW8 in each phase includes a active element capable of conducting only in a direction flowing from fuel cell device 1b into power converter 3. Each fuel cell potential connecting switch SW2, SW5 or SW8 is composed of a transistor which, in this example, is an IGBT often used as a power device for an inverter. This arrangement can reliably prevent current flow into the fuel cell device 1b which is incapable of receiving regenerative power. This arrangement does not require a diode between the fuel cell device and the power converter unlike the arrangement of the comparative example shown in FIG. 3. Therefore, the power conversion system according to this embodiment can eliminate the loss due to the existence of a diode. The power conversion system according to the fourth embodiment is designed to protect the fuel cell device by preventing a returning flow of power into the fuel cell device satisfactorily. In the case of the circuit configuration of FIG. 6 according to the third embodiment, there is formed a path for returning to the fuel cell device. However, the power conversion system according to the third embodiment is advantageous in smoothness in the on/off switch control. Moreover, the power conversion system according to the third embodiment can prevent a returning flow into the fuel cell device by controlling the on/off states of the switches despite the existence of the return path to the fuel cell device.

Fifth Embodiment

Figure 8:
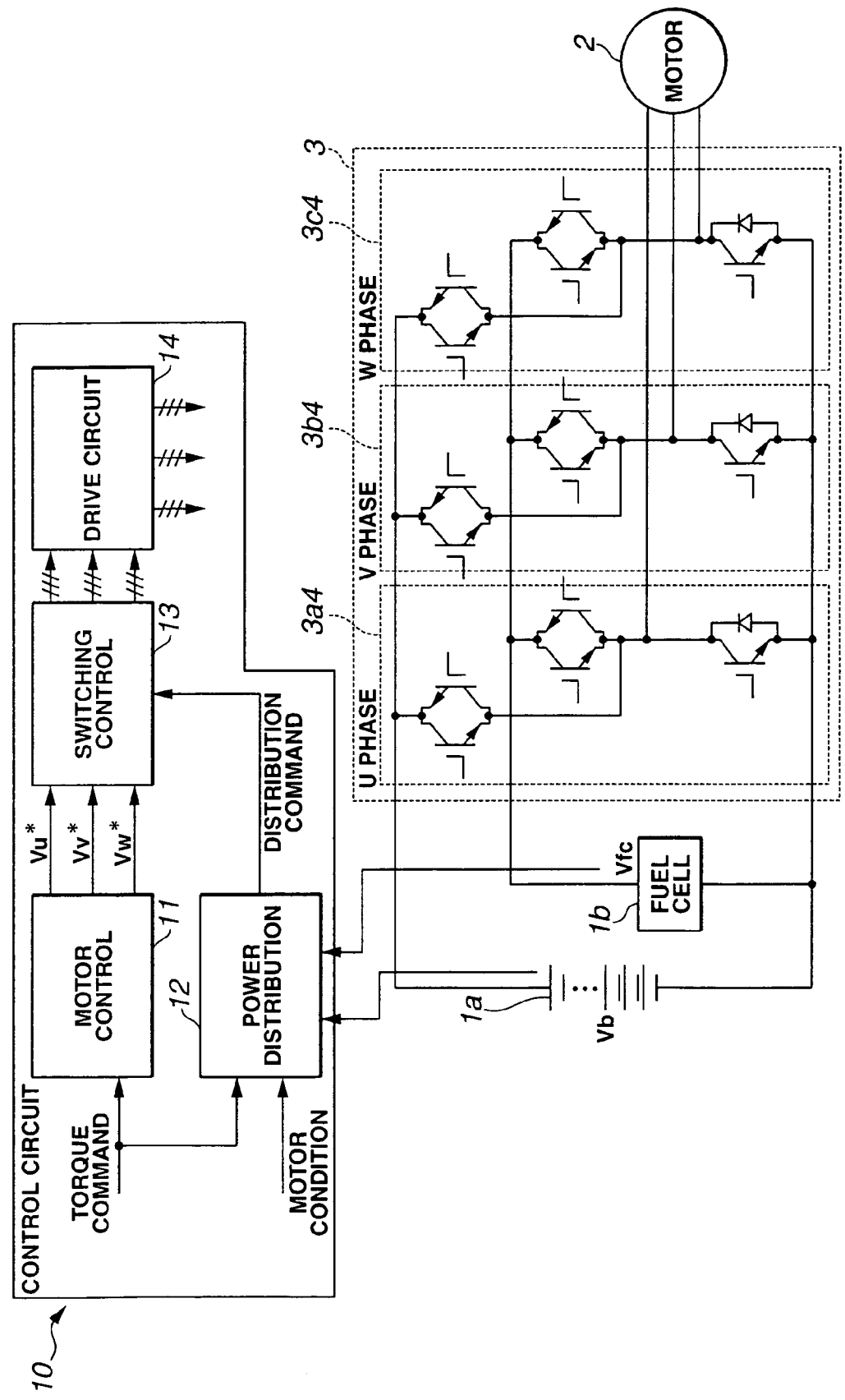
FIG. 8 is a diagram showing a power conversion system including a control unit according to a fifth embodiment.

FIG. 8 shows a power conversion system (motor drive system) according to a fifth embodiment of the present invention. The power conversion system shown in FIG. 8 includes a control circuit or controller 10, in addition to the multi-output dc power source 1, the load in the form of motor 2, and power converter 3.

FIG. 8 shows the controller 10 in the form of a functional block diagram. Controller 10 of the example shown in FIG. 8 includes a motor control section 11, a power distribution determining section 12, a switching control section 13 and a drive section or circuit 14. Motor control section 11 calculates command motor voltages (Vu*, Vv*, Vw*) required to produce a torque represented by a motor torque command received from the outside.

Power distribution determining section 12 determines a proportion of power Pfc to be supplied from fuel cell device 1b and a proportion of a power Pb to be supplied from battery 1a, in accordance with a battery voltage Vb of battery 1a and a fuel cell voltage Vfc of fuel cell device 1b, in addition to a parameter representing a motor operating condition such as motor torque command or a motor rotational speed; and produces an electric power distribution command. In producing the power distribution command, the controller monitors an operating condition of motor 2, and takes account of the efficiency as to which source between battery 1a and fuel cell device 1b is more efficient as a power source for driving motor under the motor operating condition. Switching control section 13 receives the command motor voltages (Vu*, Vv*, Vw*) from motor control section 11, and the distribution command from power distribution determining section 12, and produces a PWM pulse voltage signals from the command motor voltages in accordance with the distribution command. Drive section 14 drives the switches of power converter 3 in accordance with the PWM pulse voltage signals.

The power conversion system according to the fifth embodiment can control the power supply percentages from the battery (Pb) and the fuel cell device (Pfc) by applying pulsed voltages to motor 2, as in the preceding embodiment. In the fifth embodiment, the power conversion system varies the distribution of power supplies between battery 1a and fuel cell device 1b, in accordance with the voltage Vb of battery 1a and the voltage Vfc of fuel cell device 1b. By so doing, the motor drive system can optimize the distribution of power supplies in accordance with the conditions of fuel cell device 1b and battery 1a as well as the motor condition. It is possible to combine the controller 10 shown in FIG. 8 with any of the power converters according to the preceding embodiments.

Sixth Embodiment

Figure 9:
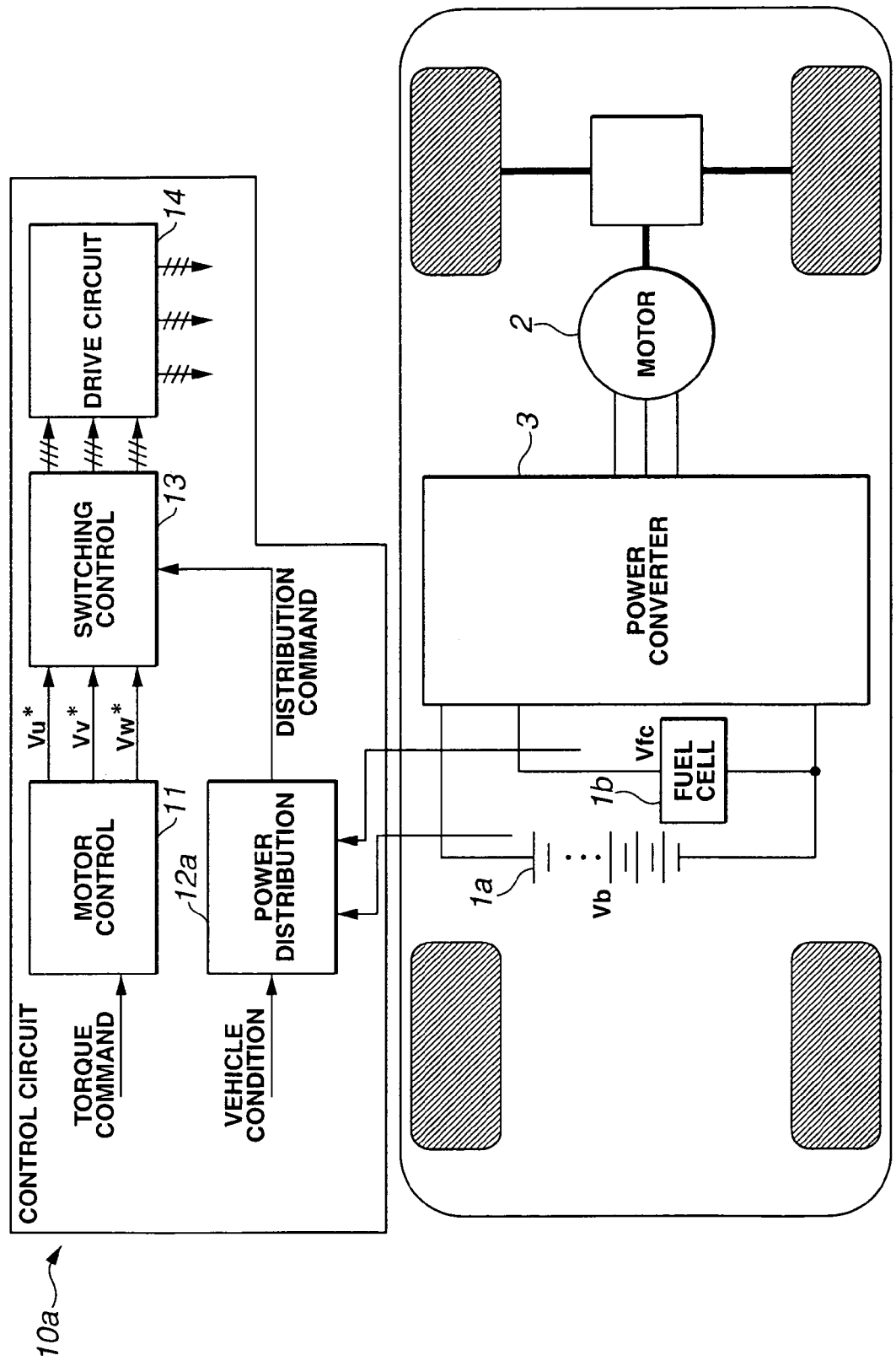
FIG. 9 is a view showing a vehicle equipped with a power conversion system according to a sixth embodiment.

FIG. 9 shows a power conversion system (motor drive system) according to a sixth embodiment. The power conversion system of FIG. 9 is a vehicle drive system for a fuel cell vehicle. In a vehicle having a motor as a prime mover, and an electric power source including a fuel cell unit and a battery, the control of power of the fuel cell device and battery is important in view of the efficiency and response. Moreover, the size of the system is important in the limited space of a vehicle. It is possible to employ, as power converter 3, any of the power converter configurations according to the preceding embodiments. The vehicle motor drive system of the sixth embodiment can control the distribution of power supplies between the fuel cell device and battery flexibly, without requiring a dc-dc converter. Therefore, the system can improve the efficiency and response, and reduce the size and cost. Since the loss is reduced, it is possible to reduce the size of a cooling system.

A controller 10a of FIG. 9 is different from controller 10 of FIG. 8 in a power distribution determining section 12a. Power distribution determining section 12a shown in FIG. 9 is arranged to receive a vehicle condition as well as other information. The vehicle condition is a parameter such as a vehicle speed or a longitudinal vehicle acceleration, relating to energy variation of the vehicle. It is optional to estimate a value of such a parameter from the motor condition. However, power distribution determining section 12a shown in FIG. 9 is arranged to determine the value of the vehicle energy relating parameter from a vehicle condition sensor or a controller of a vehicle control system. Thus, the controller 10a can estimate the kinetic energy of the vehicle and the variation of the kinetic energy more accurately, and determines the commands for the output power Pb for battery 1a and the output power Pfc for fuel cell device 1b adequately.

In the preceding embodiments, it is optional to employ a capacitor as a device for storing electricity instead of battery 1a.

Seventh Embodiment

FIG. 11 shows a power conversion system (motor drive system) according to a seventh embodiment. The power conversion system of FIG. 11 employs a three-phase, three-level, all bidirectional switching type converter configuration. As shown in FIG. 11, a dc voltage source is composed of first and second batteries 210 and 220. The lower voltage sides of first and second batteries 210 and 220 are connected together to provide a common potential. Therefore, the dc voltage source provides three different potentials. The voltage Vbh of first battery 210 is higher than the voltage Vbm of second battery 220. Moreover, the difference Vbh−Vbm is greater than Vbm. That is: Vbh>Vbm and Vbh−Vbm>Vbm.

A power converter 230 is a dc-ac power converter arranged to produce an ac voltage for driving an ac motor 240, from the dc voltages of the three potentials provided by the dc power source. Power converter 230 of FIG. 11 includes a first capacitor C1 for stabilizing the supply voltage Vbh of first battery 210, and a second capacitor C2 for stabilizing the supply voltage Vbm of second battery 220. Power converter 230 further includes a switching circuit composed of a U phase switching circuit section 231, a V phase switching circuit section 232 and a W phase switching circuit section 233 which are identical in construction to one another, as shown in FIG. 11. Each circuit section 231, 232 or 233 is a switch group or switch arrangement. For example, the U phase switching circuit section 231 is a switch arrangement for selectively connecting only one of the common potential voltage (referred to as 0V), the higher potential side voltage of first battery 210 and the higher potential side voltage of second battery 220 with the U phase of motor 2.

In the example shown in FIG. 11, the U-phase switching circuit section 231, as an example, includes a first bidirectional switch (or switching device) composed of two switching elements (transistors) Tr11 and Tr12 for making and breaking the connection between the U phase of motor 240 and voltage Vbh; a second bidirectional switch (or switching device) composed of two switching elements (transistors) Tr21 and Tr22 for making and breaking the connection between the U phase of motor 240 and voltage Vbm; and a third bidirectional switch (or switching device) composed of two switching elements (transistors) Tr31 and Tr32 for making and breaking the connection between the U phase of motor 240 and the common potential voltage. The example shown in FIG. 11 employs IGBT (power device) as switching element. Each of the combinations Tr11 and Tr12, Tr21 and tr22 and Tr31 and Tr32 acts in a pair as a bidirectional switch. These switches are controlled so that only one pair is turned on at a time, and any one of the three potential voltages Vbh, Vbm and 0V is applied to the U phase of motor 240. The switches for the U phase and W phase are constructed and operated in the same manner.

The power conversion system of FIG. 11 is operated to produce the voltage to be applied to motor 240 by regulating the percentages or proportions of the connection times (or on times) of the three potential voltages Vbh, Vbm and 0V to the motor, within a unit time interval or cycle. The connection time or on time of Vbh, for example, is a time length in which Vbh is connected with the motor in the unit time interval. FIGS. 27A, 27B and 27C are time chart for showing output voltage waveforms for the U phase. FIG. 28 shows the conditions of gate signals to the switching elements of IGBTs constituting the U phase switching circuit section.

A; when a motor application voltage can be produced from battery voltage Vbm without performing field weakening control: The conversion system performs PWM (pulse width modulation control or pulse duration modulation control) by holding the switch (Tr11 and Tr12 in U phase, for example) connected with Vbh in the off state, and turning on and off the switches (Tr21 and Tr22, and Tr31 and Tr32 in U phase) connected with Vbm and 0V alternately. In this case, the lower voltage Vbm is turned on and off as shown in FIG. 27A. Therefore, the system can reduce the loss in the power devices and reduce the loss in the switch arrangement 231. Moreover, the pulsed voltage applied to the motor is produced from the lower voltage Vbm. Therefore, a higher harmonic component is reduced and the iron loss is reduced in motor 240.

B; when the field weakening control is required in the case of Vbm, but the field weakening control is not required in the case of Vbh−Vbm: The conversion system performs PWM by holding the switch (Tr31 and Tr32 in U phase, for example) connected with 0V in the off state, and turning on and off the switches (Tr11 and Tr12, and Tr21 and Tr22 in U phase) connected with Vbh and Vbm alternately. In this case, the voltage Vbh−Vbm which is smaller than Vbh is turned on and off as shown in FIG. 27B. Therefore, the system can minimize the loss in the power devices and reduce the loss in the switch arrangement 231. Moreover, the pulsed voltage applied to the motor is produced from the voltage Vbh−Vbm. Therefore, a higher harmonic component is reduced and the iron loss is reduced in motor 240.

C; when the field weakening control is required in the case of Vbh−Vbm: The conversion system performs PWM by holding the switch (Tr21 and Tr22 in U phase, for example) connected with Vbm in the off state, and turning on and off the switches (Tr11 and Tr12, and Tr31 and Tr32 in U phase) connected with Vbh and 0V alternately (FIG. 29C). In this case, the field weakening current is low, and accordingly the system can reduce the loss in the switching circuit and motor. Thus, the power conversion system can produce pulsed voltage waveforms of three different sizes of Vbm, Vbh−Vbm and bh, and drive the motor adequately by selecting one from the three waveforms. When, unlike this embodiment, potentials are equally separated so that Vbh−Vbm=Vbm, the number of possible waveforms is only two, and hence it is not possible to reduce the loss sufficiently as compared to the embodiment. The power conversion system according to this embodiment can reduce the loss in the converter and motor even if the number of available potentials is the same.

Eighth Embodiment

Figure 12:
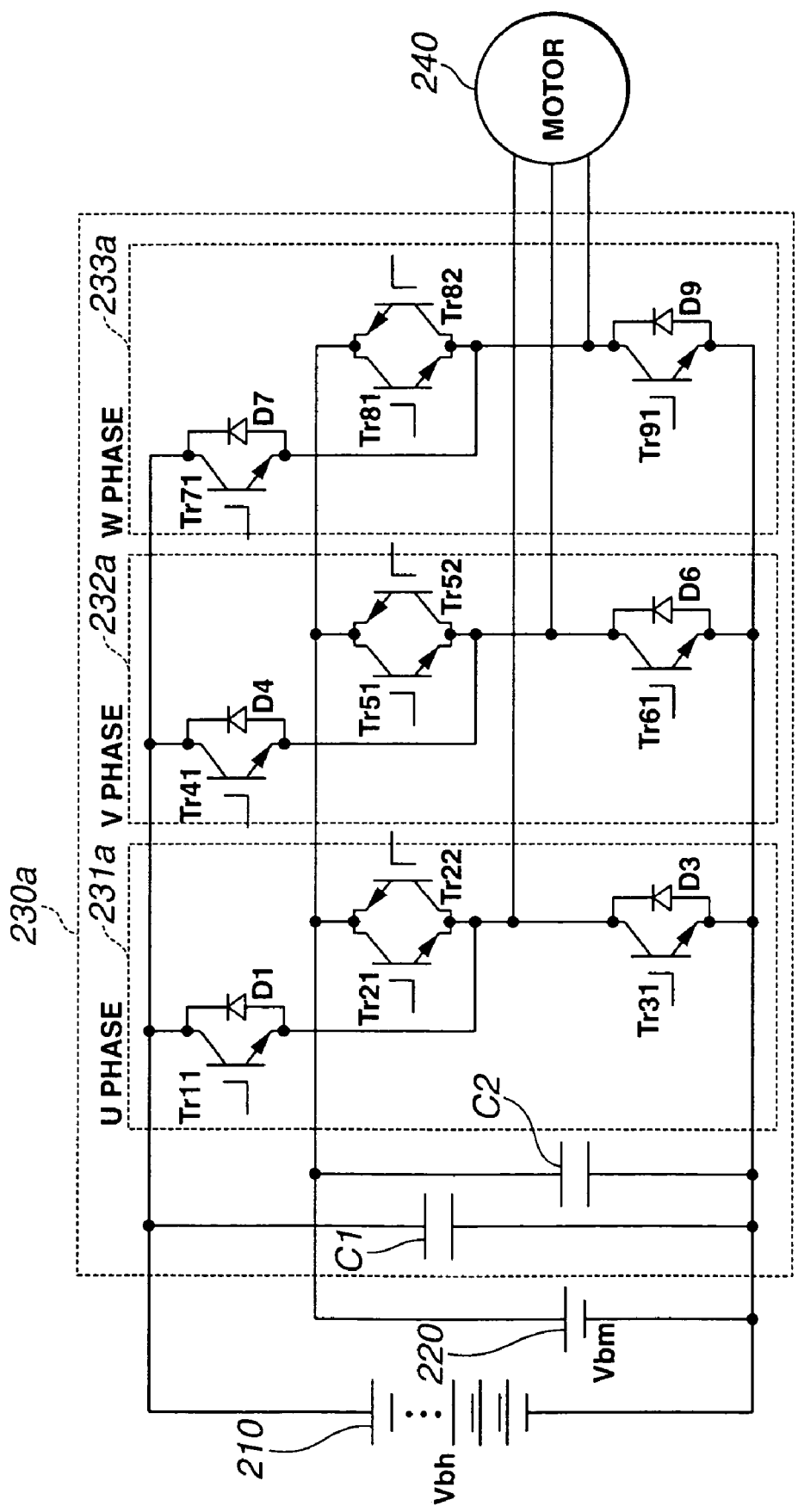
FIG. 12 is a circuit diagram showing a power conversion system according to an eighth embodiment.
Figure 13:
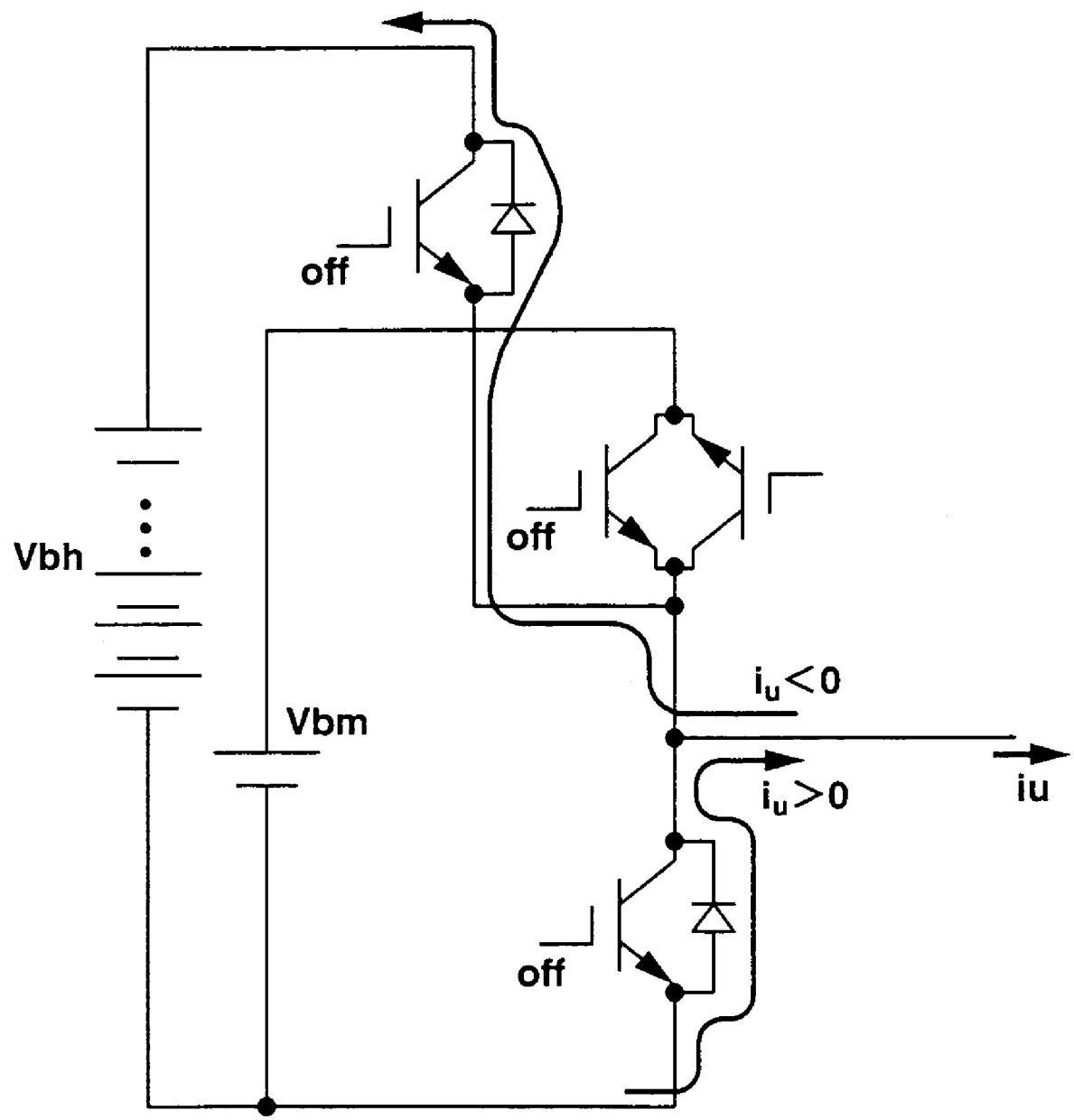
FIG. 13 is a circuit diagram for illustrating current flows in the system of FIG. 12 at the time of a dead time.

FIG. 12 shows a power conversion system according to an eighth embodiment. The power conversion system of FIG. 12 employs a three-phase, three-level, partly bidirectional switching type converter configuration. The power conversion system shown in FIG. 12 is different from the power conversion system of FIG. 11 only in the switches connected with Vbh and the switches connected with 0V in each of switching circuit sections 231a, 232a and 233a of a switching circuit 230a. In the other respects, the conversion system of FIG. 12 is identical to the system of FIG. 11.

In the U phase switching circuit section 231a as an example, the higher potential connecting switch connected with Vbh is composed of a transistor Tr11 of IGBT and a diode D1; and the lower potential connecting switch connected with 0V is composed of a transistor Tr31 of IGBT and a diode D3. Since Vbh is higher than Vbm, Tr12 and Tr32 shown in FIG. 11 are replaced by diodes D1 and D2, and the two switches are constructed as a reverse current switch. Whether a U phase current iu is positive or negative, the system can turn on one of Tr11, the pair of Tr21 and Tr22, and Tr31, and thereby apply the voltage of the potential connected with the turned-on switch to the U phase of motor

240. This embodiment requires only one bidirectional switch (power device) in each phase. Therefore, this embodiment can further reduce the loss of current and the cost since only one bidirectional switch is involved in each phase between the power source and motor.

Figure 25:
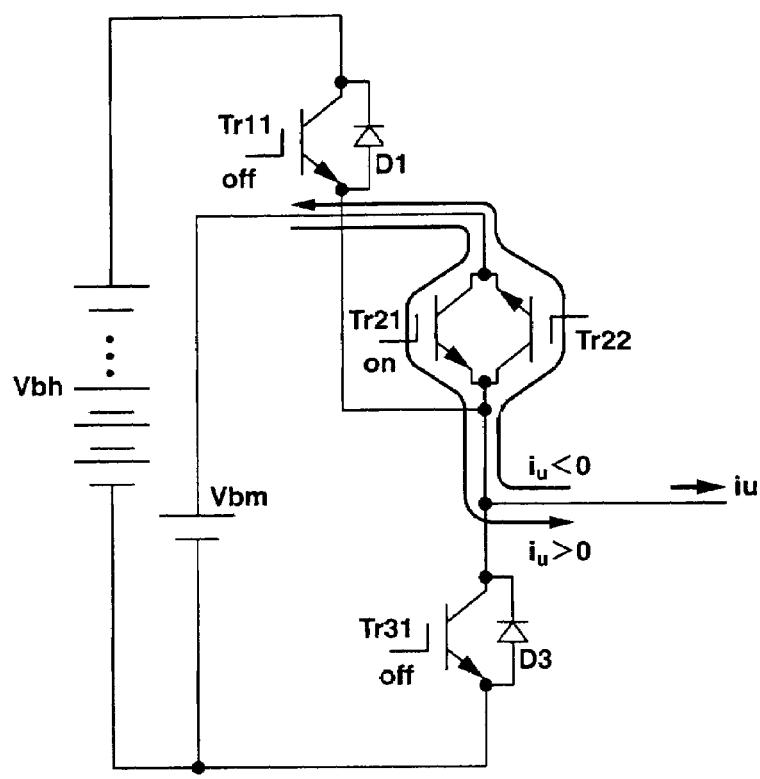

FIG. 25 is a diagram for illustrating current flows when the higher potential connecting switch (Tr11) is turned on. When Tr11 is on, Tr21 & T22 and Tr31 are turned off. When U phase current is positive (iu>0), current flows through Tr11. When U phase current is negative (iu<0), current flows through diode D1. Therefore, voltage Vbh is applied to the U phase of motor 240.

Figure 26:
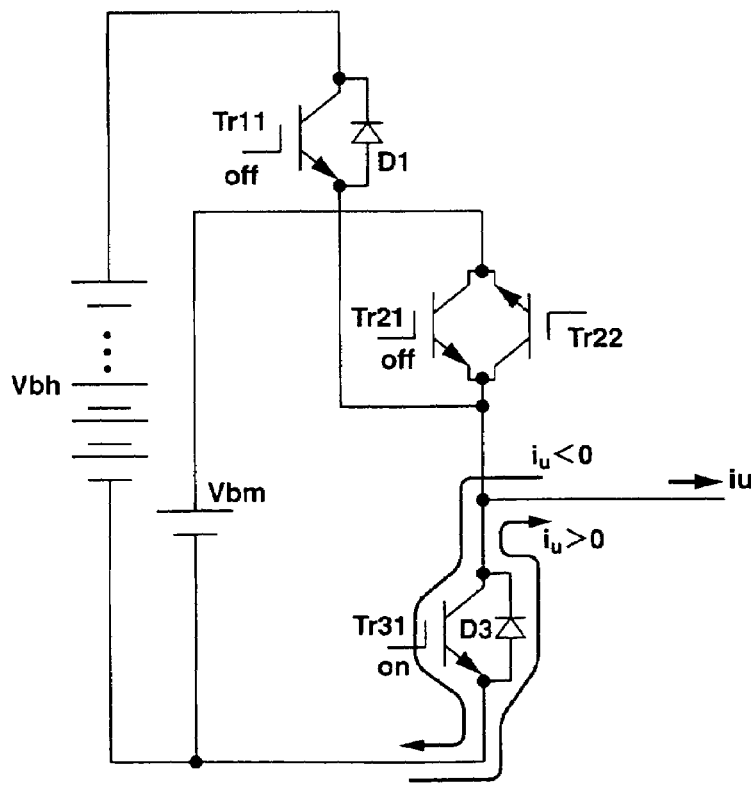

FIG. 26 is a diagram for illustrating current flows when the intermediate potential connecting switch (Tr21 & Tr22) is turned on. When Tr21 and Tr22 are on, then Tr11 and Tr31 are off. When U phase current is positive (iu>0), current flows through Tr21. When U phase current is negative (iu<0), current flows through Tr22. Therefore, voltage Vbm is applied to the U phase of motor 240.

FIG. 27 is a diagram for illustrating current flows when the lower potential connecting switch (Tr31) is turned on. When Tr31 is on, then Tr11 and Tr21 & T22 are off. When U phase current is positive (iu>0), current flows through D1. When U phase current is negative (iu<0), current flows through Tr31. Therefore, voltage 0V is applied to the U phase of motor 240.

In a power converter such as an inverter, in general, there is provided a dead time in which semiconductor switches are held off simultaneously in order to prevent short-circuit in switching operations. In this case, an excessive voltage is applied to a switch unless there remains a path of current during the period of dead time. The power conversion system of FIG. 12 ensures a path of current through diode D1 during the dead time period in the case of current being positive, and a path of current through D3 during the dead time period in the case of current being negative, and thereby prevents excessive voltages from being applied to power devices.

Figure 22:
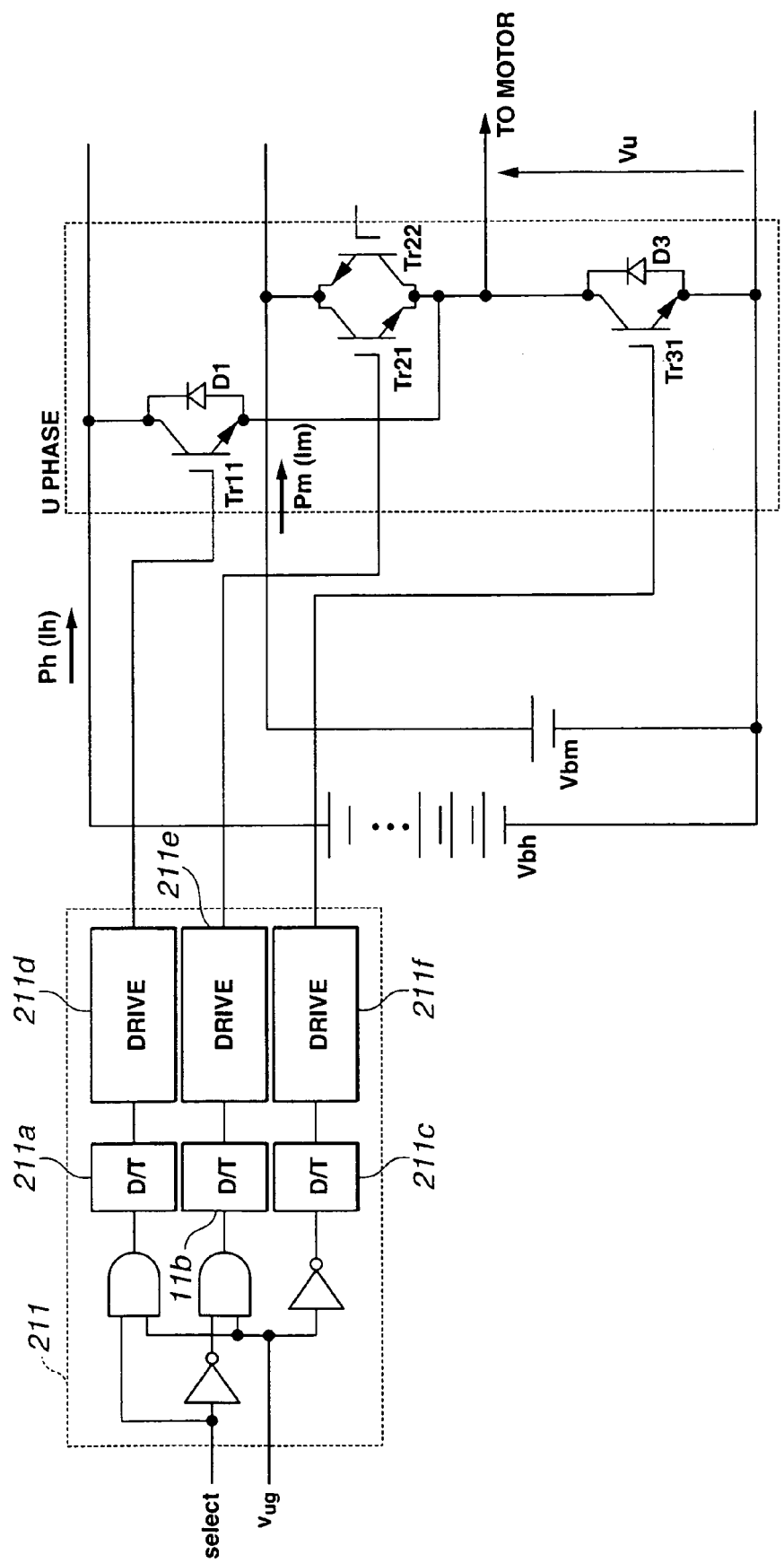
FIG. 22 is a view showing a U phase switching circuit section and a drive signal generating section in the power conversion system of FIG. 12.
Figure 23:
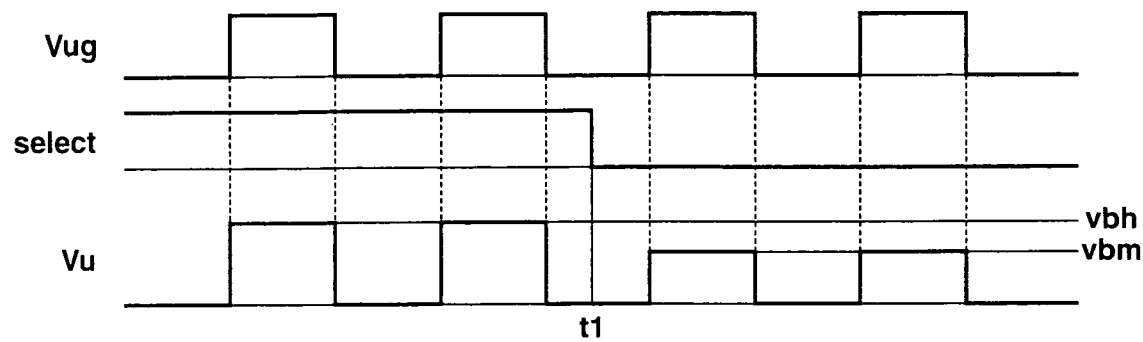
FIG. 23 is a timing chart illustrating signal waveforms (switching operations) appearing in the system shown in FIG. 22.
Figure 24:
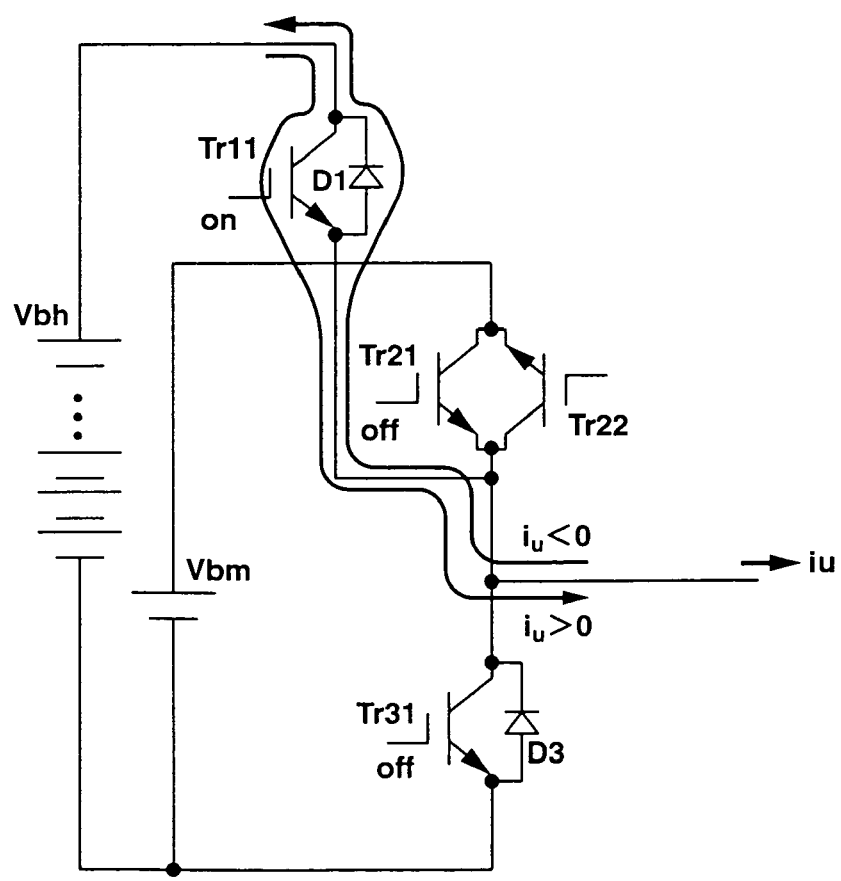

The power conversion system according to this embodiment can control the quantities of power supplied, respectively, from the two batteries in accordance with conditions of the batteries. FIG. 22 shows the U phase switching circuit section and a drive circuit according to the eighth embodiment. FIG. 23 is a time chart showing signals (switching operations) at various portions in the circuit shown in FIG. 22. A U phase drive signal generating section 211 receives a U phase drive signal Vug, and a select command signal "select" for selecting one potential for driving the motor, and produces switch drive signals in the switching circuit of the power converter. Section 211 includes dead time generating sections 211a, 211b and 211c for generating a dead time to prevent short circuit, and drive circuits 211d, 211e and 211f for driving the elements in the switching circuit section. The select signal is delivered from a PWM control section (not shown in FIG. 22).

When the select signal is high (H), the pair of Tr21 and Tr22 is off, and Tr11 and Tr31 are turned on and off alternately in accordance with the U phase PWM signal Vug. Therefore, the U phase motor voltage Vu is produced in the form of a pulsed voltage waveform alternating between Vbh and 0V. In this case, electric power is supplied to the motor from first battery 210 (Ph). When the select signal is low (L), Tr11 is off, and the pair of Tr21 and Tr22 and Tr31 are turned on and off alternately in accordance with the U phase PWM signal Vug. Therefore, the U phase motor voltage Vu is produced in the form of a pulsed voltage waveform alternating between Vbm and 0V. In this case, electric power is supplied to the motor from second battery 220 (Pm). By controlling the proportion of the time in which select signal is H, and the proportion of the time in which select signal is L, it is possible to control the proportions of these two operation times. Therefore, by controlling the select signal, the power conversion system can control the proportion of power supplied from first battery 210 and the proportion of power supplied from second battery 220 to desired values both in the case of power running mode and the regenerative mode.

Figure 21:
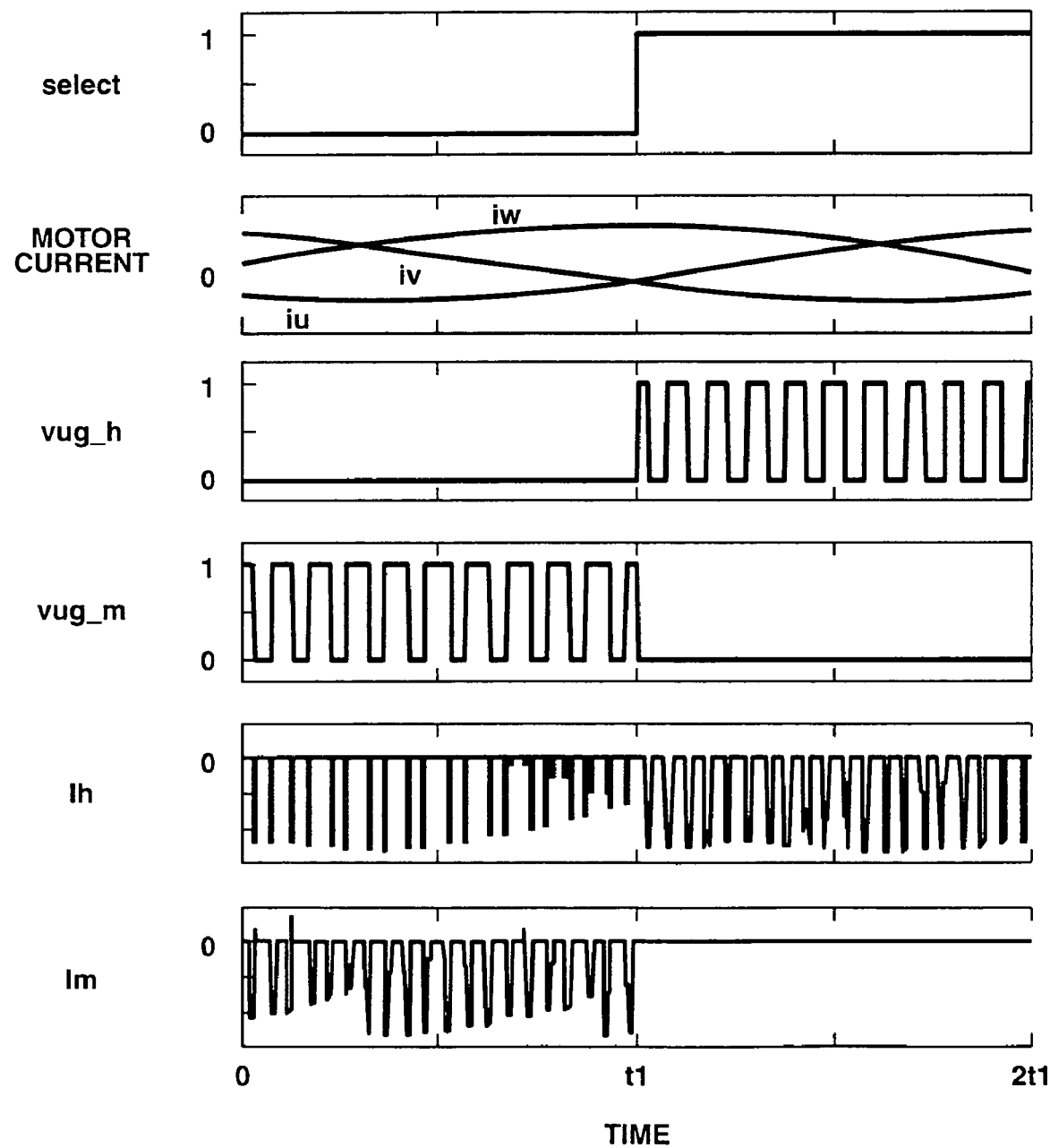
FIG. 21 is a timing chart illustrating simulation results of the power conversion system of FIG. 12 when a select signal is turned from L to H during a motor regenerating operation.

FIG. 21 is a time chart showing simulation results when the select signal is turned from L to H (0 to one) during the regenerative operation of the motor. Select signal is turned from L to H at an instant t1. In the state before t1 in which select signal is L, a current Ih flows through first battery 210 and a current Im flows through second battery 220 so that energy is regenerated (charged) to both batteries. In the state after t1 in which select signal is H, no current flows through second battery 220, and only the current Im flows through first battery 210. As evident from FIG. 21, it is possible to regulate the powers supplied to the two batteries with the select signal. In the L state of select signal, power is returned not only to second battery 220 but also to first battery 210 because of the dead time. In the actual control, the time proportions of the H state and L state of select signal are determined in consideration of the dead time. Thus, by controlling the amounts of power supplied from the batteries, the power conversion system can use the batteries properly in accordance with the charged states of the batteries. In this way, the power conversion system can control the amounts of power supplied to and from the batteries desirably, and thereby optimize the conditions of the batteries.

Figure 14:
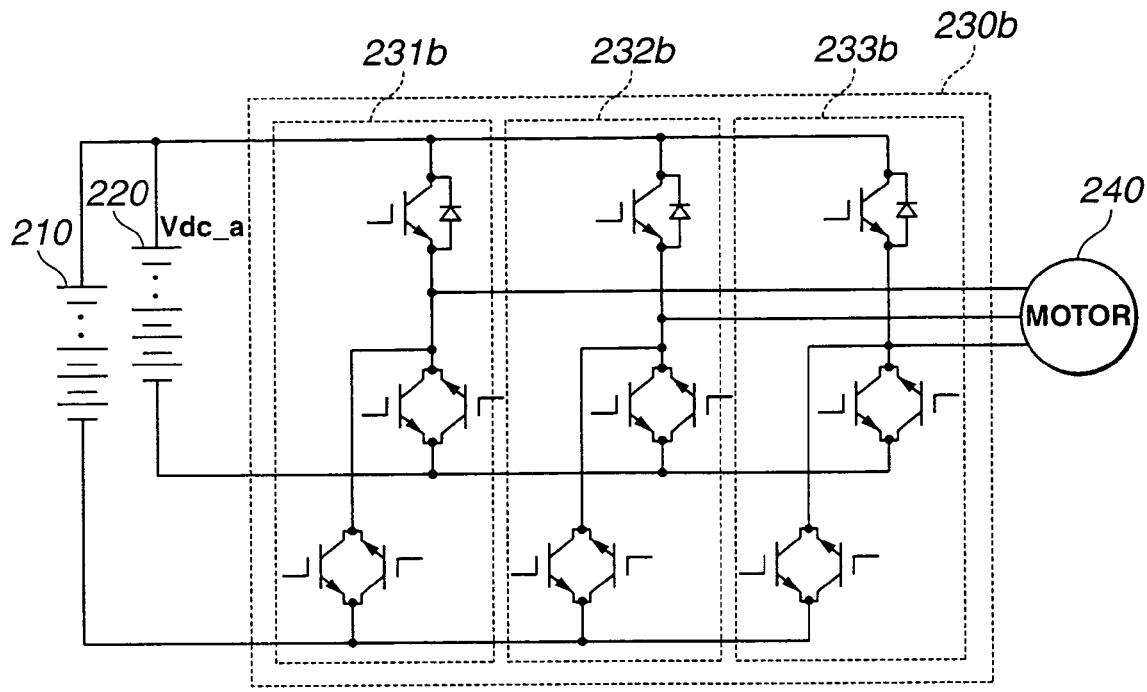
FIG. 14 is a circuit diagram showing a power conversion system according to a first variation of the eighth embodiment.
Figure 15:
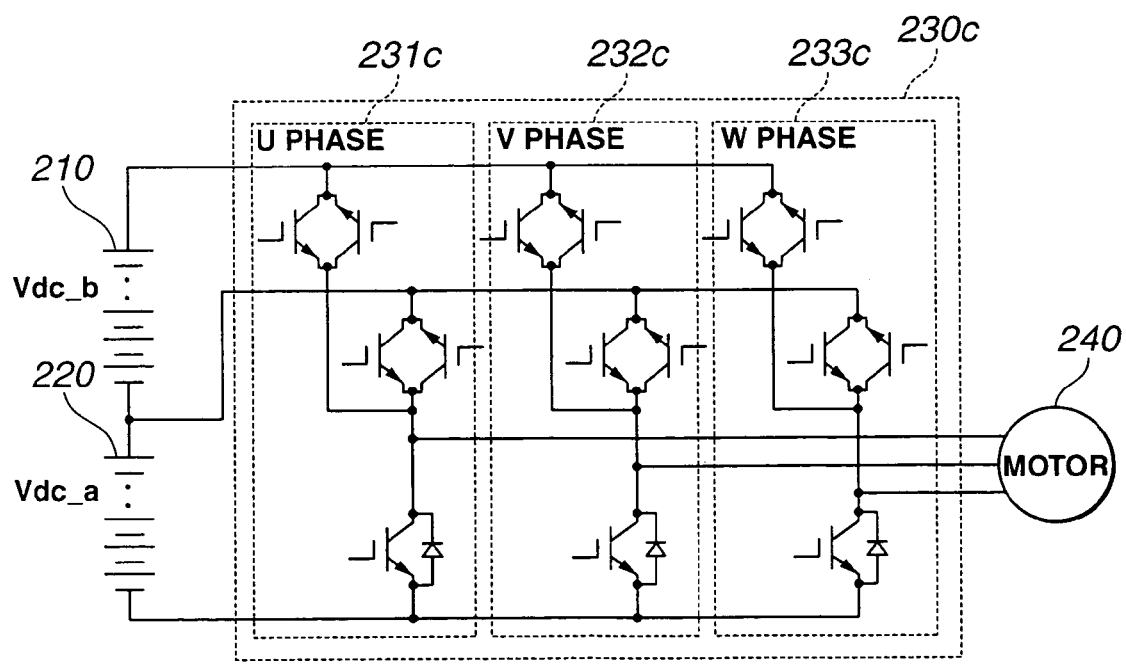
FIG. 15 is a circuit diagram showing a power conversion system according to a second variation of the eighth embodiment.

FIG. 14 shows a first variation of the eighth embodiment. In this example, the higher potential sides of first and second batteries 210 and 220 are connected together to provide a common potential, and the switch on the common potential side includes a diode and the other switches are bidirectional in each of the switching circuit sections 231b, 232b and 233b of the switching circuit 230b. In the other respects, the conversion system of FIG. 14 is substantially identical to the conversion system of FIG. 12. (In FIG. 14, first and second capacitors C1 and C2 are omitted.) FIG. 15 shows a second variation of the eighth embodiment. In this example, first and second batteries 210 and 220 are connected in series. The lower potential side of first battery 210 is connected with the higher potential side of second battery 220. The switch on the lower potential side includes a diode and the other switches are bidirectional in each of the switching circuit sections 231c, 232c and 233c of the switching circuit 230c. In the other respects, the conversion system of FIG. 15 is substantially identical to the conversion system of FIG. 12. (In FIG. 15, too, first and second capacitors C1 and C2 are omitted.) These variations can provide substantially the same effects as in the eighth embodiment.

Ninth Embodiment

Figure 16:
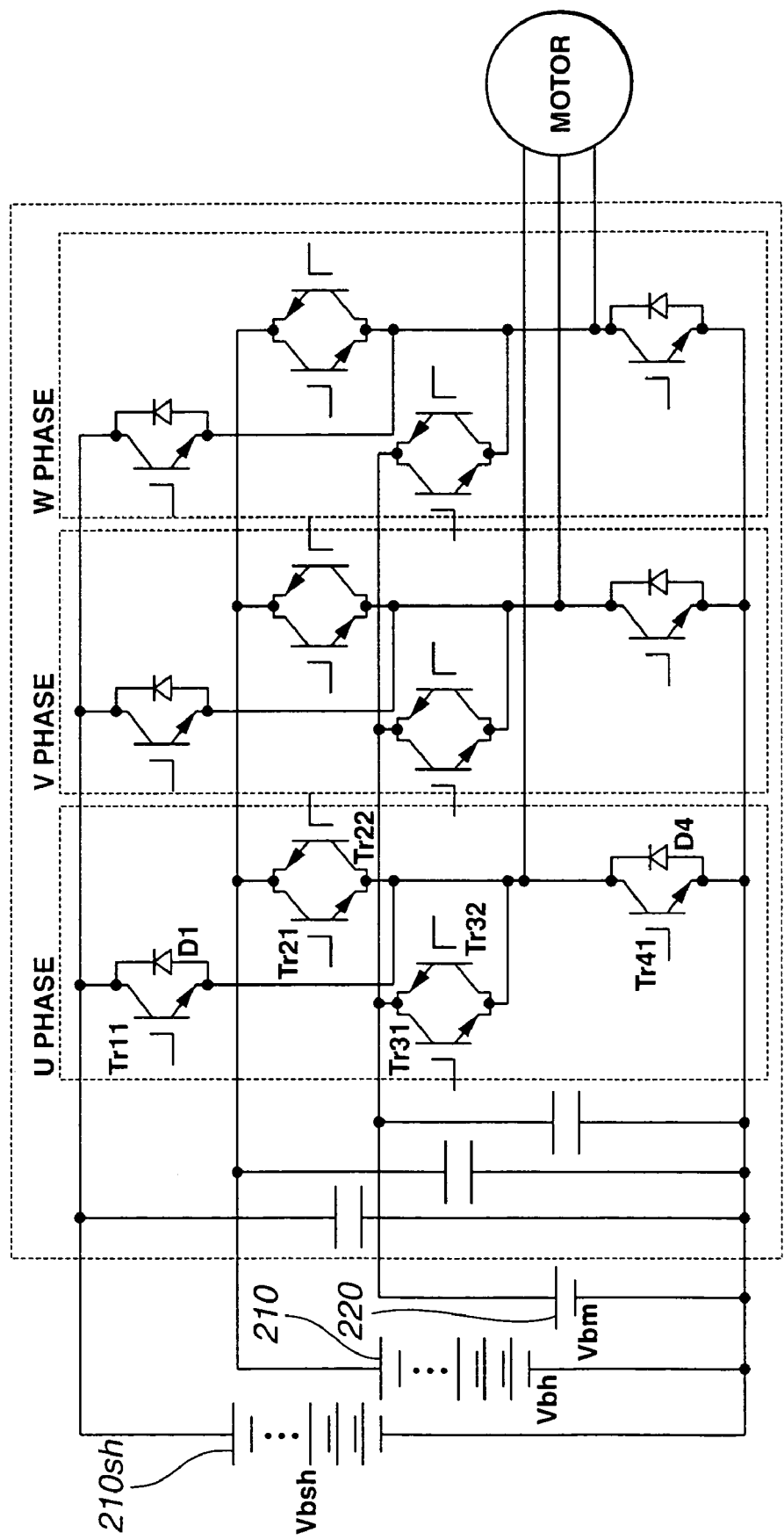
FIG. 16 is a circuit diagram showing a power conversion system according to a ninth embodiment.

FIG. 16 shows a power conversion system according to a ninth embodiment. The power conversion system of FIG. 16 employs a three-phase, four-level, partly bidirectional switching type converter configuration. The power source of this embodiment includes three batteries, first battery 210, second battery 220 and third battery 210sh. The lower potential sides of these three batteries are connected together to provide a common potential. Therefore, the power source includes four source terminals for providing four different potentials. In this example, the voltage Vbsh of third battery 210sh is the highest. Therefore, Vbsh>Vbh>Vbm. In this example, in each phase, the switch connected with the highest potential and the switch connected with the lowest (common) potential are in the form of a pair of a transistor as a forward switching element and a diode as a reverse switching element, as shown in FIG. 16. Thus, the switching arrangement is simplified, but the system can apply the voltages of all the potentials to the motor, and ensure the current path even during the dead time period. By employing the diodes which are advantageous in loss and cost instead of the bidirectional configuration of the power devices, this embodiment can reduce the loss and the cost.

Tenth Embodiment

Figure 17:
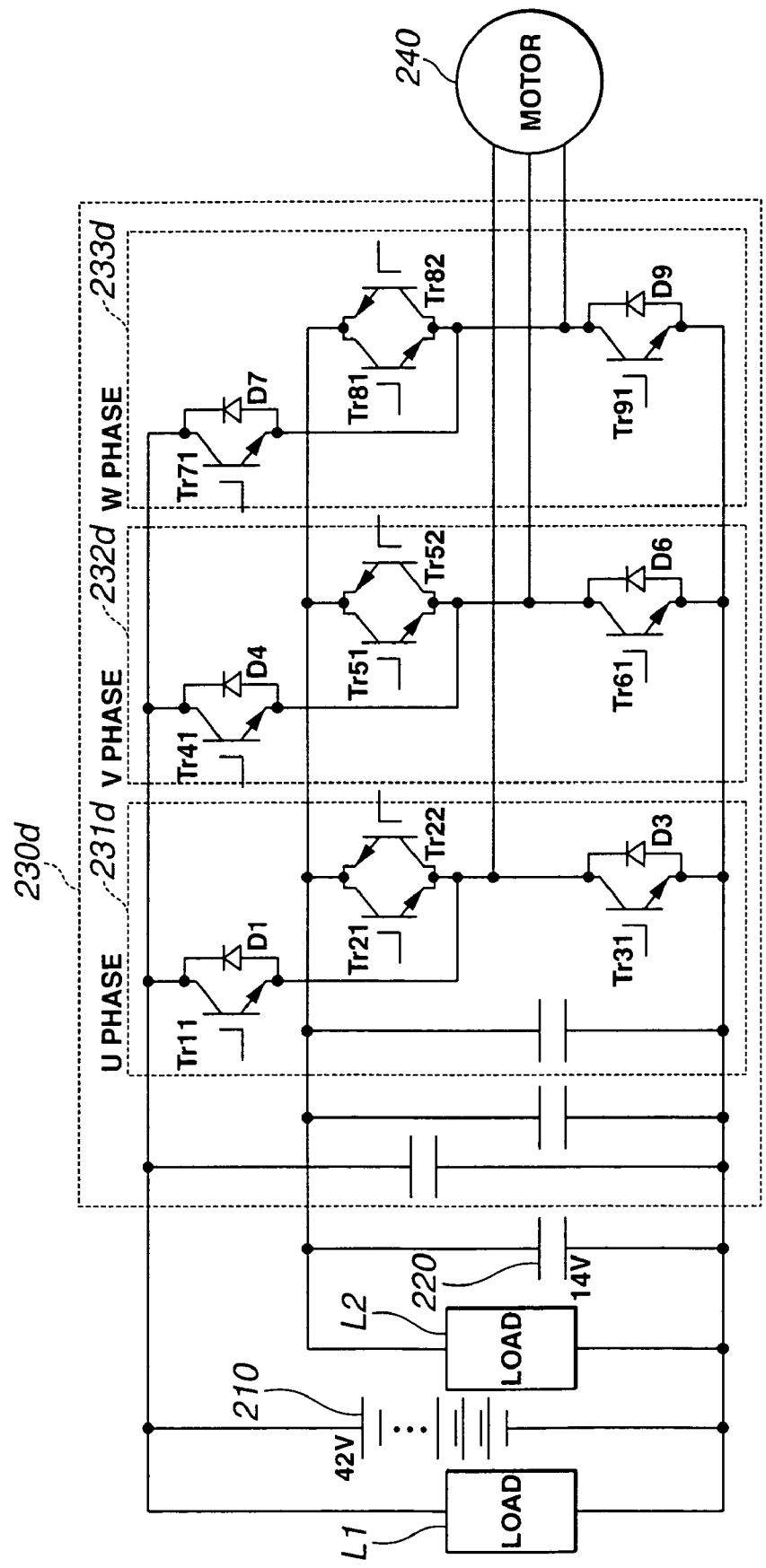
FIG. 17 is a circuit diagram showing a power conversion system according to a tenth embodiment.

FIG. 17 shows a power conversion system according to a tenth embodiment. The power conversion system of FIG. 17 employs a three-phase, three-level, partly bidirectional switching type converter configuration designed for a vehicle having two power sources. In the example of FIG. 17, the vehicle has a first power source of 42V and a second power source of 14V. The 14V system is widely used in motor vehicles, for various accessory systems of relatively light load such as lamps, and equipment in passenger's compartment. Recently, the 42V system is employed in motor vehicles, for relatively large load such as vehicle driving motor, and air conditioning compressor. The 42 V system is adequate for heavier load, and the 14 V system is adequate for lighter load.

A power converter 230d shown in FIG. 17 is identical to the power converter shown in FIG. 12. Motor 240 includes a motor output shaft which is connected with an output shaft of an engine of the vehicle. The power source includes a 42V battery 210, and a capacitor 220 serving as a 14 V power source. A load L1 includes various devices which consume electric power of 42 V battery 210. A load L2 includes various loads of the 14 V system. Motor 240 normally functions as a generator driven by the engine. The power generated by motor 240 is supplied or apportioned to battery 210 and capacitor 220 in a controlled manner controlled by the sections 231d, 232d and 233d of the switching circuit of power converter 230d in accordance with the conditions of battery 210 and capacitor 220. With one or more devices for monitoring the conditions of the dc voltage supplying devices 210 and 220, the power conversion system can control the states of charge of the battery and capacitor in the optimum states by returning the generated power to the voltage supplying devices 210 and 220 with a proper ratio of apportionment.

Figure 18:
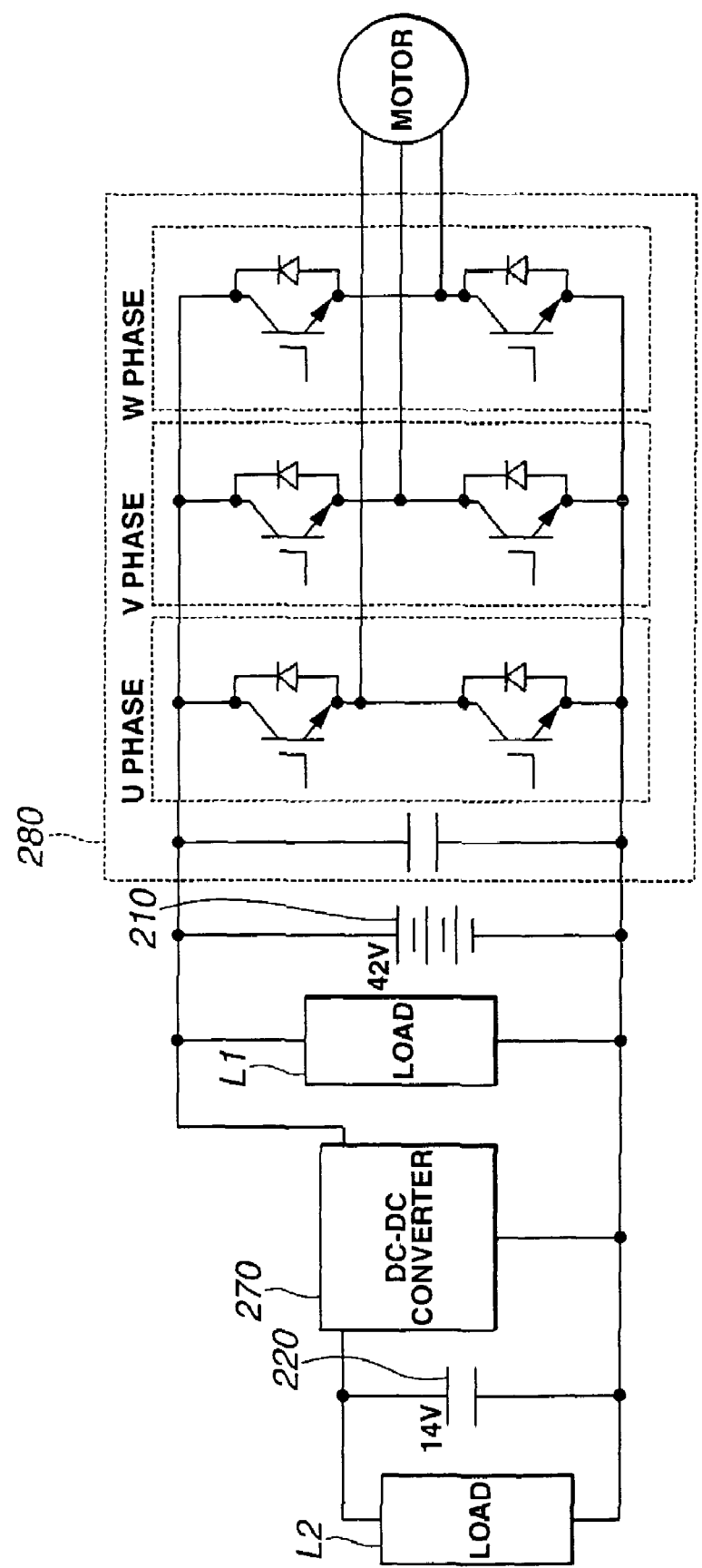
FIG. 18 is a circuit diagram showing a 42V power supply system including a dc-dc converter as a comparative example of earlier technology.

FIG. 18 shows a 42 volt system of a comparative example of earlier technology. Generated power is first supplied to a 42 V battery through a power converter 280. Thereafter, a required amount of power is converted to 14 V by a dc-dc converter 270, and supplied to a 14 V battery 220. The dc-dc converter in this comparative example requires coils, so that it is difficult to reduce the size and the loss. By contrast, the power conversion system of the tenth embodiment can distribute generated power directly by the semiconductor switching devices without requiring any dc-dc converter. Therefore, the tenth embodiment can reduce the size of the system and the loss significantly. Moreover, the power converter can control power of the 14 V system freely, so that it is possible to employ a capacitor as a 14 V source, and thereby to further reduce the size.

Eleventh Embodiment

Figure 19:
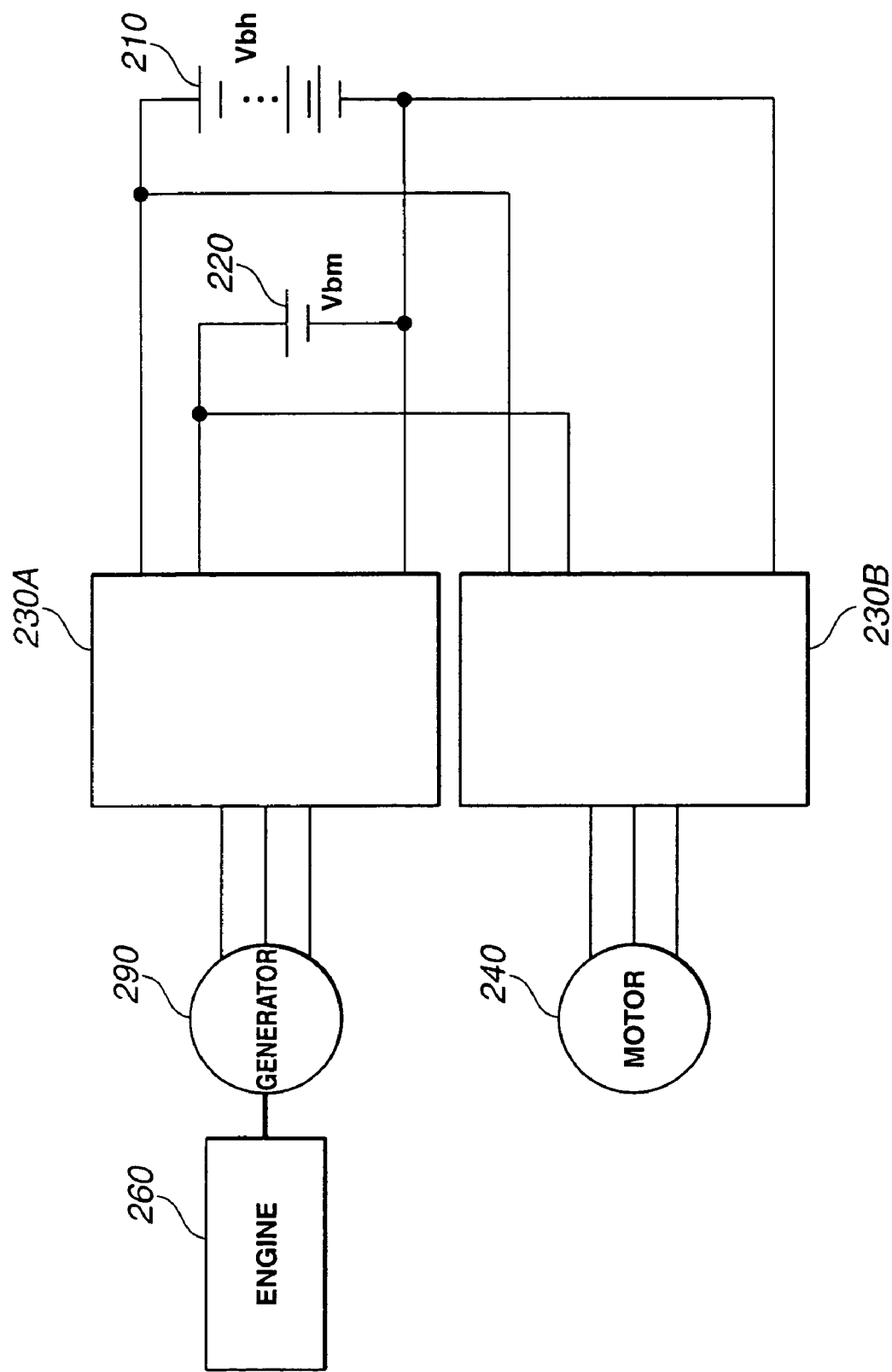
FIG. 19 is a view showing a vehicle equipped with a power conversion system according to an eleventh embodiment.

FIG. 19 shows a vehicle equipped with a power conversion system according to an eleventh embodiment. In this embodiment, a three phase, three level, partly bidirectional switching type converter is applied to a series type hybrid vehicle. The vehicle includes a first battery 210 and a second battery 220. The output voltage Vbh of first battery 210 is higher than the output voltage Vbm of second battery 220. That is, Vbh>Vbm. The power conversion system according to the eleventh embodiment is a hybrid system including the two batteries 210 and 220; an engine 260; a generator 290 connected with engine 260; a motor 240 for producing a driving torque for rotating drive wheels of the vehicle; and first and second power converters 230A and 230B each arranged to control electric power to and from the two batteries as explained in the eighth embodiment. Second power converter 230B is connected with motor 240 and configured to drive motor 240 efficiently by using power from first and second batteries 210 and 220.

First power converter 230A is connected with generator 290 and configured to apportion power generated by generator 290 between first and second batteries 210 and 220 in accordance with the conditions of the batteries. Thus, the power conversion system can drive the motor efficiently and at the same time control the batteries in the desired battery states such as desired states of charge (SOC). When power converter 230B drives motor 240 efficiently by using the voltage of battery 210, the power converter 230A can supply the generated power to battery 210 in an amount equaling power supplied to power converter 230B, so as to maintain the SOC of battery 210 at a desired level.

Figure 20:
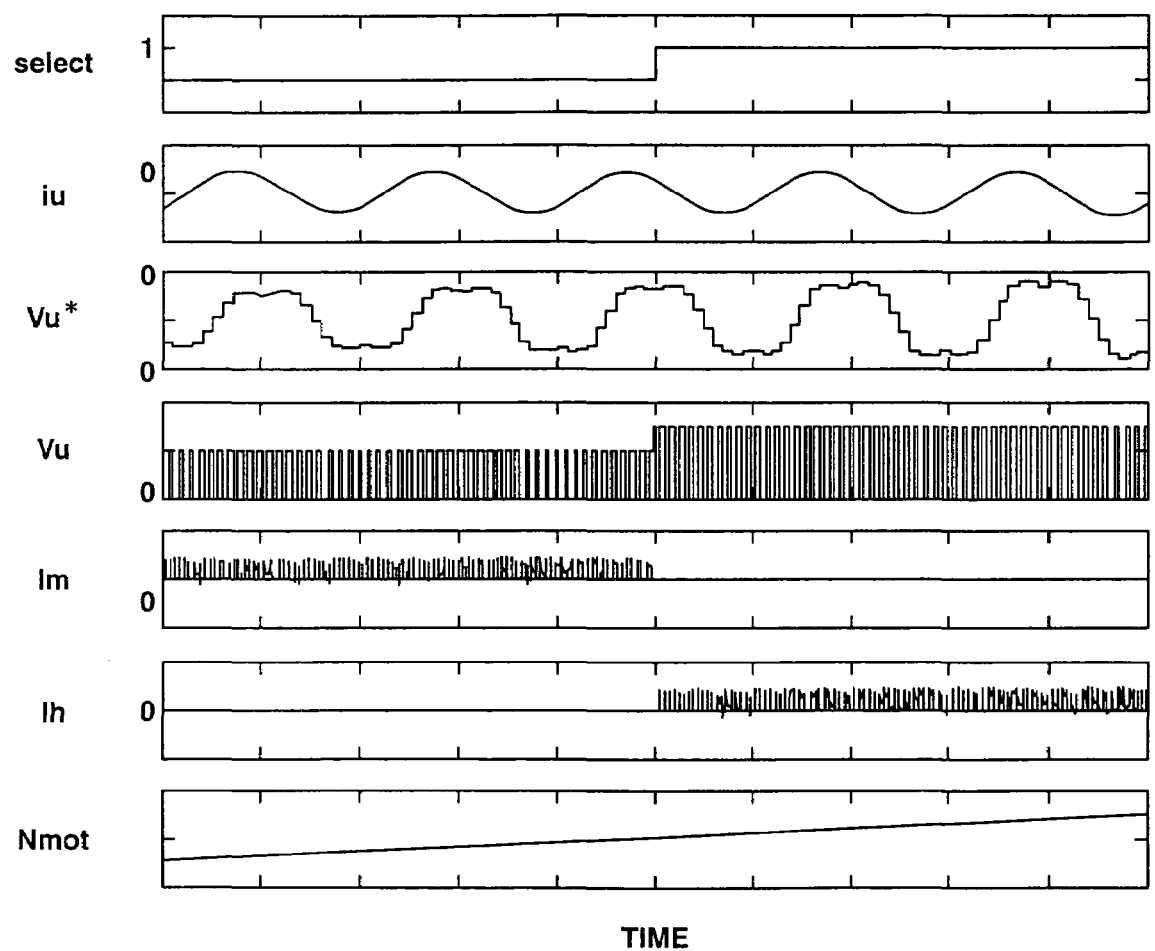
FIG. 20 is a timing chart illustrating simulation results of the power conversion system of FIG. 26.

FIG. 20 shows simulation results in the form of a timing chart. In the simulation of FIG. 20, the motor is accelerated in the state in which the output torque of the motor is held constant. Before an instant t1, a motor speed Nmot is so low that a drive operation with a low voltage is possible, and therefore, the motor is driven by the voltage of second battery 220. After t1, motor speed Nmot is increased, and the motor is driven by the voltage of the first battery 210 having a higher output voltage. Current is supplied from battery 220 (Im) before t1, and current is supplied from battery 210 (Ih) after t1. Power converter 230A functions to supplement power to the batteries so as to control the SOCs of the batteries at respective desired levels (not shown in FIG. 20). In this way, the power conversion system can drive the motor efficiently on one hand, and control the state of charge of one or more batteries optimally.

As explained above, first, the power conversion system according to any of the preceding embodiment can improve the motor efficiency and the inverter efficiency by using two or more source voltages. In particular, the system can change over the voltage for use (Vbh or Vm) in dependence on the motor application voltage. A higher harmonic component can be reduced by three level driving operation. Second, the power conversion system can control input and output power of a plurality of power sources independently. In the case of a vehicle having a 42 V system, the power conversion system can charge a 14V power source without requiring a voltage decrease dc/dc converter. Moreover, the power conversion system can transfer power from one of the power sources to another. Third, the power conversion system is simple in construction as compared to a matrix converter, a voltage increase dc/dc converter, and a conventional three level converter.

Various modifications and variations of the embodiments described above are possible. For example, it is possible to employ, as switching element, GTO, and various transistors, instead of IGBT. The hybrid system in the example of FIG. 19 employs two batteries, and one motor. However, it is possible to use a capacitor instead of battery 220 having a lower output voltage. In this case, it is possible to control the voltage to a desired level by controlling the charge and discharge of the capacitor. Moreover, it is possible to employ two or more motors and to control power supplies to the motors flexibly. Similarly, in the eighth embodiment, for example, it is possible to employ a capacitor instead of a lower voltage battery.

12th Embodiment

Figure 29:
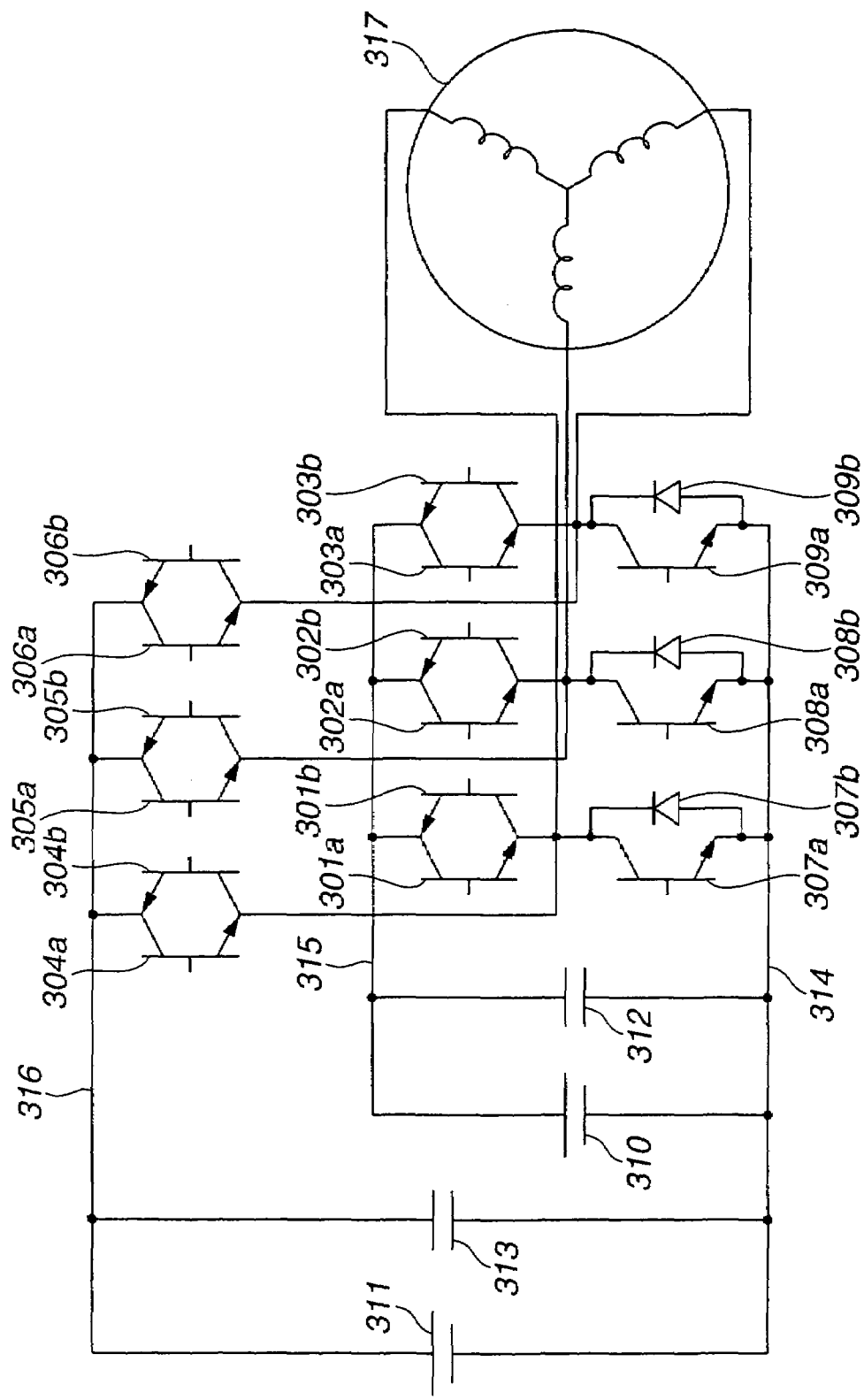
FIG. 29 is a circuit diagram showing a power conversion system according to a twelfth embodiment.

FIG. 29 shows a vehicle equipped with a power conversion system according to a twelfth embodiment. In this embodiment, negative (or lower potential) electrodes of first and second dc power sources 310 and 311 are connected together to a common negative electrode bus (or line) 314. Between the common bus 314 and each of three phase terminals of a three phase ac motor 317 (that is, each of three output terminals of the power converter connected to three phases of an inductive load), there is provided a switching device in the form of a pair of a semiconductor switching element 307a, 308a or 309a serving as a forward switch, and a diode 307b, 308b or 309b, like a lower arm of a known three phase inverter.

A first positive electrode bus or line 315 is connected with the positive (higher potential) electrode of first dc power source 310. Between this positive electrode bus 315 and each of three phase terminals of a three phase ac motor 317, there is provided a bidirectional type switching device in the form of a pair of a semiconductor switching element 301a, 302a or 303a serving as a forward switch, and a semiconductor switching element 301b, 302b or 303b serving as a reverse switch. A second positive electrode bus or line 316 is connected with the positive (higher potential) electrode of second dc power source 311. Between this positive electrode bus 316 and each of three phase terminals of a three phase ac motor 317, there is provided a bidirectional type switching device in the form of a pair of a semiconductor switching element 304a, 305a or 306a serving as a forward switch, and a semiconductor switching element 304b, 305b or 306b serving as a reverse switch. Between first positive electrode bus 315 and negative electrode bus 314, there is provided a smoothing capacitor 312 for restraining voltage variation due to switching operations of the semiconductor switches. For the same reason, there is provided a smoothing capacitor 313 between second positive electrode bus 316 and negative electrode bus 314. Since three phase ac motor 317 has an inductance in a stator winding, the motor 317 is an inductive load having an inductive load characteristic.

The power converter having the switching circuit configuration shown in FIG. 29 can select a source of power for driving motor 317 between the two dc power sources 310 and 311 by turning on and off the forward switches and reverse switches. When the reverse switches #1/2/3 (R-SW#1/2/3) (that is, semiconductor switching elements 301b, 302b and 303b) are ON, the forward switches #4/5/6 (F-SW#4/5/6) (that is, semiconductor switching elements 304a, 305a and 306a) are OFF, and the reverse switches #4/5/6 (R-SW#4/5/6) (that is, semiconductor switching elements 304b, 305b and 306b) are OFF; then the remaining switches form a switching circuit similar to a 3 phase inverter to drive 3 phase ac motor 317 with first dc power source 310. When the reverse switches #4/5/6 (R-SW#4/5/6) (that is, semiconductor switching elements 304b, 305b and 306b) are ON, the forward switches #1/2/3 (F-SW#1/2/3) (that is, semiconductor switching elements 301a, 302a and 303a) are OFF, and the reverse switches #1/2/3 (R-SW#1/2/3) (that is, semiconductor switching elements 301b, 302b and 303b) are OFF; then the remaining switches form a switching circuit similar to a 3 phase inverter to drive 3 phase ac motor 317 with second dc power source 311. In this way, the power converter of FIG. 29 can drive motor 317 with power from a selected one between the two dc power sources 310 and 311.

Figure 30:
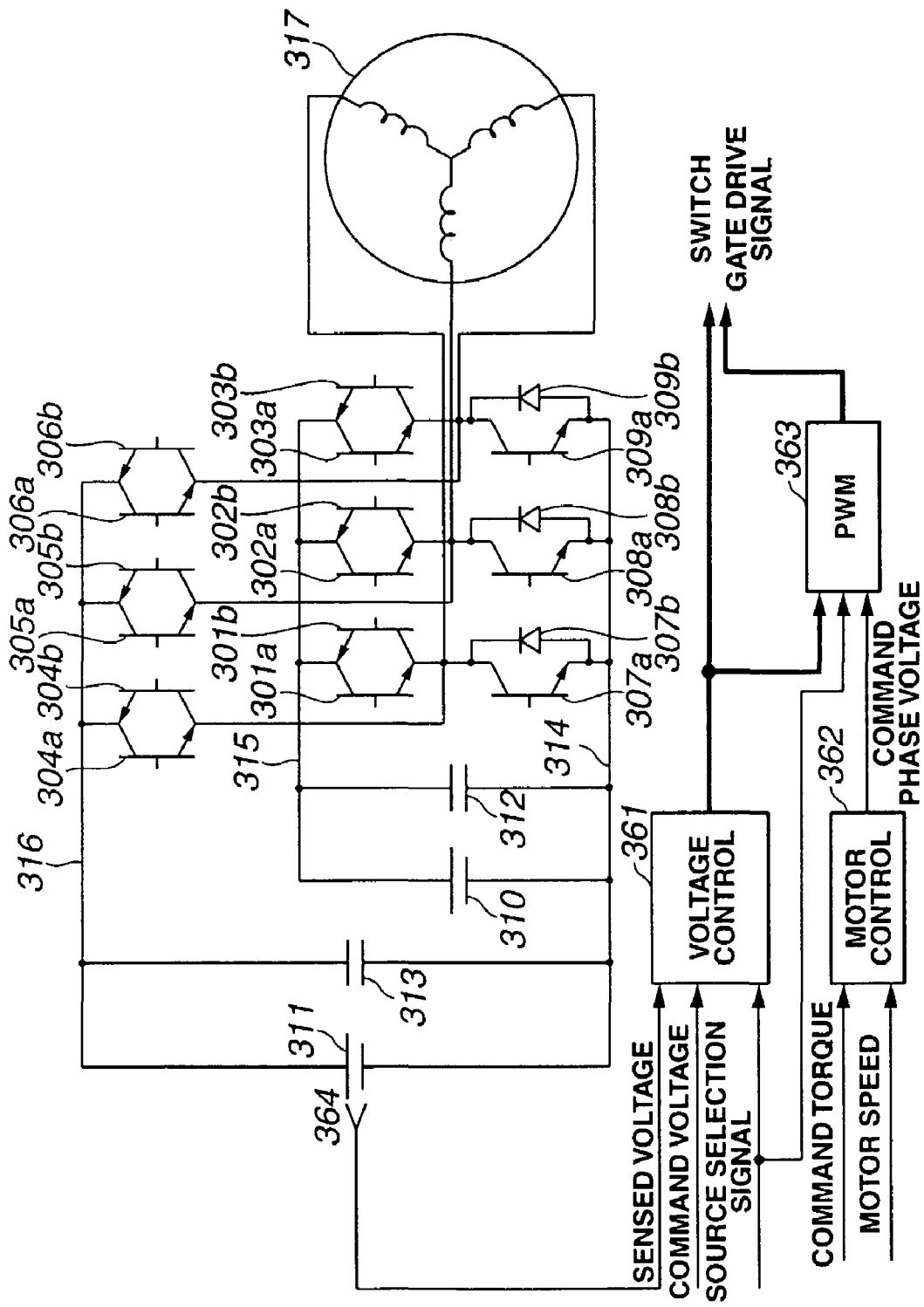
FIG. 30 is a view showing a control section of the power conversion system of FIG. 29.
Figure 31:
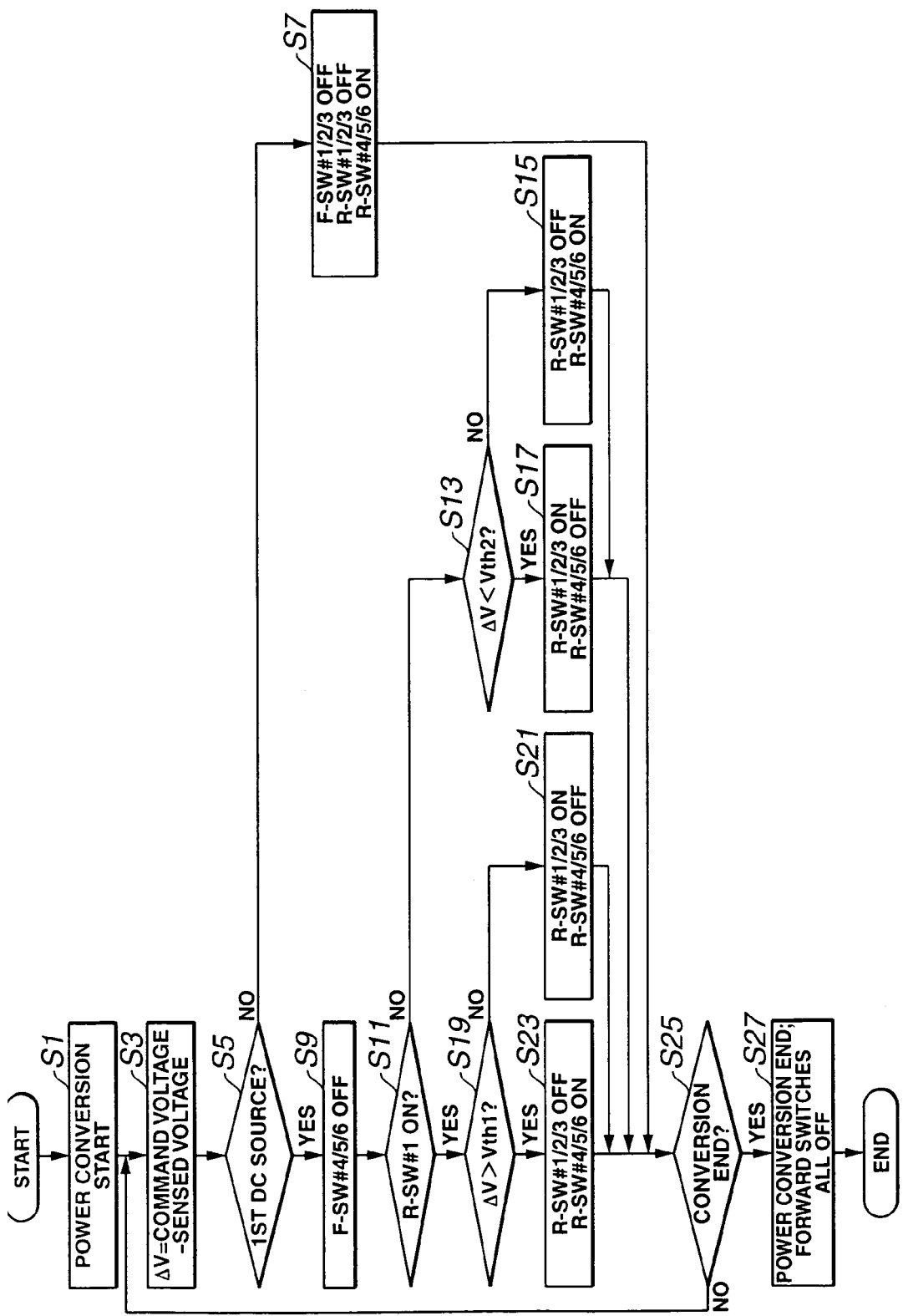
FIG. 31 is a flowchart showing a control process performed by the conversion system of FIG. 30.

FIG. 30 is a control block diagram showing a controller or control section for controlling the switches in the power converter shown in FIG. 29. A voltage sensor 364 is provided for sensing an actual voltage of second dc power source 311. A voltage control section 361 receives the sensed voltage from voltage sensor 364, a command voltage, and a driving source selection signal as input signals, and performs a control process as shown in FIG. 31 to determine the on/off states of the switches. In this example, voltage control section 361 selects nine switches from the fifteen forward and reverse switches (a set of switches), and determines the on/off states. A motor control section 362 receives a command torque and a motor speed as input signals, and calculates a command phase voltage in each phase for driving three phase ac motor 317 by using a predetermined command voltage data table. A PWM generating section 363 produces PWM signals for switching on and off the remaining six switches (a control subset of the set of the switches), excepting the nine switched selected by voltage control section 361. PWM signals are produced by comparison of the corresponding command phase voltage with a triangular waveform pulse carrier.

FIG. 31 is a flowchart showing the control process performed by voltage control section 361 in the controller. The control section starts control operation at step S1 in response to an operation start command start the operation of the power conversion system. At a next step S3, the control section calculates a voltage difference ΔV (=the command voltage minus the sensed voltage) from the command voltage of second dc power source 311 and the voltage sensed by voltage sensor 364.

At a step S5 next to S3, the control section selects one between first dc power source 310 and second dc power source 311 as a source of power for driving the motor, in accordance with the driving power source selection signal shown in FIG. 30. When second source 311 is selected, and the answer of S5 is NO, the control section proceeds from S5 to S7. At S7, the forward switches #1/2/3 and reverse switches #1/2/3 are turned off (a turn-off subset), and the reverse switches #4/5/6 are turned on (a turned-on subset). The remaining six switches (control subset) other than these switches form a switching circuit of a three phase inverter using, as a driving power source, second power source 311. The PWM generating section 363 produces PWM command signals from the command phase voltages by comparison with a triangular waveform; and controls the remaining six switches on and off in the manner of PWM or PDM control with the PWM command signals. Thus, the power converter drives three phase ac motor 317 by using the power supplied from second dc source 311.

When first source 310 is selected as a source for driving the motor, and hence the answer of S5 is YES, the control section proceeds from S5 to S9, and turns off the forward switches #4/5/6 (as part of the turn-off subset) at S9. Then, at step S11, the control section checks the current on/off commands of reverse switches #1/2/3, and thereby determines whether reverse switches #1/2/3 are in the on state or in the off state.

When reverse switches #1/2/3 are in the off state, and hence the answer of S11 is NO, then the control section proceeds from S11 to a step S13, and compares the voltage difference ΔV with a predetermined voltage threshold Vth2 which is set equal to a negative value. The voltage threshold Vth2 and another voltage threshold Vth1 used in a step S19 are designed to provide hysteresis.

When ΔV is greater than or equal to Vth2, the control section proceeds from S13 to a step S15. At S15, reverse switches #1/2/3 are turned off (as part of the turned-off subset) and reverse switches #4/5/6 are turned on (as the turned-on subset). When, on other hand, ΔV is smaller than Vth2, the control section proceeds from S13 to a step S17. At S17, reverse switches #1/2/3 are turned on (as the turned-on subset) and reverse switches #4/5/6 are turned off (as part of the turned-off subset). In this way, the conversion system makes selection among the switches or among the buses in accordance with the voltage difference.

When reverse switches #1/2/3 are in the on state, and hence the answer of S11 is YES, then the control section proceeds from S11 to a step S19, and compares the voltage difference ΔV with the predetermined voltage threshold Vth1 which is set equal to a positive value.

When ΔV is smaller than or equal to Vth1, the control section proceeds from S19 to a step S21. At S21, reverse switches #1/2/3 are turned on and reverse switches #4/5/6 are turned off. When, on other hand, ΔV is greater than Vth1, the control section proceeds from S19 to a step S23. At S23, reverse switches #1/2/3 are turned off and reverse switches #4/5/6 are turned on. Thereafter, the control section determines whether to terminate the power conversion at S25. When the power conversion is to be continued, the control section returns from S25 to S3. When the power conversion is to be ended, the control section stops the power conversion and turns off all the forward switches at a step S27. Then, the control section terminates the process of FIG. 31.

When, for example, the command voltage for second source 311 is higher than the sensed voltage, and ΔV is positive; then the forward switches #4/5/6 are OFF, reverse switches #1/2/3 are OFF and reverse switches #4/5/6 are ON. In this state, the power conversion system drives three phase ac motor 317 by switching on and off the remaining switches for the three phases. When current of the motor flows from a motor terminal toward the positive electrode, the current flows to the second positive electrode bus 316 and charges second dc power source 311 through one of reverse switches #4/5/6 because reverse switches #1/2/3 are OFF. The power conversion system performs the switch control of voltage control section 361 and the motor control calculation of motor control section 362 repeatedly until a command signal to end the power conversion is received, and thereby charges second dc power source 311. If the sensed voltage becomes higher than the command voltage, the voltage difference ΔV becomes negative. When, by comparison of ΔV with Vth2, the answer of S13 becomes YES, the reverse switches #1/2/3 are turned on, and reverse switches #4/5/6 are turned off. In this state, the switching circuit functions as a three phase inverter using first power source 310 as a driving power source.

When the check of reverse switches #1/2/3 are performed again to turn on the reverse switches, the control section performs the comparison of ΔV with Vth1. When second power source 311 is connected with a load other than the power converter or the second power source 311 is discharged gradually because of a circuit formed by an internal resistance of smoothing capacitor 313, then the voltage of second source 311 decreases, and ΔV becomes greater than Vth1. As a result of the comparison, the on/off states of the reverse switches are changed. In this way, the conversion system performs the operation for changing second dc power source 311 again. As second dc power source 311, it is preferable to employ a rechargeable electricity storage device such as a secondary battery or a capacitor. The thus-constructed power conversion system determines the on/off states of nine switches among the 15 switches in the process of selecting the driving power source and the calculation of voltage control of second dc power source 311, and performs the PWM control by using the remaining six switches.

By employing such a charging operation, it is possible to set the voltage of second dc power source 311 to a value higher than the voltage of first dc power source 310. Moreover, by regulating the charging and discharging quantities of second dc source 311, it is possible to set the voltage of second source 311 to a value lower than the voltage of first source 310. Without requiring any dc-dc converter, the power conversion system of this embodiment is advantageous in reduction in loss and system size like the preceding embodiments.

The power conversion system shown in FIG. 30 can be used for a fuel cell electric vehicle. In this case, it is possible to use a fuel cell unit as first dc power source 311, and a secondary battery as second dc power source 310. When a driver of the vehicle turns a key to an ignition position, the power conversion start command is produced and the process of FIG. 31 is initiated. An upper controller or energy controller is used for making selection between the fuel cell unit and battery. By receiving a control signal representing the result of the selection, the power conversion system controls the switches. In the situation such as a starting operation where the output of the fuel cell unit is insufficient, for example, the system can provide sufficient starting performance by selecting the drive by the battery.

When the motor is driven at high speeds by setting the command voltage of the battery higher than the voltage of the fuel cell unit, it is possible to improve the motor efficiency by driving the motor by using the high voltage of the battery. In order to restrain a counter electromotive force in a three phase ac motor, a motor system uses current for weakening magnetic flux in some cases. The power conversion system can decrease such current and thereby reduce the copper loss and iron loss in the motor by driving the motor with a higher voltage. The power conversion system according to this embodiment can charge the battery to a voltage level higher than the voltage of the fuel cell device without using a dc-dc converter, and thereby improve efficiency in the high speed region. Thus, the system can increase/decrease the voltage without the need for a dc-dc converter, and improve the fuel economy of the vehicle.

13th Embodiment

Figure 32:
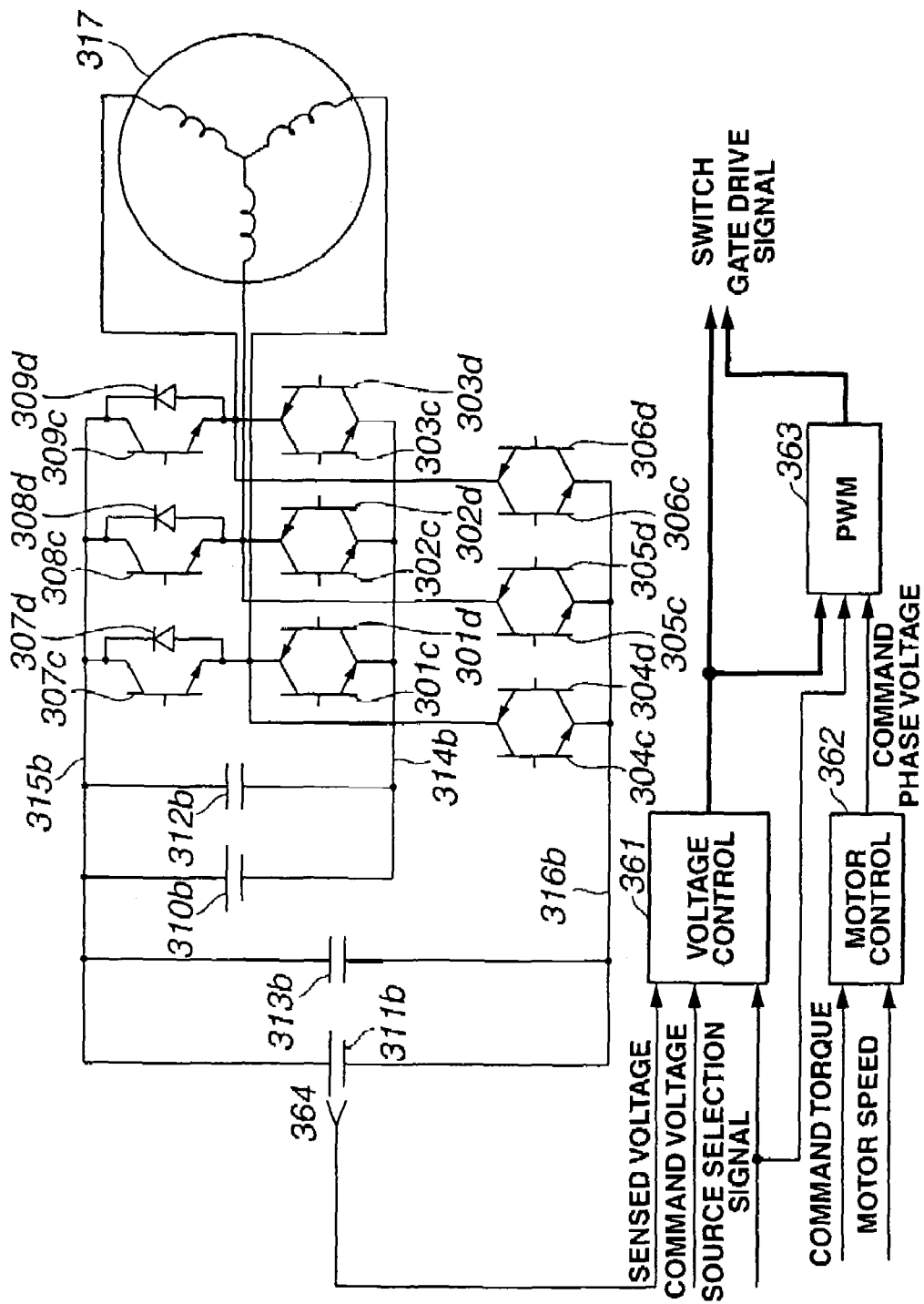
FIG. 32 is a view showing a power conversion system according to a thirteenth embodiment.

FIG. 32 shows a power conversion system according to a thirteenth embodiment. In this embodiment, the positive (or higher potential) electrodes of first and second dc power sources 310*b* and 311*b* are connected together to a common positive electrode bus (or line) 315*b*. Between the common positive electrode bus 315*b* and each of three phase terminals of the three phase ac motor 317, there is provided a switching device in the form of a pair of a semiconductor switching element 307*c*, 308*c* or 309*c* serving as a forward switch, and a diode 307*d*, 308*d* or 309*d*, like an upper arm of a known three phase inverter.

A first negative electrode bus or line 314*b* is connected with the negative (lower potential) electrode of first dc power source 310*b*. Between this negative electrode bus 314*b* and each of three phase terminals of three phase ac motor 317, there is provided a bidirectional type switching device in the form of a pair of a semiconductor switching element 301*c*, 302*c* or 303*c* serving as a forward switch, and a semiconductor switching element 301*d*, 302*d* or 303*d* serving as a reverse switch. A second negative electrode bus or line 316b is connected with the negative (lower potential) electrode of second dc power source 311b. Between this negative electrode bus 316b and each of three phase terminals of three phase ac motor 317, there is provided a bidirectional type switching device in the form of a pair of a semiconductor switching element 304c, 305c or 306c serving as a forward switch, and a semiconductor switching element 304d, 305d or 306d serving as a reverse switch. Between first negative electrode bus 314b and positive electrode bus 315b, there is provided a smoothing capacitor 312b. There is provided a smoothing capacitor 313b between second negative electrode bus 316b and positive electrode bus 315b.

The power converter having the switching circuit configuration shown in FIG. 32 can select a source of power for driving motor 317 between the two dc power sources 310 and 311 by turning on and off the forward switches and reverse switches in a manner analogous to the operation of the conversion system shown in FIG. 29. The power conversion system of FIG. 32 can be controlled by using the control process shown in the flowchart of FIG. 31.

By employing the charging operation based on the control process of FIG. 31, it is possible to set the voltage of second dc power source 311b to a value higher than the voltage of first dc power source 310b. Without requiring any dc-dc converter, the power conversion system of this embodiment can increase the voltage of the second dc power source, and therefore reduce the size and loss. The power conversion system of this embodiment can increase and decrease the voltage without using a dc-dc converter.

14th Embodiment

Figure 33:
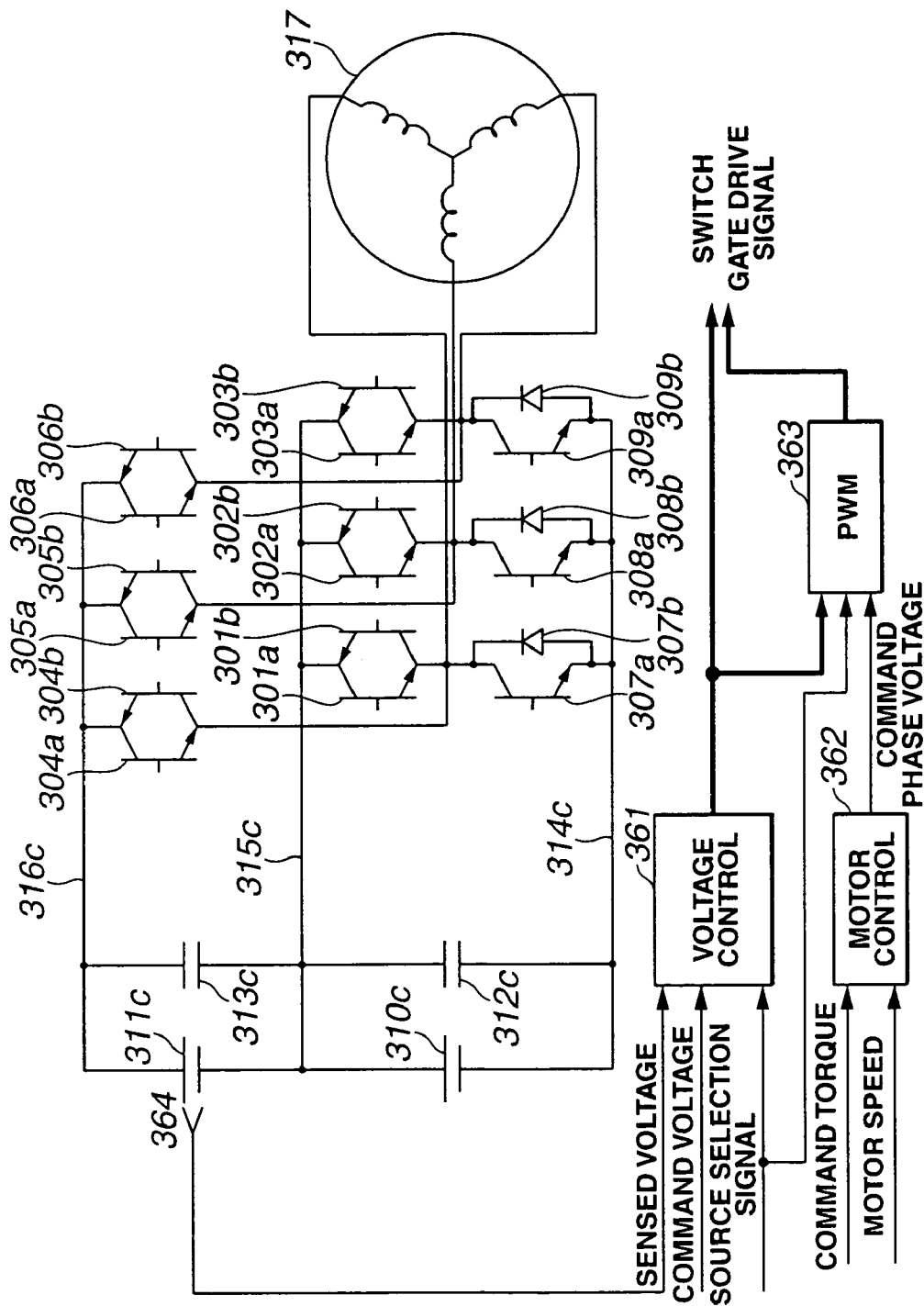
FIG. 33 is a view showing a power conversion system according to a fourteenth embodiment.

FIG. 33 shows a power conversion system according to a fourteenth embodiment. In this embodiment, the negative electrode of a second dc power source 311c and the positive electrode of a first dc power source 310 are connected together to a common intermediate bus (or line) 315c. Between a negative electrode bus 314c of first dc power source 310 and each of three phase terminals of a three phase ac motor 317, there is provided a switching device in the form of a pair of a semiconductor switching element 307a, 308a or 309a serving as a forward switch, and a diode 307b, 308b or 309b like a lower arm of a three phase inverter. Between common bus 315c and each of the three phase terminals of three phase ac motor 317, there is provided a bidirectional switching device in the form of a pair of a semiconductor switching element 301a, 302a or 303a serving as a forward switch, and a semiconductor switching element 301b, 302b or 303b serving as a reverse switch. Between a positive electrode bus 316c and each of the three phase terminals of three phase ac motor 317, there is provided a bidirectional switching device in the form of a pair of a semiconductor switching element 304a, 305a or 306a serving as a forward switch, and a semiconductor switching element 304b, 305b or 306b serving as a reverse switch. Between negative electrode bus 314c and common bus 315c, there is provided a smoothing capacitor 312c. There is provided a smoothing capacitor 313c between positive electrode bus 316c and common bus 315c.

The power converter having the switching circuit configuration shown in FIG. 33 can select a source of power for driving motor 317 between the two dc power sources 310c and 311c by turning on and off the forward switches and reverse switches. When the reverse switches #1/2/3 (R-SW#1/2/3) (that is, semiconductor switching elements 301b, 302b and 303b) are ON, the forward switches #4/5/6 (F-SW#4/5/6) (that is, semiconductor switching elements 304a, 305a and 306a) are OFF, and the reverse switches #4/5/6 (R-SW#4/5/6) (that is, semiconductor switching elements 304b, 305b and 306b) are OFF; then the remaining switches form a switching circuit similar to a 3 phase inverter to drive 3 phase ac motor 317 with first dc power source 310c. When the reverse switches #4/5/6 (R-SW#4/5/6) (that is, semiconductor switching elements 304b, 305b and 306b) are ON, the forward switches #1/2/3 (F-SW#1/2/3) (that is, semiconductor switching elements 301a, 302a and 303a) are ON, and the forward switches #7/8/9 (R-SW#7/8/9) (that is, semiconductor switching elements 307a, 308a and 309a) are OFF; then the remaining switches form a switching circuit similar to a 3 phase inverter to drive 3 phase ac motor 317 with second dc power source 311c. In this way, the power converter of FIG. 33 can select one from the two dc power sources 310c and 311c as a source of power driving motor 317.

Figure 34:
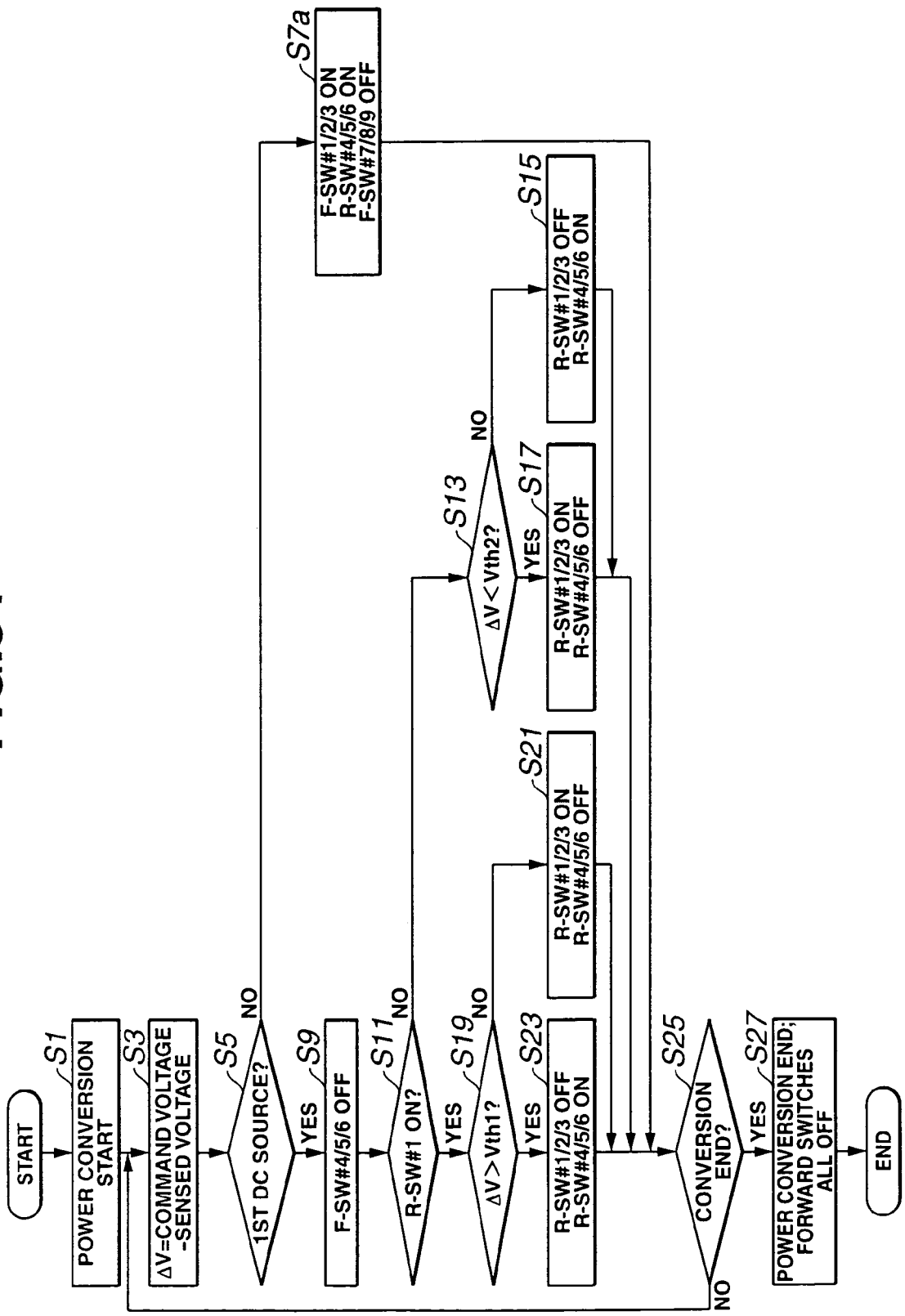
FIG. 34 is a flowchart showing a control process performed by the system of FIG. 33.

The power converter of FIG. 33 is operated by a control process shown in FIG. 34. The flowchart of FIG. 34 is different only in a step S7a, from the flowchart of FIG. 31. When second source 311C is to be selected as a driving power source, and the answer of S5 is NO, the control section proceeds from S5 to S7a. At S7a, the forward switches #1/2/3 are turned on, the forward switches #7/8/9 are turned off, and the reverse switches #4/5/6 are turned on.

In response to the command torque and the motor speed, the motor control section 362 calculates a command voltage for each phase for driving three phase ac motor 317 by using a predetermined command voltage data table. The PWM generating section 363 produces a PWM signal from the command voltage for each phase, and switches on and off the reverse switches #1/2/3 and the forward switches #4/5/6. In this way, the converter system can drive three phase ac motor 317 by using second dc power source 311c as driving power source.

By performing the charging operation according to the control process of FIG. 34, it is possible to set the voltage of second dc power source 311c to a value higher than the voltage of first dc power source 310c. Without requiring any dc-dc converter, the power conversion system of this embodiment can increase/decrease the voltage of second dc power source 311c, and hence reduce the size and the loss of the system.

15th Embodiment

Figure 35:
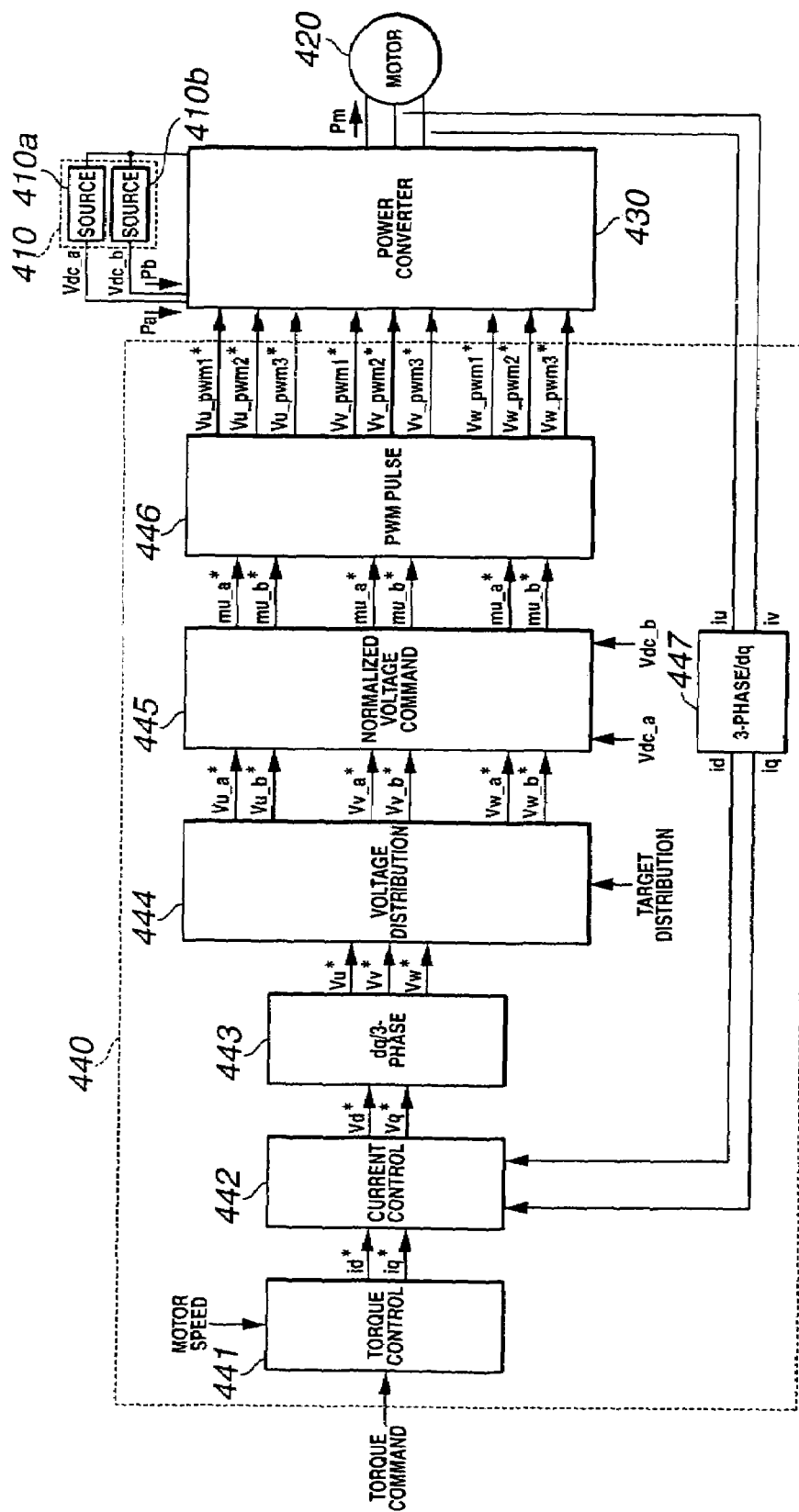
FIG. 35 is a functional block diagram showing a power conversion system or motor drive system according to a fifteenth embodiment.
Figure 36:
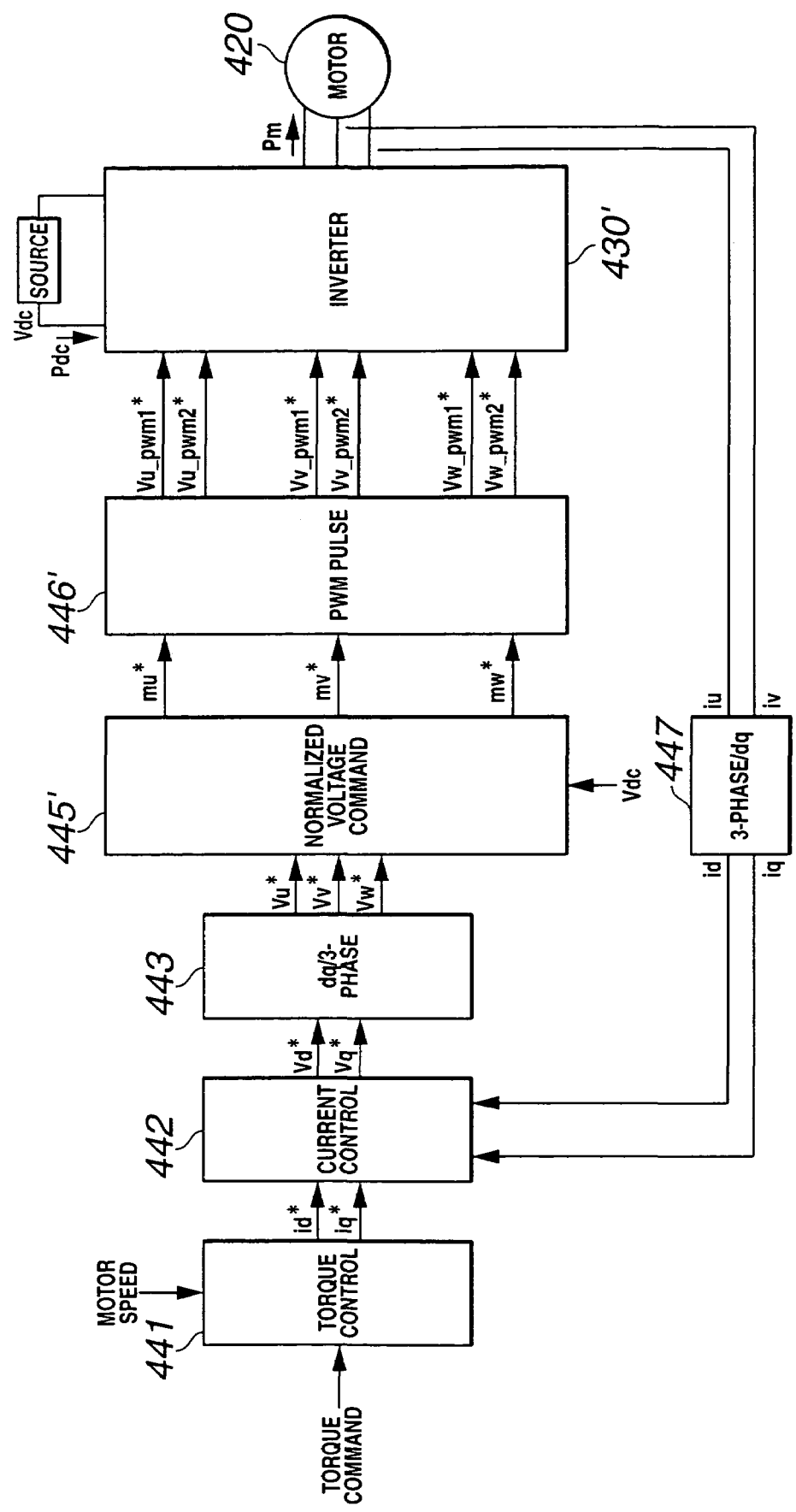
FIG. 36 is a functional block diagram showing a motor drive system of a comparative example using an ordinary inverter control system.

FIG. 35 shows a power conversion system according to a fifteenth embodiment of the present invention. The power conversion system of this example is a motor drive system for driving a motor. FIG. 36 shows a comparative example.

The motor drive system of FIG. 35 includes a multi-output dc power source 410 including a first dc power source (first dc voltage supplying section) 410a and a second dc power source (second dc voltage supplying section) 410b; a motor 420; a power converter 430 for producing a voltage to be applied to motor 420 by using voltages of multi-output power source 410; and a control unit (or controller) 440 for controlling a torque of motor 420 by driving power converter 430, and controlling a power distribution ratio between first and second power sources 410a and 410b. In multi-output power source 410, the lower potential terminals (or electrodes) of first and second dc power sources 410a and 410b are connected together to a common (reference) terminal providing a common (or reference) potential (GND potential). A potential Vdc_a of first dc power source 410a is outputted through a first supply terminal, and a potential Vdc_b of second dc power source 410b is outputted through a second supply terminal. Motor 420 of this example is a three-phase ac motor driven by ac voltages produced by power converter 430.

Figure 37:
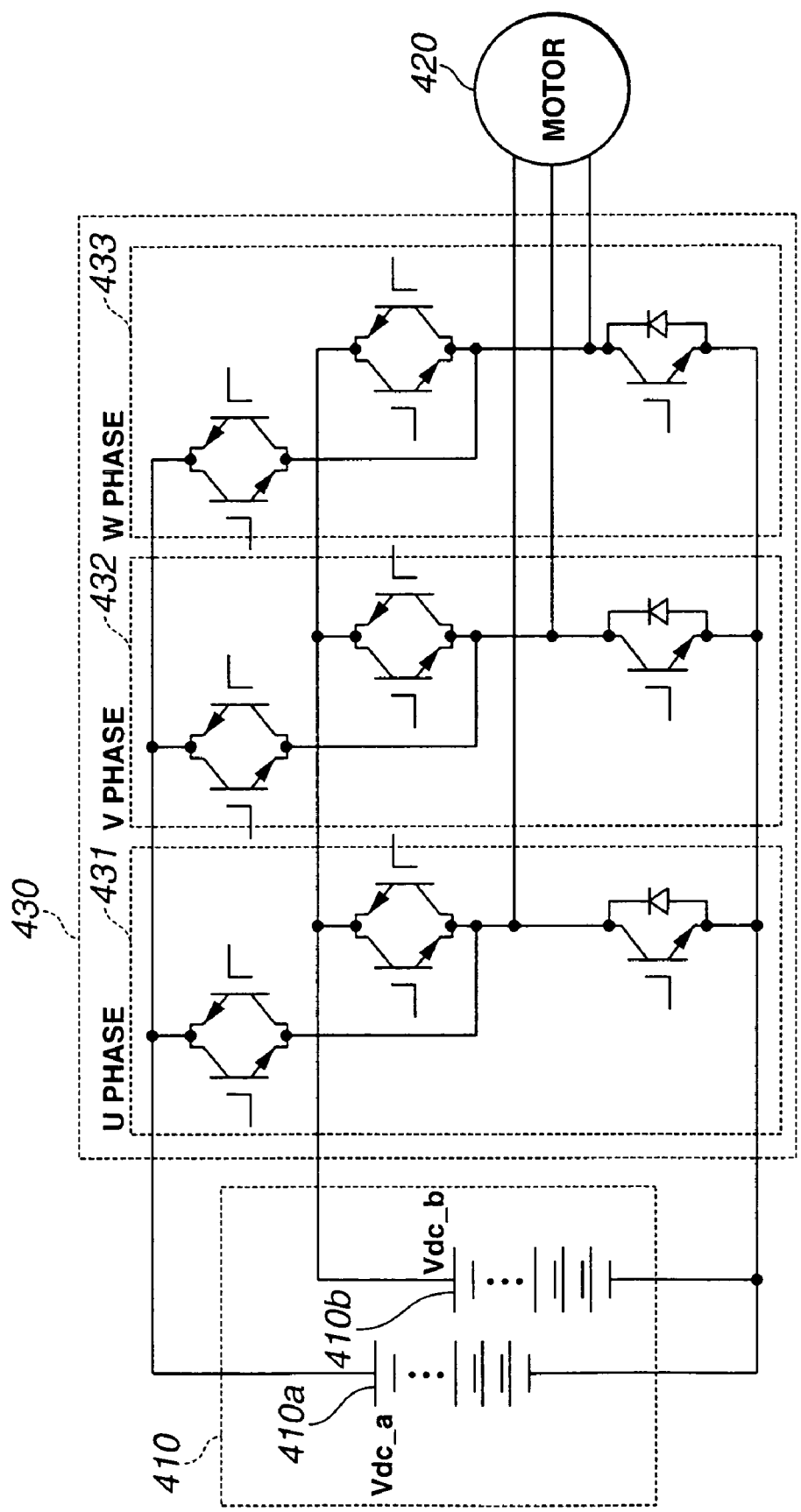
FIG. 37 is a view showing a power source and a power converter of a first example which can be used in the motor drive system of FIG. 35.

Power converter 430 is a dc-ac power converter producing motor driving voltages from the three potentials provided by multi-output dc power source 410. Power converter 430 includes a U phase switching circuit section 431, a V phase switching circuit section 432 and a W phase switching circuit section 433 which are identical in construction to one another, as shown in FIG. 37. The U phase switching section 431, by way of example, is a switch arrangement for producing a voltage applied to the U phase of motor 20, and includes first, second and third switches. The first switch is a bidirectional switch capable of switching the conduction in both directions. The first switch is composed of a power element such as IGBT, and connected with the first supply terminal on the higher potential side (of Vdc_a) and an output terminal of the U phase switching section 431 which is connected to the U phase of motor 420. The second switch is a bidirectional switch capable of switching the conduction in both directions, and the second switch is composed of a power element such as IGBT, and connected with the second supply terminal of the intermediate potential (Vdc_b) and the output terminal connected to the U phase of motor 420. The third switch is a switch capable of switching the conduction in both directions, and the third switch is connected with the common terminal of the ground potential (GND) and the output terminal connected to the U phase of motor 420. The third switch of the example shown in FIG. 37 includes a diode for conducting current flowing into motor 420. The thus-constructed U phase switching section 431 can supply a voltage to motor 420 by selecting one among the three potentials GND, Vdc_a and Vdc_b and connecting the selected one to the output terminal connected to motor 420 in such a control manner that the on times of the three potentials are varied so as to control the proportions of the on times, and thereby to provide a voltage required by motor 420. V phase switching circuit section 432 and W phase switching circuit section 433 are constructed and operated in the same manner. In the comparative example shown in FIG. 36, by contrast, an inverter 430' is used as power converter, and sections 445' and 446' are different from those of FIG. 35.

Control unit 440 shown in FIG. 35 includes a torque control section 441, a current control section 442, a dq to 3 phase transforming section 443, a voltage distribution section 444, a normalized command voltage determining section 445, a PWM pulse generating section 446, and a 3 phase/dq transforming section 447. Torque control section 441 receives a torque command supplied from the outside, and a motor speed; and calculates a d-axis command current id* and a q-axis command current iq*. Current control section 442 receives d-axis and q-axis command currents id* and iq*, and d-axis and q-axis (actual) currents id and iq; and determines command voltages Vd* and Vq* to control id to id*, and iq to iq*. The current id and iq are determined by 3-phase/dq transforming section 447 from three-phase currents iu and iv. The dq/3-phase transforming section 443 transforms d-axis and q-axis command voltages Vd* and Vq* into three-phase command voltages Vu*, Vv* and Vw*.

Voltage distribution section 444 and normalized command voltage determining section 445 are characteristic of the motor drive system according to this embodiment. Voltage distribution section 444 receives three-phase command voltages Vu*, Vv* and Vw* from section 443, and a target power supply distribution command. From these voltages Vu*, Vv* and Vw*, the voltage distribution section 444 determines first and second source U-phase command share voltages Vu_a* and Vu_b* to be produced, respectively, from the potentials Vdc_a and Vdc_b; first and second source share V-phase command voltages Vv_a* and Vv_b* to be produced, respectively, from the potentials Vdc_a and Vdc_b; and first and second source W-phase command share voltages Vw_a* and Vw_b* to be produced, respectively, from the potentials Vdc_a and Vdc_b; in accordance with the target power supply distribution command representing a desired amount of power Pa supplied from the first power source 410a and a desired amount of power Pb supplied from the second power source 410b.

Normalized command voltage determining section 455 receives potential Vdc_a of first power source 410a and potential Vdc_b of second power source 410b, and determines normalized command share voltages mu_a*, mu_b*, mv_a*, mv_b*, mw_a* and mw_b* by normalizing Vu_a*, Vu_b*, Vv_a*, Vv_b*, Vw_a*, and Vw_b*. In accordance with these normalized command share voltages, PWM pulse generating section 446 produces PWM pulses for turning on and off the switches in power converter 430.

The thus-constructed motor drive system is operated as follows: By using the power converter 430 having a simple construction as shown in FIG. 37, the motor drive system shown in FIG. 35 can control the amount of power supply from first dc power source 310a and the amount of power supply from second dc power source 210b in response to a desired distribution command, while controlling the torque of motor 420.

Figure 40:
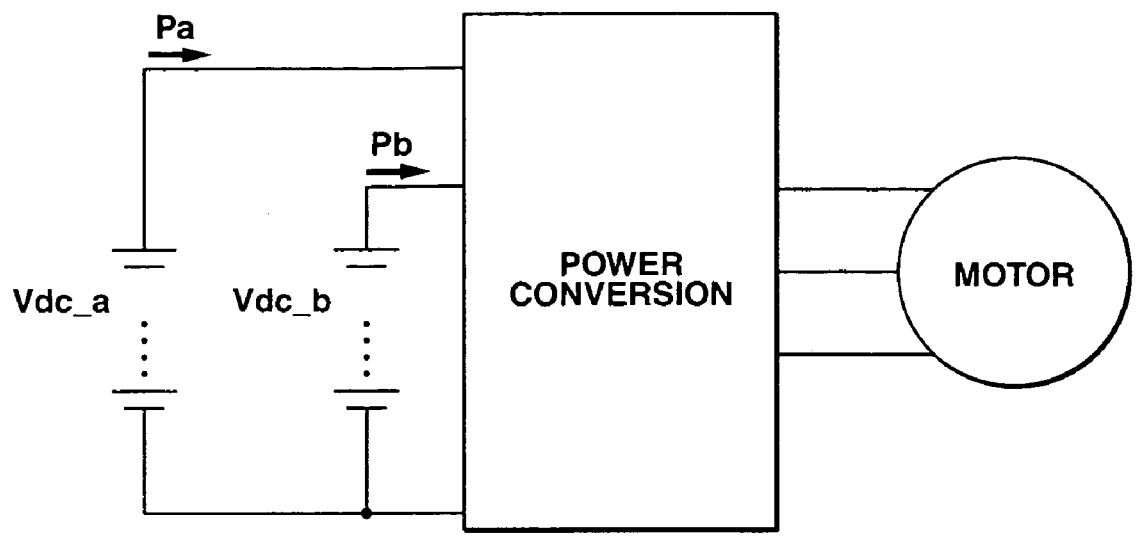
FIG. 40 is a view for illustrating power flows (Pa, Pb) in the motor drive system of FIG. 35.

Voltage distribution section 444 and normalized voltage generating section 445 shown in FIG. 35 function to control the distribution or apportionment of power between a plurality of power sources to desired values. Voltage distribution section 444 performs calculating operations based on the following principle. The following two conditions are to be satisfied in order to vary the proportion (or percentage) of power Pa supplied from first source 410a and the proportion (or percentage) of power Pb supplied form second source 410b. FIG. 40 shows power flows of Pa and Pb in the power conversion system of this embodiment.

1) Voltage condition $$Vu^* = Vu\_a^* + Vu\_b^*$$

$$Vv^* = Vv\_a^* + Vv\_b^*$$

$$Vw^* = Vw\_a^* + Vw\_b^*$$

2) Power condition $$Pa:Pb = Vu\_a^* : Vu\_b^*$$

$$Pa:Pb = Vv\_a^* : Vv\_b^*$$

$$Pa:Pb = Vw\_a^* : Vw\_b^*$$

Figure 41:
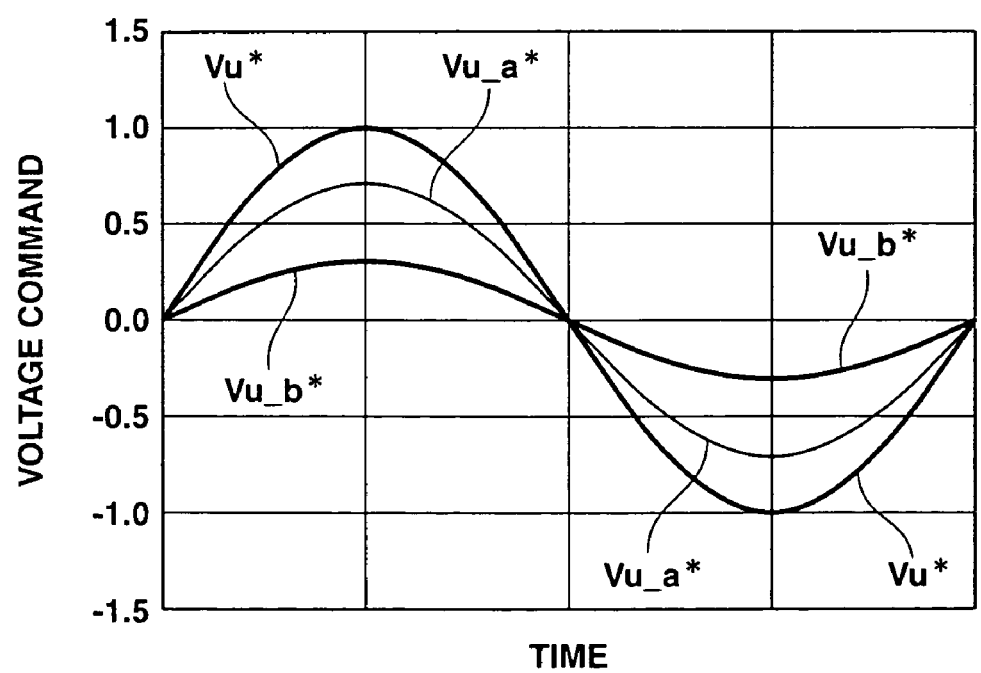
FIG. 41 is a graph for illustrating power distribution in the system of FIG. 35 in the form of phase voltage waveforms when the powers from the two sources are the same in the positive/negative sign.
Figure 43:
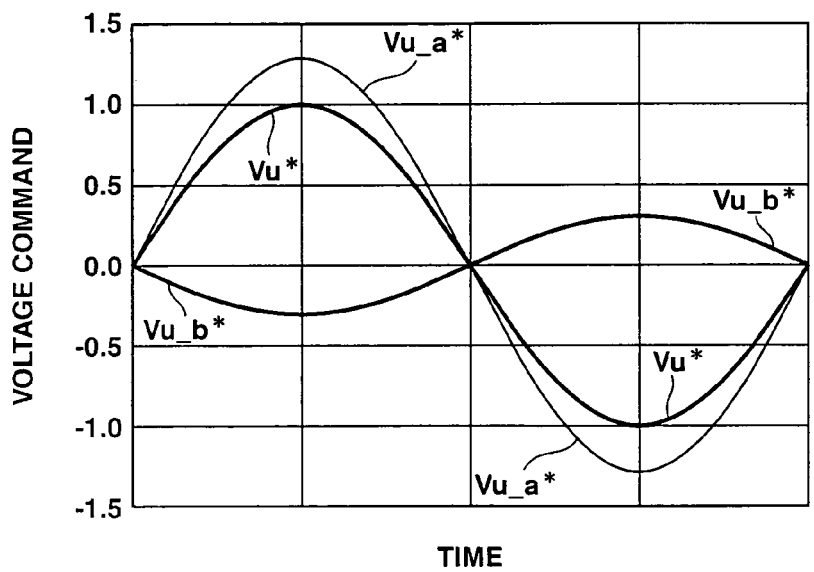
FIG. 43 is a graph for illustrating power distribution in the system of FIG. 35 in the form of phase voltage waveforms when the powers from the two sources are opposite in the positive/negative sign.

FIGS. 41 and 43 show the U phase command voltage Vu*, and first and second source command share voltages Vu_a* and Vu_b* for first and second sources 410a and 410b. Pa and Pb are identical in the (positive/negative) sign in the case of FIG. 41, and opposite in the sign in the case of FIG. 43. The two conditions can be expressed in the form of voltage vectors.

1) Voltage condition $$V^* = Va^*(Vu\_a^*, Vv\_a^*, Vw\_a^*) + Vb^*(Vu\_b^*, Vv\_b^*, Vw\_b^*)$$

2) Power condition

Pa:Pb=sgn(Va*)|Va*(Vu_a*, Vv_a*, Vw_a*)|:sgn(Vb*)|Vb*(Vu_b*, Vv_b*, Vw_b*)|

Figure 42:
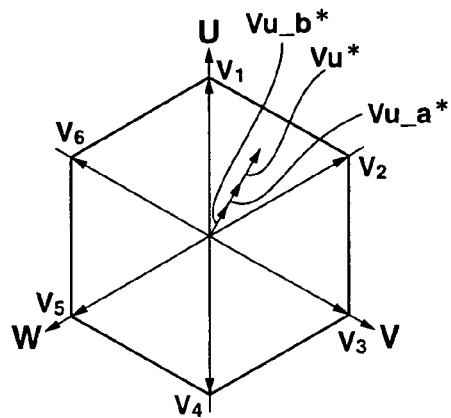
FIG. 42 is a view for illustrating power distribution in the system of FIG. 35 in the form of voltage vectors when the powers from two sources are the same in the positive/negative sign.
Figure 44:
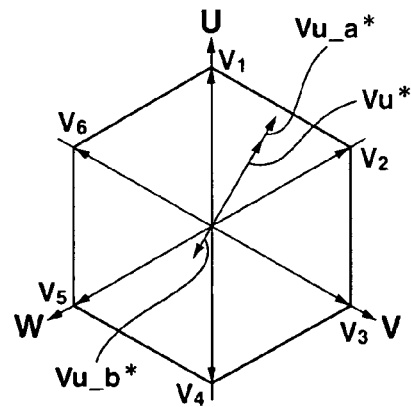
FIG. 44 is a view for illustrating power distribution in the system of FIG. 35 in the form of voltage vectors when the powers from the two sources are opposite in the positive/negative sign.

In the power condition, each of sgn(Va*) and sgn(Vb*) is equal to 1 in the same direction as the voltage vector V, and equal to −1 in the opposite direction to the voltage vector V. FIGS. 42 and 44 show these voltage vetors.

The sum P of powers supplied from the two power sources is expressed as: P=Pa+Pb. In this example, Pa=rto_pa·P and Pb=rto_pb·P. Quantities rto_pa and rto_pb are factors (or weights) adding up to one; rto_pa+rto_pb=1. Voltage distribution section 444 receives, as inputs, command voltages Vu*, Vv* and Vw* and a voltage distribution command representing the factor rto_pa (=1-rto_pb); and calculates first and second source command share voltages from these inputs according to the following equations.

Vu_a*=rto_pa·Vu*

Vu_b*=rto_pb·Vu*

Vv_a*=rto_pa·Vv*

Vv_b*=rto_pb·Vv*

Vw_a*=rto_pa·Vw*

Vw_b*=rto_pb·Vw*

Normalized voltage command section 445 performs the following calculations.

mu_a*=Vu_a*/Vdc_a/2 mu_b*=Vu_b*/Vdc_b/2 mv_a*=Vv_a*/Vdc_a/2 mv_b*=Vv_b*/Vdc_b/2 mw_a*=Vw_a*/Vdc_a/2 mw_b*=Vw_b*/Vdc_b/2

In this way, the power conversion system can control the motor torque so as to follow the command torque, and simultaneously the distribution of power supplies from first and second power sources 410a and 410b so as to follow the distribution command.

Figure 45:
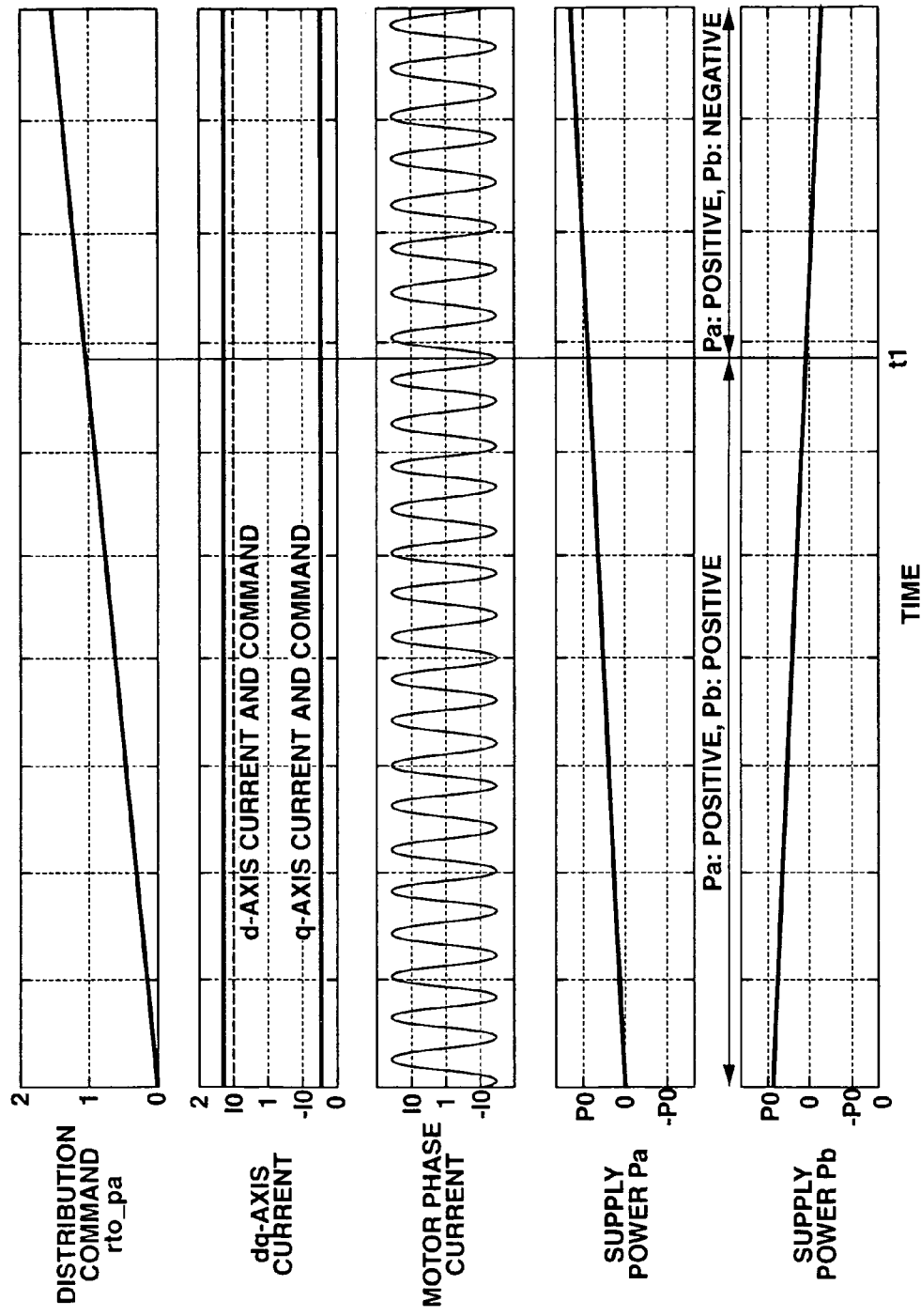
FIG. 45 is a view for showing simulation results of motor drive operation in the motor drive system of FIG. 35.

FIG. 45 shows simulation results in the case in which the motor is driven by the power conversion system according to this embodiment. In the example shown in FIG. 45, the motor is driven at a constant torque and a constant speed, and the voltage distribution command rto_pa for first source 410a is increased gradually from zero (and accordingly the voltage distribution command rto_pb for second source 410b is decreased gradually from one). Even if power is varied, torque follows the command because the d-axis and q-axis currents match the d-axis and q-axis command currents. As commanded by the voltage distribution command, the power Pa supplied from first source 410a is increased gradually while power Pb supplied from second 410b is decreased gradually. Until an instant t1, the signs of Pa and Pb are the same. In this state, first and second sources 410a and 410b share in supplying power to motor 420. After t1, the command is such that Pa is positive and Pb is negative. In this case, too, Pa and Pb are varied as commanded. In this state, first source 410 supplies power beyond the motor output, and an unused portion is supplied to second source 410 for regeneration (for charging, that is). Thus, the power conversion system according to this embodiment can control the motor torque as commanded, and controls power supplies from two or more sources as desired.

16th Embodiment

Figure 49:
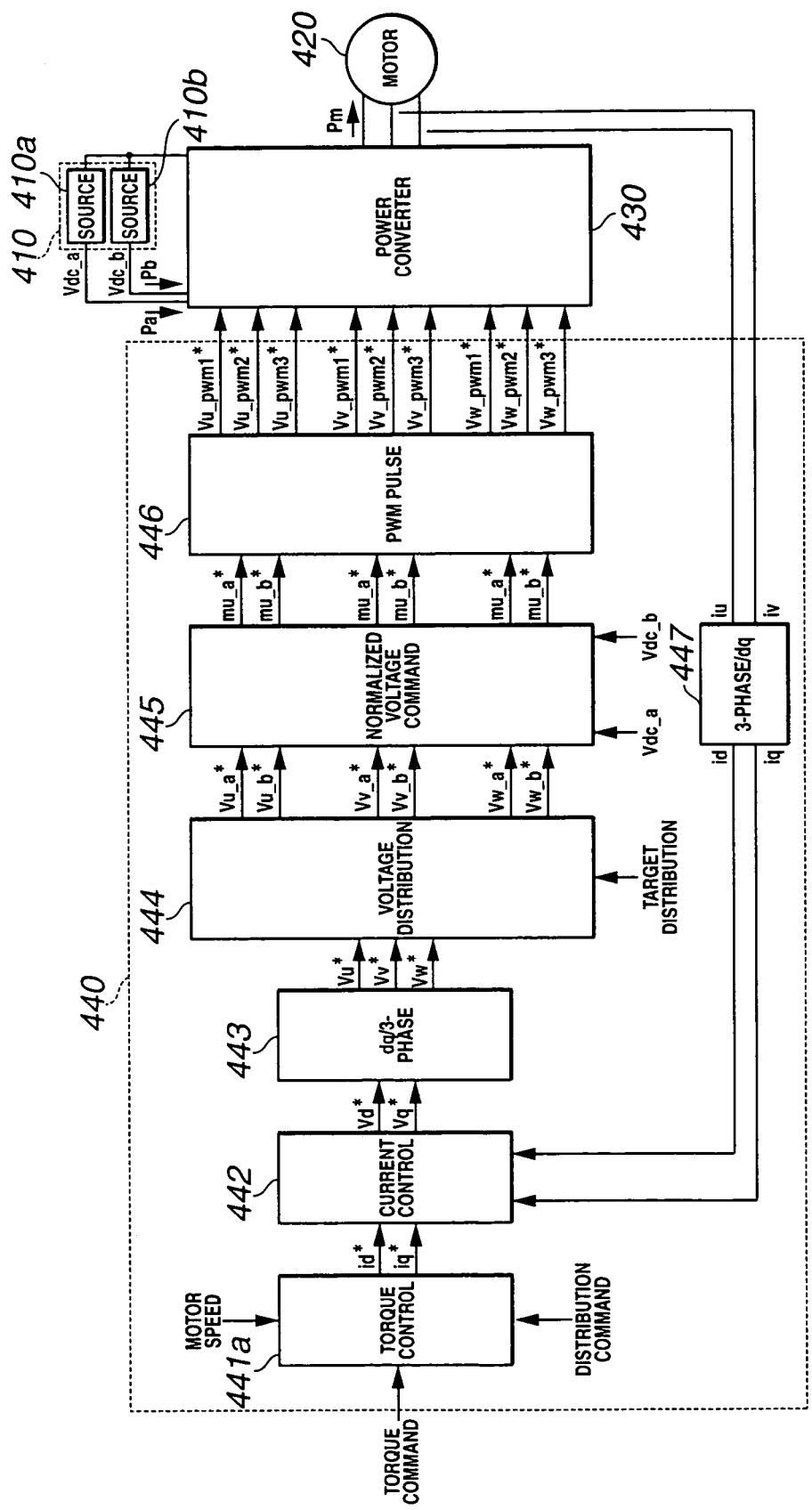
FIG. 49 is a functional block diagram showing the power conversion system or motor drive system according to the sixteenth embodiment.

FIG. 49 shows a power conversion system according to a sixteenth embodiment of the present invention in the form of functional blocks. The power conversion system of this embodiment is difference from the system of the 15th embodiment shown in FIG. 35, only in a torque control section 441a. In the other respects, both systems are the same. In addition to the torque command, and the motor speed, torque control section 441a receives a power distribution command, and calculates the d-axis command current id* and q-axis command current iq* so as to prevent an unfeasible state in which any of the first source command share voltages Vu_a*, Vv_a* and Vw_a*, and second source command share voltages Vu_b*, Vv_b* and Vw_b* becomes higher than the source voltage, and the output is unfeasible.

Figure 46:
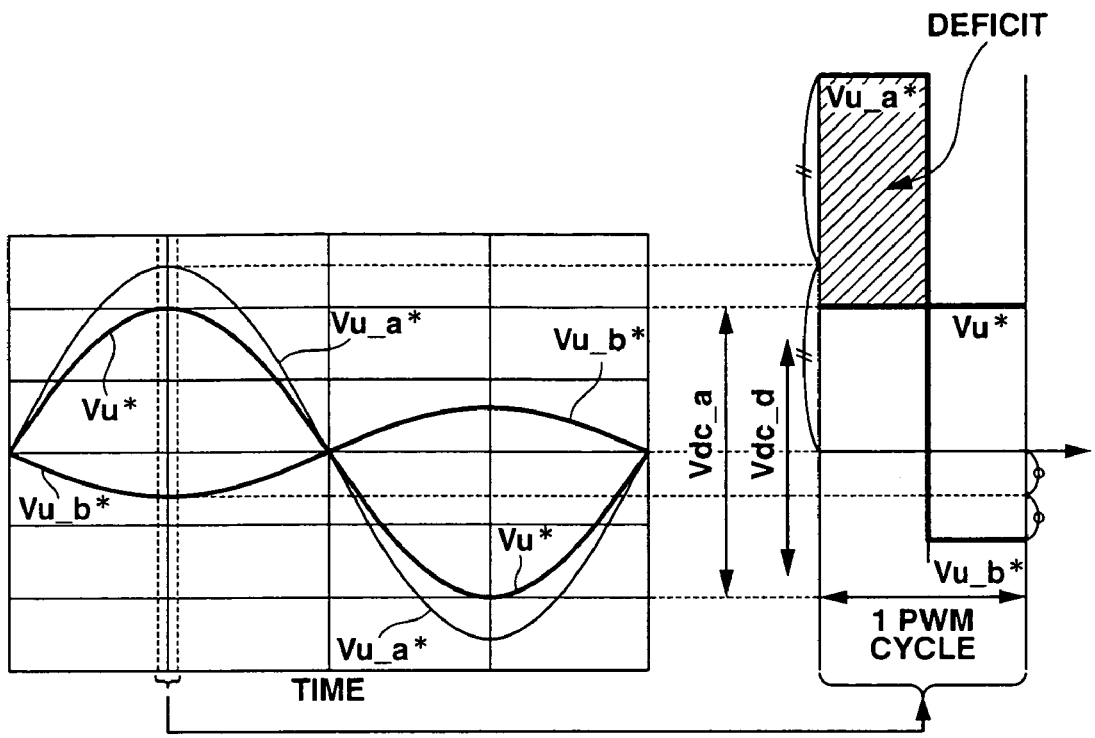
FIG. 46 is a view for illustrating a situation needing field weakening operation.

FIG. 46 is a view for illustrating the need for a field weakening control characteristic in the power conversion system according to this embodiment. In the example FIG. 46, the first source U phase command share voltage Vu_a* and second source U phase command share voltage Vu_b* are produced from U phase command voltage Vu*. In this case, first source command share voltage Vu_a* is higher than the source voltage Vdc_a. Therefore, there remains a voltage deficit, and it is not possible to produce a voltage as commanded.

Figure 47:
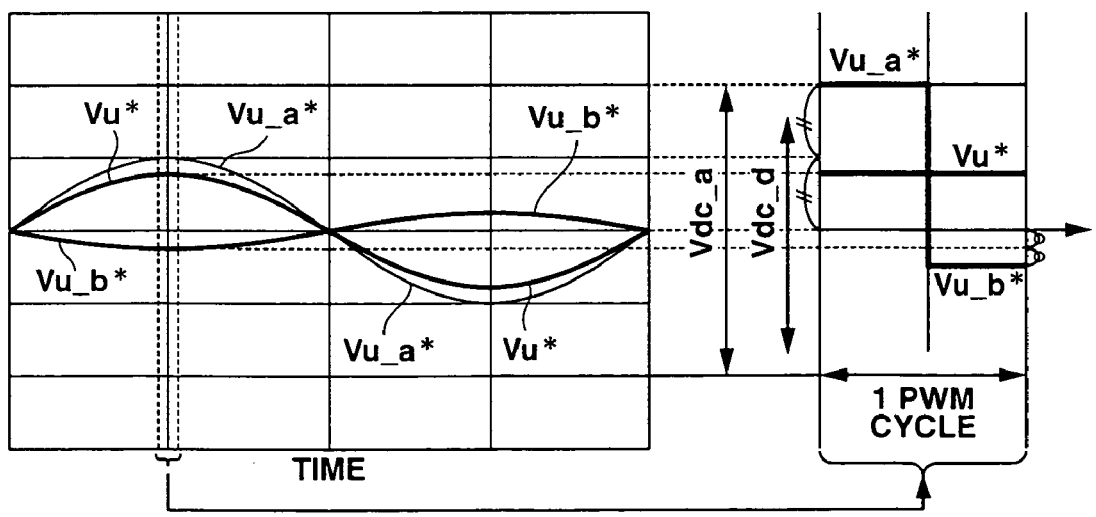
FIG. 47 is a view for illustrating a field weakening operation to eliminate voltage deficit in the power conversion system of FIG. 35.

Torque control section 441a of this embodiment is arranged to calculate the first and second source command share voltages so that each command share voltage is lower than or equal to the source voltage of the corresponding source, and thereby to prevent voltage saturation and a voltage deficit as shown in FIG. 46. In this example, the following calculations are performed. Torque control section 441a calculates a first parameter |rto_pa/Vdc_a| which is an absolute value of a quotient obtained by diving the distribution command rto_pa for first source 410a by the source voltage Vdc_a of first source 410a and a second parameter |rto_pb/Vdc_b| which is an absolute value of a quotient obtained by diving the distribution command rto_pb for second source 410b by the source voltage Vdc_b of second source 410b. By using a greater one of the first and second parameters |rto_pa/Vdc_a| and |rto_pb/Vdc_b|, the d-axis and q-axis command currents are calculated. These parameters are indices for determining which one falls into voltage deficit earlier. FIG. 47 shows a state in which a voltage deficit is eliminated by such a field weakening operation according to this embodiment.

Figure 48:
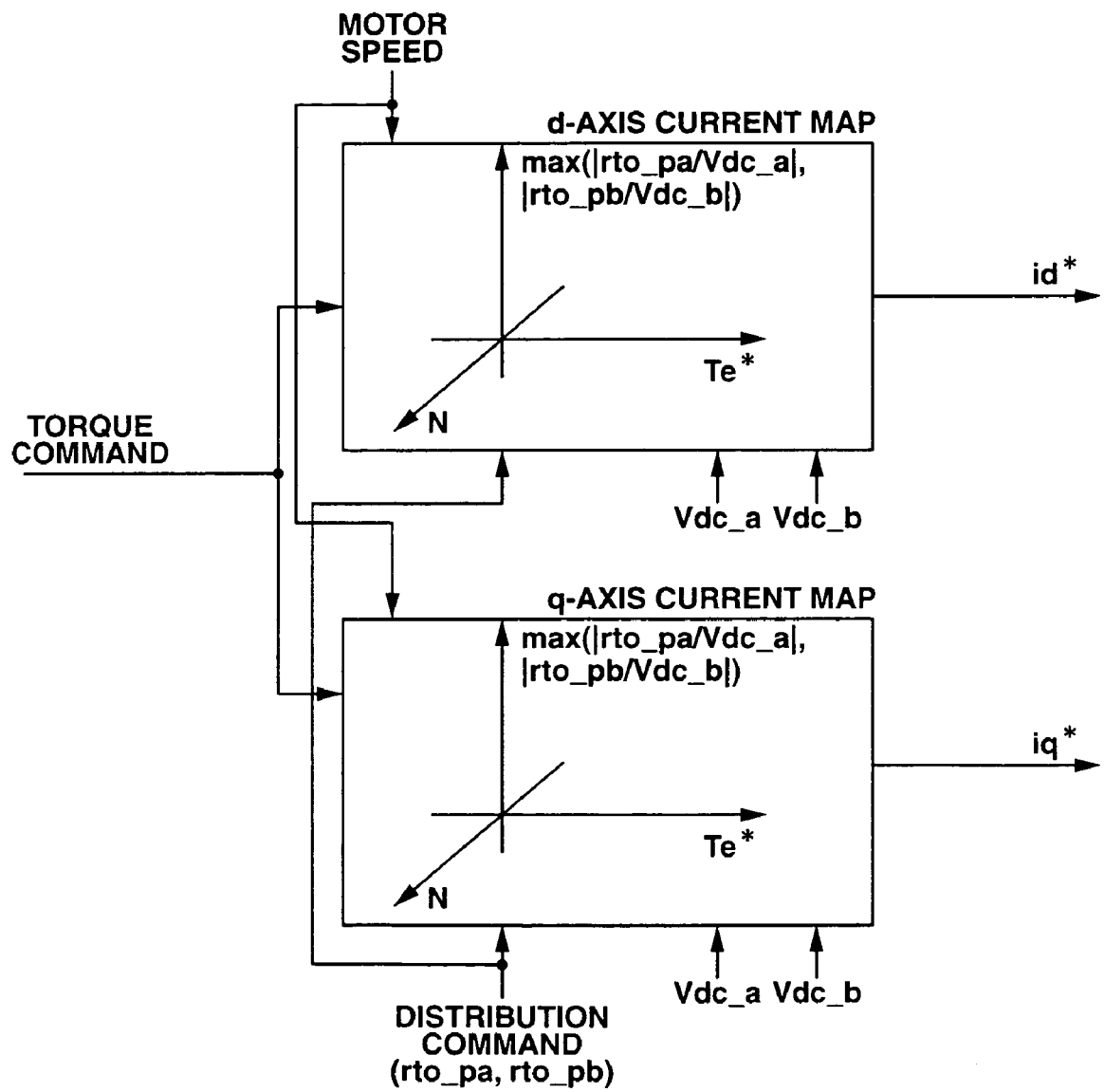
FIG. 48 is a view showing a torque control section in a power conversion system or motor drive system according to a sixteenth embodiment

FIG. 48 shows the structure of torque control section 441a in the form of control blocks. Torque control section 441a receives input information on power voltage commands rto_pa and rto_pb, and source voltages Vdc_a and Vdc_b; and calculates such values of d-axis and q-axis command currents id* and iq* as to prevent voltage saturation, from max(|rto_pa/Vdc_a|, |rto_pb/Vdc_b|), the torque command, and motor speed, by using a d-axis current map and a q-axis current map as shown in FIG. 48.

17th Embodiment

Figure 50:
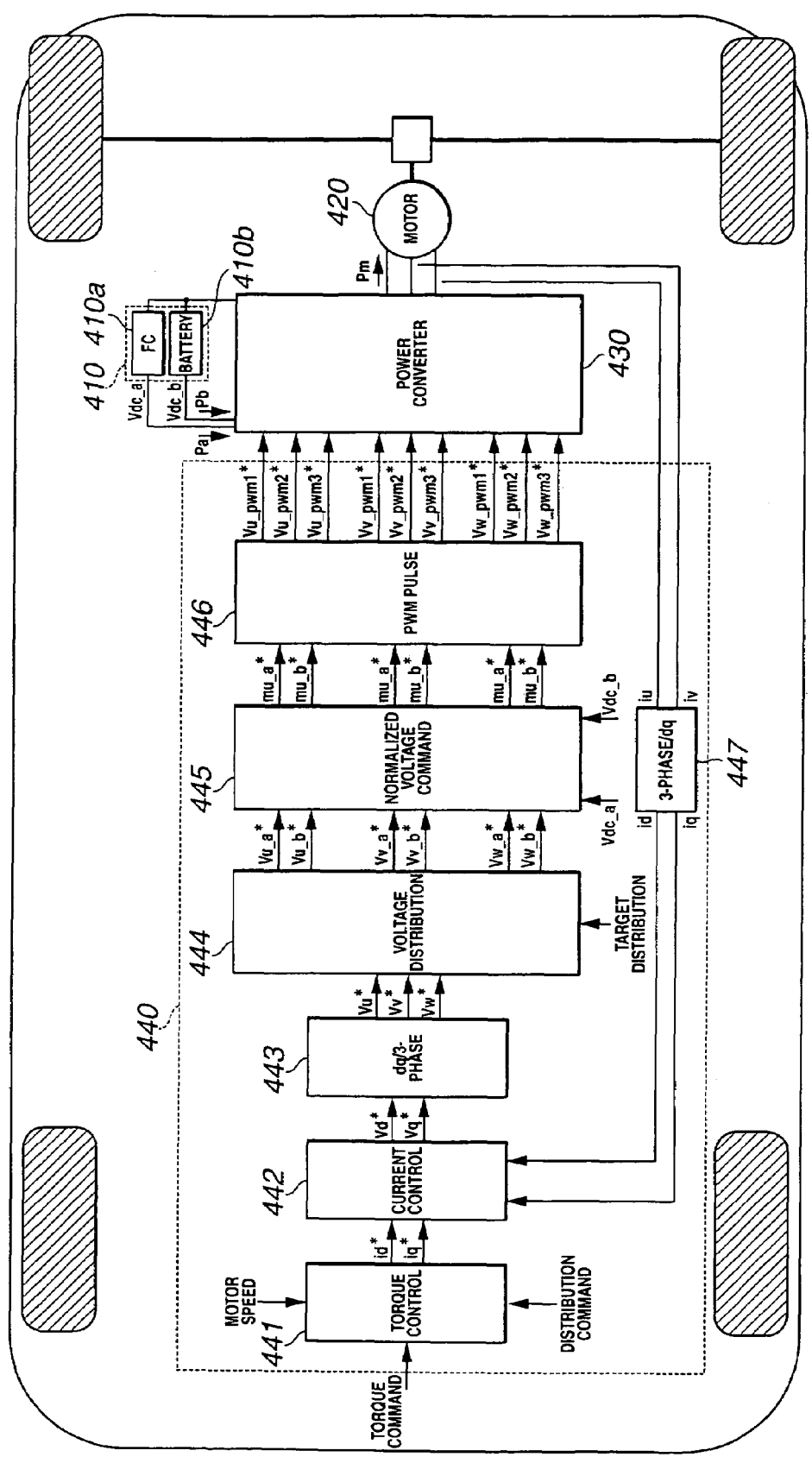
FIG. 50 is a view showing a fuel cell vehicle equipped with a power conversion system or motor drive system according to a seventeenth embodiment.

FIG. 50 shows a vehicle according to a seventeenth embodiment of the present invention. The vehicle of this embodiment is a fuel cell vehicle including a first dc power source 410a in the form of a fuel cell device (FC) and a second dc power source 410b in the form of a battery. Motor 420 is arranged to drive wheels of the vehicle. Fuel cell is incapable of accepting regenerative power, likely to vary its efficiency in dependence on an operating point, and less satisfactory in response characteristic. Therefore, it is desirable to use the power of fuel cell and the power of battery as a driving power for motor in controlled proportions. The power conversion system of this embodiment can control the proportions of power supplies among the power sources to desired levels, and thereby drive the motor efficiently. In the regenerative operation, the switching circuit of the power converter is set to the switch arrangement for returning the entirety (100%) of power to the battery. It is possible to calculate the power distribution command within the power conversion system instead of an external system. When a rapid acceleration request is produced by a driver, the system can decrease the share of the fuel cell which is relatively poor in the response characteristic, and increase the share of the battery which is superior in the response characteristic so as to respond properly to the driver's acceleration request. Thereafter, the system can readily restore to the normal calculation mode. In this way, the conversion system according to this embodiment can control the proportions of power supplies among a plurality of different power sources such as fuel cell, battery and capacitor, adequately in accordance with the properties of the power sources. Without the need for a dc-dc converter, this embodiment can reduce the size and loss of the system as in the preceding embodiments. The present invention is applicable not only to motor vehicle, but other vehicles such as trains and motorcycles as well.

18th Embodiment

Figure 51:
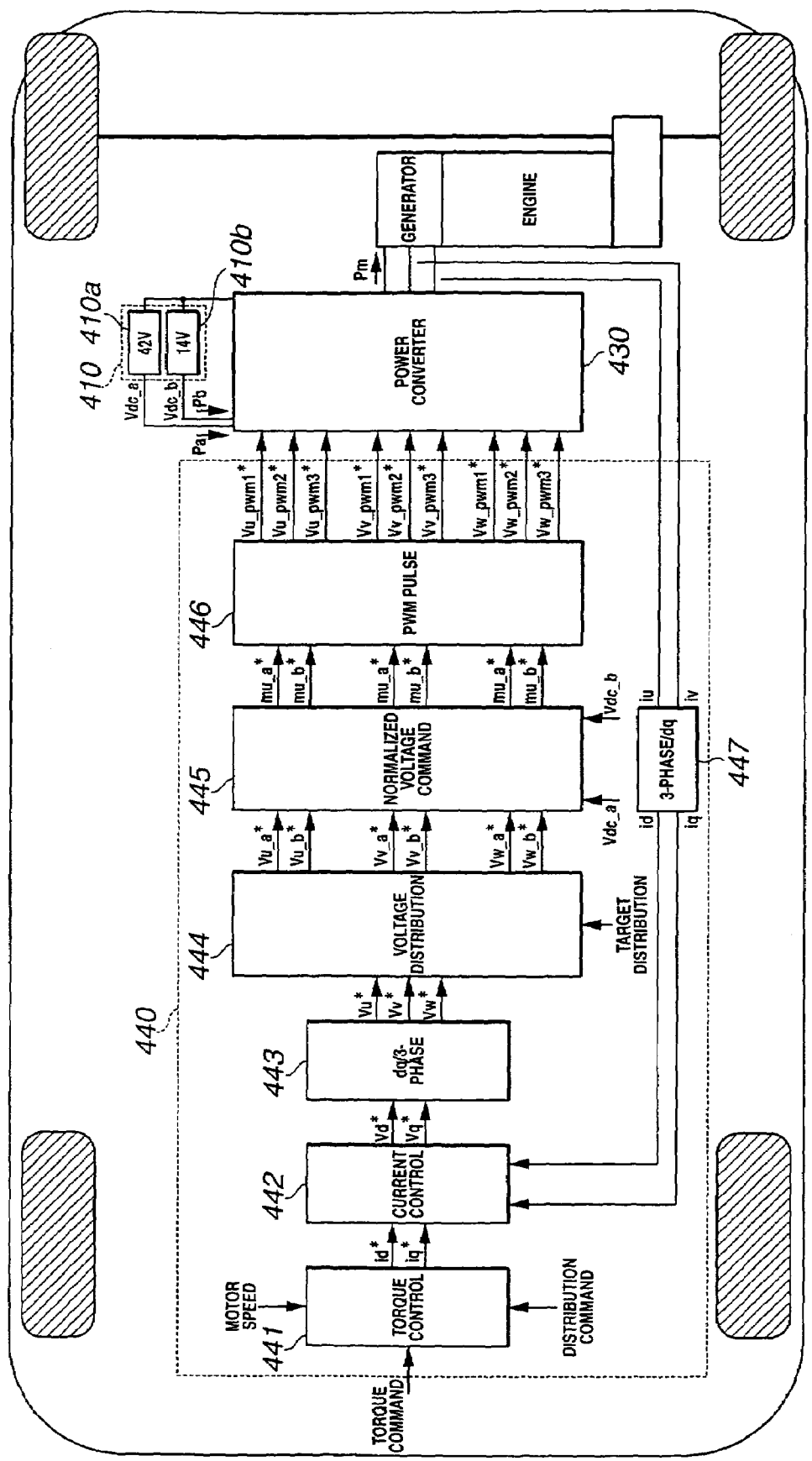
FIG. 51 is a view showing a vehicle equipped with a power conversion system or motor drive system according to an eighteenth embodiment.

FIG. 51 shows a vehicle according to an eighteenth embodiment of the present invention. The vehicle of this embodiment includes a first dc power source 410a in the form of a 42 V battery and a second dc power source 410b in the form of a 14 V battery. A power conversion system according to this embodiment can use the 42 volt battery 410a and 14 volt battery 410b with desired percentages, and thereby controls the states of charge in both batteries optimally.

Figure 38:
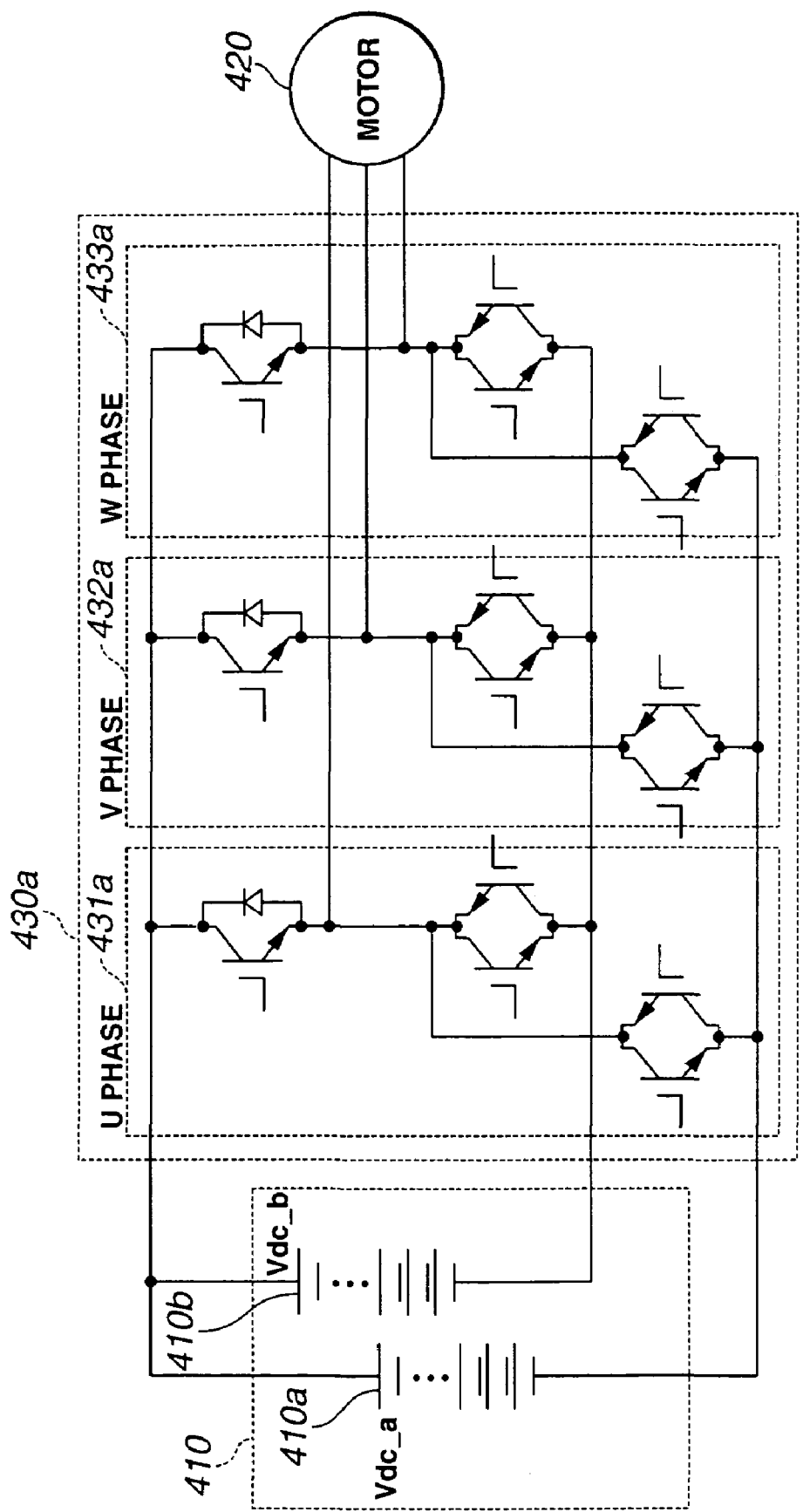
FIG. 38 is a view showing a power source and a power converter of a second example which can be used in the motor drive system of FIG. 35.
Figure 39:
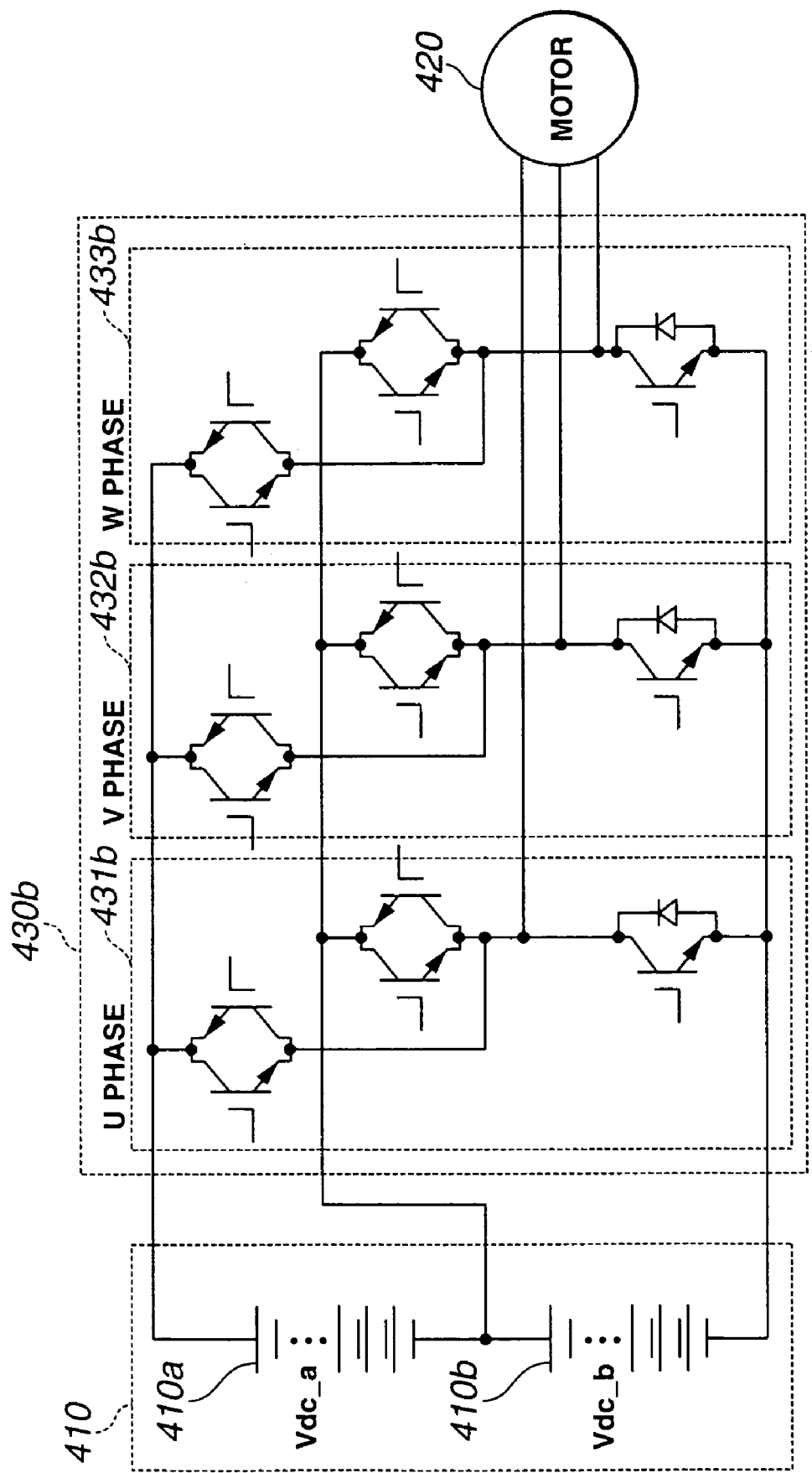
FIG. 39 is a view showing a power source and a power converter of a third example which can be used in the motor drive system of FIG. 35.

In stead of the switching circuit shown in FIG. 37, it is possible to employ the switching circuit shown in FIG. 38 in which the higher potential side of first and second power sources 410a and 410b are connected together to provide a common potential, or the switching circuit shown in FIG. 39 in which first and second dc power sources 410a and 410b are connected in series. In the examples of FIGS. 37, 38 and 39, each phase switching circuit section includes one diode. However, it is optional to employ various other circuit configurations. It is possible to employ, as a switching element, IGBT or MOSFET or other semiconductor switching elements. The present invention is not limited a three level output power source. A power source may be a type capable of providing four or more potentials of different levels.

According to one aspect of the present invention, a power conversion system comprises: a dc voltage source providing three or more electric potentials; a switching circuit or power converter; and a controller or control unit. The power conversion system may further comprise a sensor to sense a source condition of the dc power source; and the controller may be configured to switch the switching devices in the switching circuit in accordance with the source condition. The power conversion system may further comprise a sensor to sense a load condition of a load driven by the power converter; and the controller may be configured to switch the switching devices in accordance with the load condition. The power conversion system may further comprise a sensor to sense a vehicle condition of a vehicle in which the power conversion system is mounted; and the controller is configured to switch the switching devices in accordance with the vehicle condition.

This application is based on (1) a prior Japanese Patent Application No. 2004-200545 filed in Japan on Jul. 7, 2004; (2) a prior Japanese Patent Application No. 2004-200483 filed in Japan on Jul. 7, 2004; (3) a prior Japanese Patent Application No. 2004-207031 filed in Japan on Jul. 14, 2004; and (4) a prior Japanese Patent Application No. 2004-207087 filed in Japan on Jul. 14, 2004. The entire contents of these Japanese Patent Applications are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A power conversion system for converting a dc voltage to a pulsed ac voltage, comprising:
   a dc voltage source including a plurality of source terminals providing three or more electric potentials;
   a switching circuit arranged to connect one of the source terminals of the dc voltage source selectively to an output terminal of the switching circuit; and
   a controller configured to produce a pulsed ac output voltage at the output terminal from the potentials of the dc voltage source by controlling an on time for connecting each of the potentials of the dc voltage source to the output terminal.

2. The power conversion system as claimed in claim 1, wherein the dc voltage source includes a plurality of dc voltage supplying devices for supplying the electric potentials.

3. The power conversion system as claimed in claim 2, wherein the dc voltage source is configured to provide a lower potential, a higher potential higher than the lower potential, and an intermediate potential intermediate between the lower and higher potentials, a potential difference between the higher and intermediate potentials being unequal to a potential difference between the intermediate and lower potentials.

4. The power conversion system as claimed in claim 2, wherein the switching circuit comprises three circuit sections arranged to provide three-phase alternating voltage waveforms for driving a three-phase ac motor.

5. The power conversion system as claimed in claim 2, wherein the switching circuit comprises an intermediate potential connecting switching device preventing conduction in both directions, the intermediate potential connecting switching device being connected between the output terminal of the switching circuit and an intermediate potential supply terminal which is one of the source terminals of the dc voltage source for providing an intermediate potential intermediate between lower and higher potentials provided by the dc voltage source.

6. The power conversion system as claimed in claim 2, wherein the dc voltage source includes a fuel cell device as one of the dc voltage supplying devices, and a device storing electric energy as another one of the dc voltage supplying devices.

7. The power conversion system as claimed in claim 6, wherein the fuel cell device includes a first electrode connected together with a first electrode of the device storing electric energy and a second electrode connected to a fuel cell potential supply terminal which is one of the source terminals; and the switching circuit includes a switching device which is connected with the fuel cell potential supply terminal and which is a unidirectional switching device enabling conduction only in a forward direction from the fuel cell potential supply terminal to the output terminal of the switching circuit.

8. The power conversion system as claimed in claim 2, wherein the power conversion system further comprises a ac motor driven by the pulsed ac voltage produced at the output terminal of the switching circuit; and the controller is configured:
to determine a first motor drive command voltage;
to calculate, from the first motor drive voltage and a target power distribution command, a plurality of second motor drive command voltages corresponding to the potentials outputted from the dc voltage source; and
to control the switching circuit in accordance with the second motor drive command voltages.

9. The power conversion system as claimed in claim 8, wherein the controller is configured to calculate the second motor drive command voltages so that a sum of voltage vectors determined by the second motor drive command voltages is equal to a voltage vector of the first motor drive voltage.

10. The power conversion system as claimed in claim 8, wherein the controller is configured to calculate the second motor drive command voltages so that a proportion of each second motor drive command voltage is determined by the target distribution command.

11. The power conversion system as claimed in claim 8, wherein the controller is configured to calculate a d-axis command current and a q-axis command current to follow a motor torque command, by using the target distribution command.

12. The power conversion system as claimed in claim 11, wherein the controller is configured to calculate the d-axis command current and the q-axis command current in accordance with a greatest one of absolute values of quotients obtained by dividing a proportion of the target sharing command for each dc voltage supplying section by an output voltage of the dc voltage supplying section.

13. The power conversion system as claimed in claim 11, wherein the controller is configured to calculate the d-axis command current and the q-axis command current in accordance with a greatest one of proportions of the target distribution command for the dc voltage supplying sections.

14. The power conversion system as claimed in claim 2, wherein the power conversion system further comprises an induction load; the dc voltage source includes first and second potential supply terminals and a reference terminal each of which is one of the source terminals, the first and second potential supply terminals being terminals for supplying output voltages of first and second dc voltage supplying sections each of which is one of the dc voltage supplying sections of the dc voltage source; and the controller is configured to select one of the first and second potential supply terminals as a current path for current of the inductive load.

15. The power conversion system as claimed in claim 14, wherein the switching circuit comprises a first switching device connected between the reference terminal of the dc voltage source and the output terminal of the switching circuit which is connected to the inductive load, a second switching device connected between the first potential supply terminal and the output terminal, a third switching device connected between the second potential supply terminal and the output terminal, and a diode connected in parallel with the first switching device, and wherein the controller is configured to select one of the first and second potential supply terminals as a current path for current of the inductive load by controlling the first, second and third switching devices.

16. The power conversion system as claimed in claim 14, wherein the dc voltage source has one of a first circuit configuration in which negative electrodes of the first and second dc voltage supplying devices are connected together to the reference terminal, and positive electrodes of the first and second dc voltage supplying devices are connected, respectively, with the first and second potential supply terminals; a second circuit configuration in which positive electrodes of the first and second dc voltage supplying devices are connected together to the reference terminal, and negative electrodes of the first and second dc voltage supplying devices are connected, respectively, with the first and second potential supply terminals; and a third circuit configuration in which a negative electrode of the first dc voltage supplying device is connected to the reference terminal, a positive electrode of the first dc voltage supplying device and a negative electrode of the second dc voltage supplying device are connected together to the first potential supply terminal, and a positive electrode of the second dc voltage supplying section is connected to the second potential supply terminal.

17. The power conversion system as claimed in claim 14, wherein the power conversion system further comprises a voltage sensing device for sensing an actual voltage of a monitored dc voltage supplying device which is one of the first and second dc voltage supplying devices, and the controller is configured to select one of the first and second potential supply terminals as the current path for current of the inductive load, in accordance with a voltage difference between the actual voltage and a command voltage of the monitored dc voltage supplying device.

18. The power conversion system as claimed in claim 15, wherein the controller is configured to control the second switching device and the third switching device in accordance with a voltage difference between a sensed voltage and a command voltage of one of the first and second voltage supplying devices.

19. The power conversion system as claimed in claim 17, wherein the controller is configured to control the second switching device and the third switching device by comparing the voltage difference with first and second thresholds so as to provide a hysteresis.

20. The power conversion system as claimed in claim 17, wherein a command voltage of one of the first and second voltage supplying devices is higher than a voltage of the other of the first and second voltage supplying devices.

21. The power conversion system as claimed in claim 2, wherein the power conversion system comprises a plurality of the power converters connected with the dc power source in common; and further connected, respectively, with a plurality of loads.

22. A vehicle comprising: the power conversion system as claimed in claim 1.

23. A power conversion process of driving an inductive load with a dc voltage source, the power conversion process comprising:
allowing a current flow between the dc voltage source and the inductive load through a selected current path; and
determining the selected current path by selecting one of first and second supply potentials of the dc voltage source including a plurality of voltage supplying devices connected together to provide three or more potentials.

24. The power conversion process as claimed in claim 23, wherein the selected current path is determined by determining a turn-on switch subset, and a turn-off switch subset, the turn-on switch subset being a subset of a set of switches to be turned on, the turn-off switch subset being a subset of the set to be turned off.

25. The power conversion process as claimed in claim 24, wherein the current flow is allowed between the power source and the inductive load by holding the turn-on switch subset in an on state, holding the turn-off switch subset in an off state, and controlling a control subset between the on state and the off state, the control subset being a subset of the set.

26. A power conversion system for converting a dc voltage to a pulsed ac voltage, comprising:
   voltage supplying means for providing three or more electric potentials; and
   switching means for selecting one of the potentials, and for producing a pulsed ac output voltage from the potentials by controlling an on time for connecting each of the potentials for output.

* * * * *